Jan. 11, 1955  W. DE BACK ET AL  2,699,191
FEEDING, STEM END TRIMMING, AND TRANSFER MEANS FOR
ROTARY TURRET TYPE FRUIT PREPARATION MACHINES
Filed Sept. 6, 1949  47 Sheets-Sheet 20
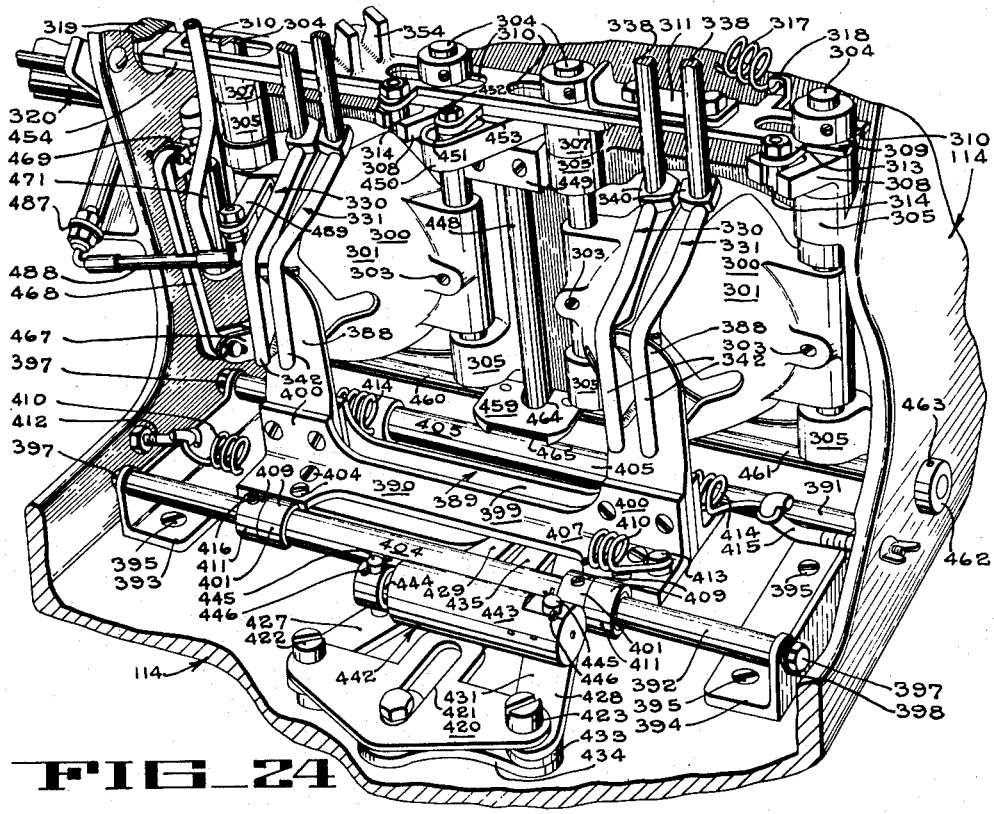
FIG_24
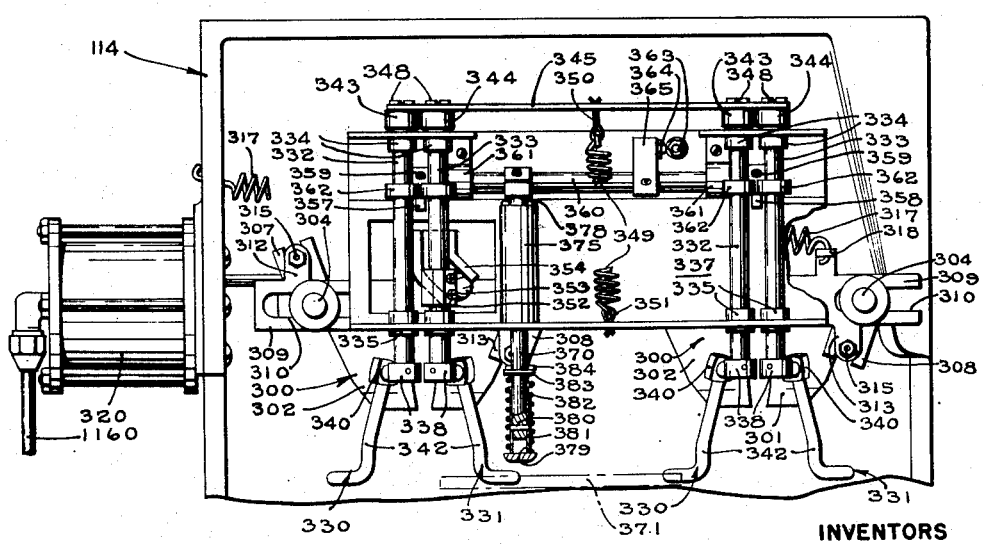
FIG_25
INVENTORS
WILLIAM DE BACK
SYLVIO PUCCINELLI
BY Hans G. Hoffmeister
ATTORNEY

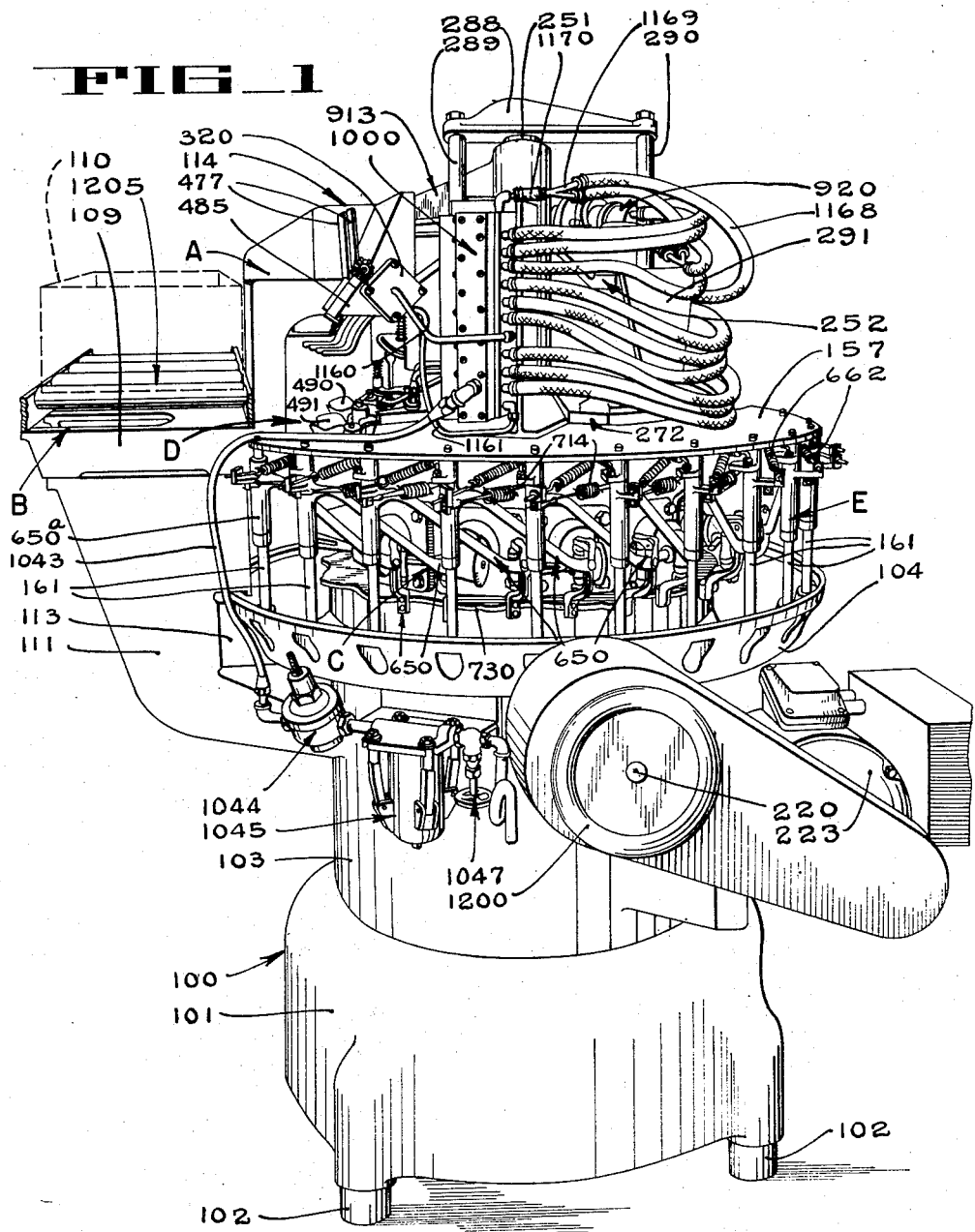

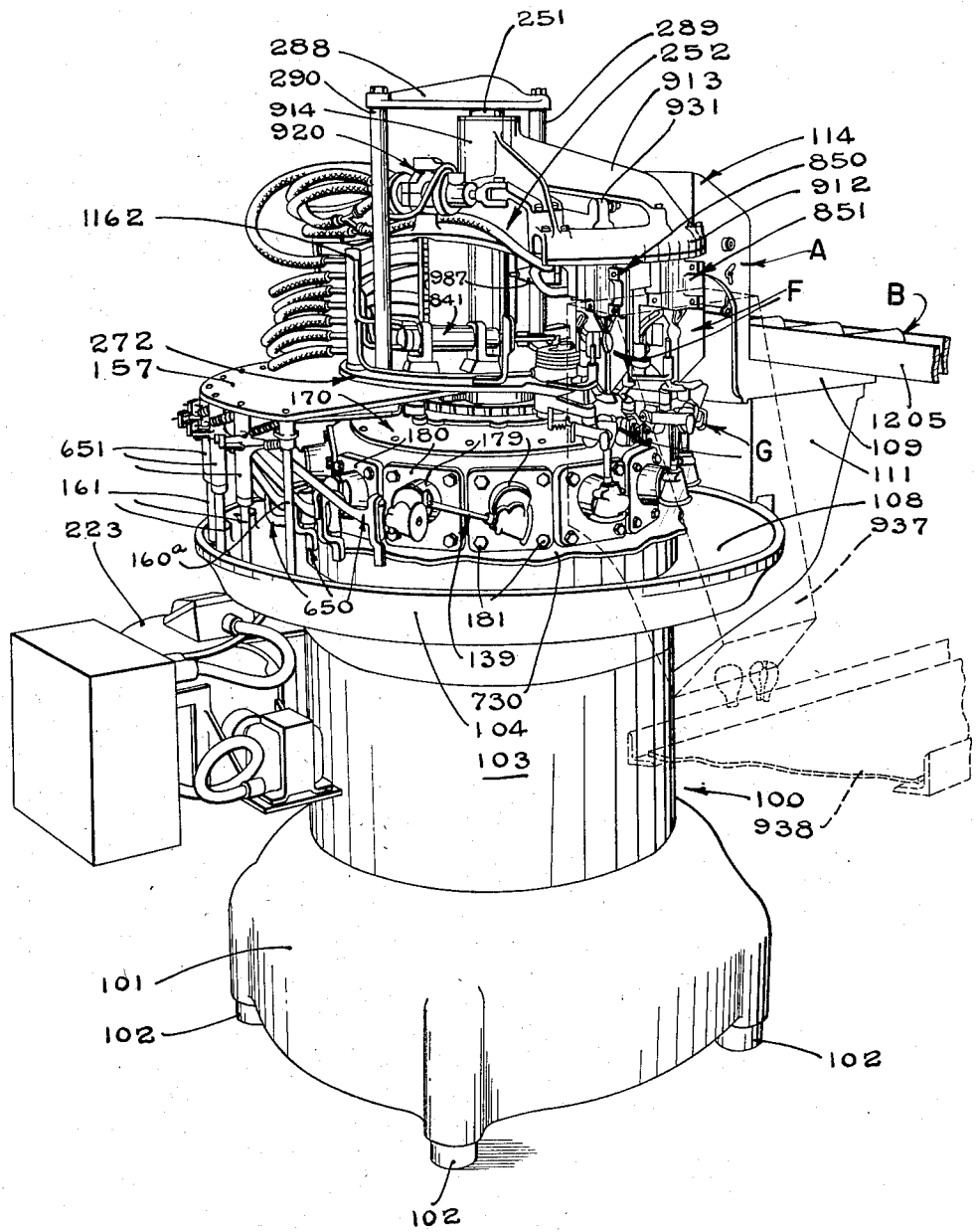
FIG_2

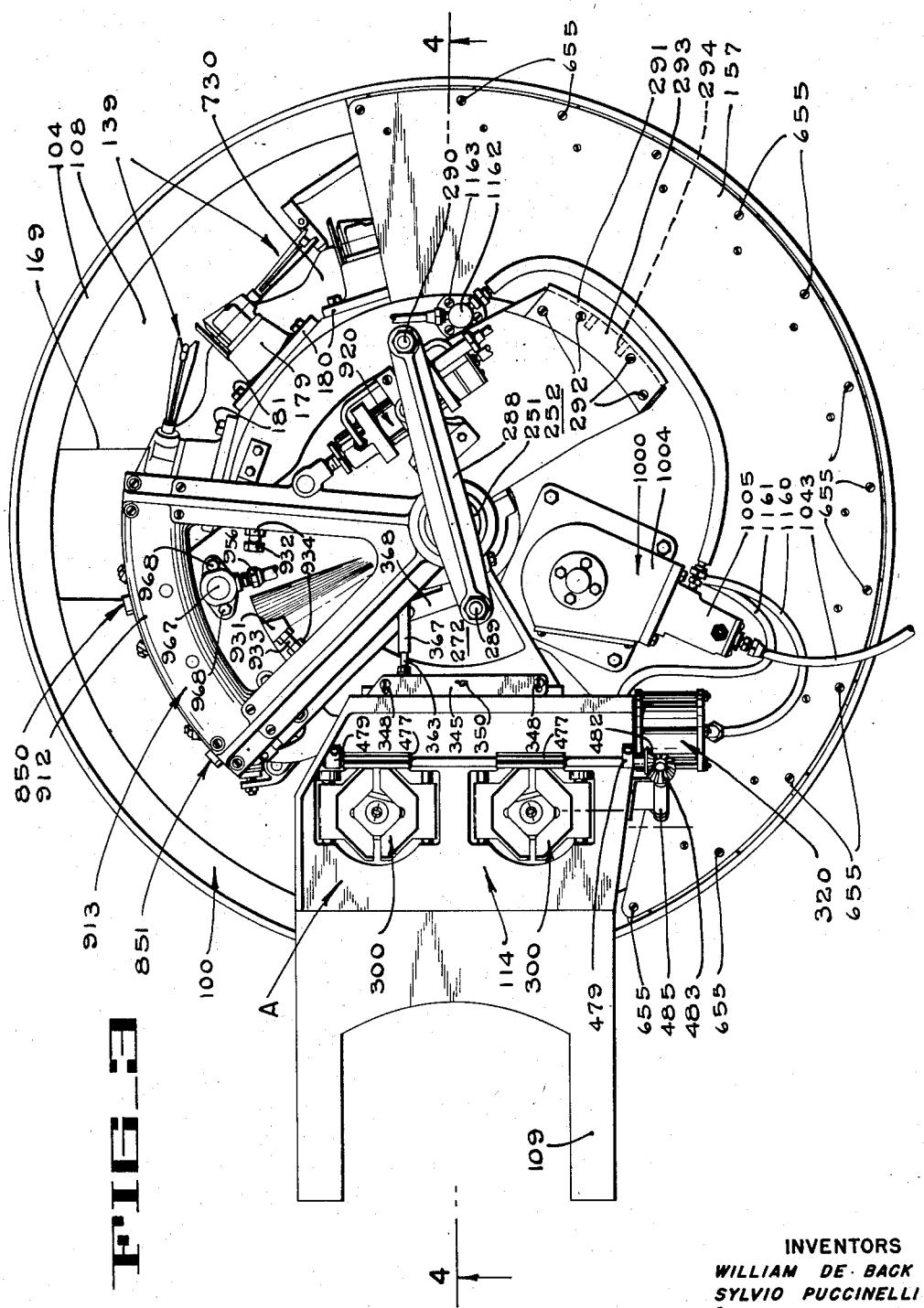

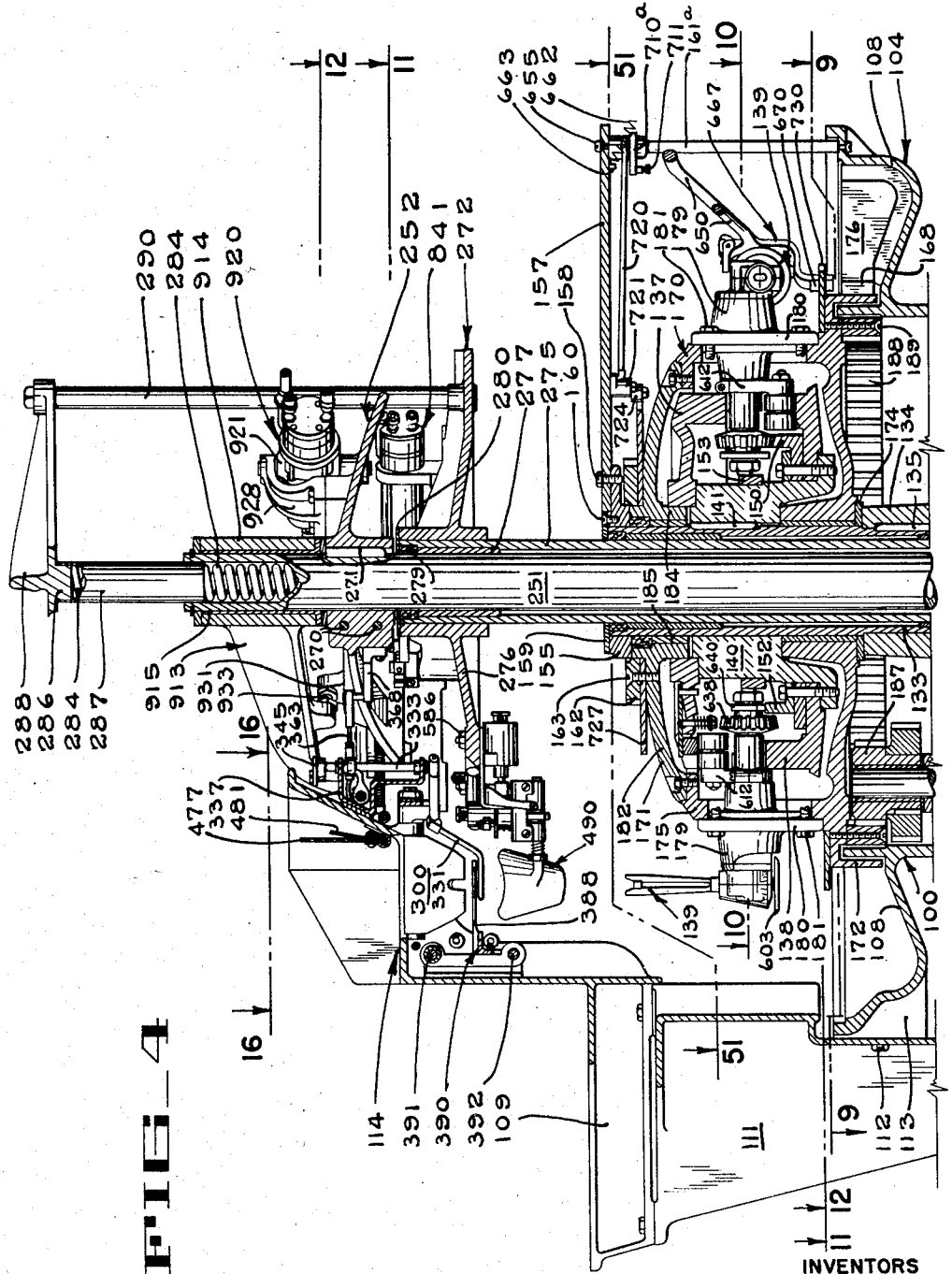
FIG_4

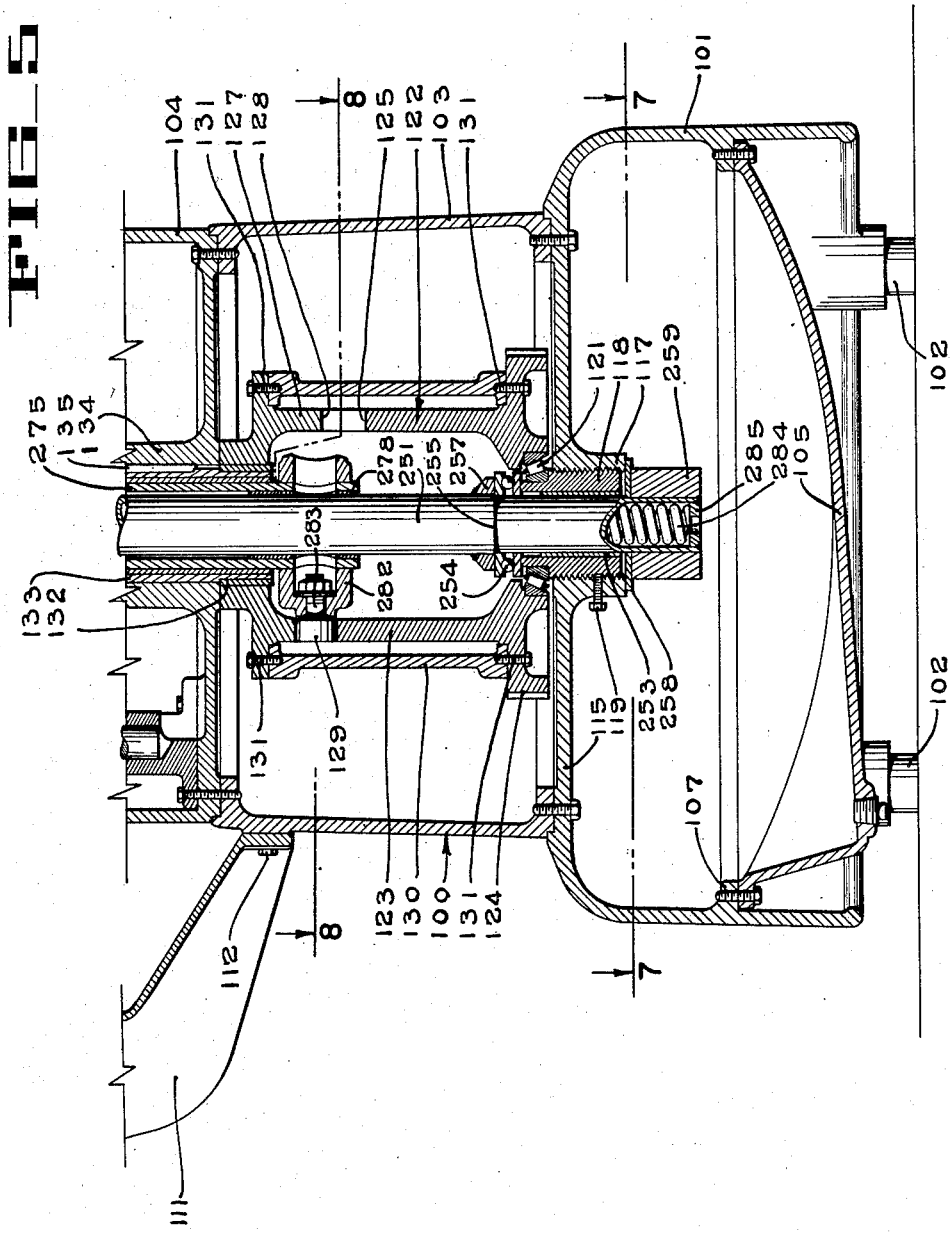

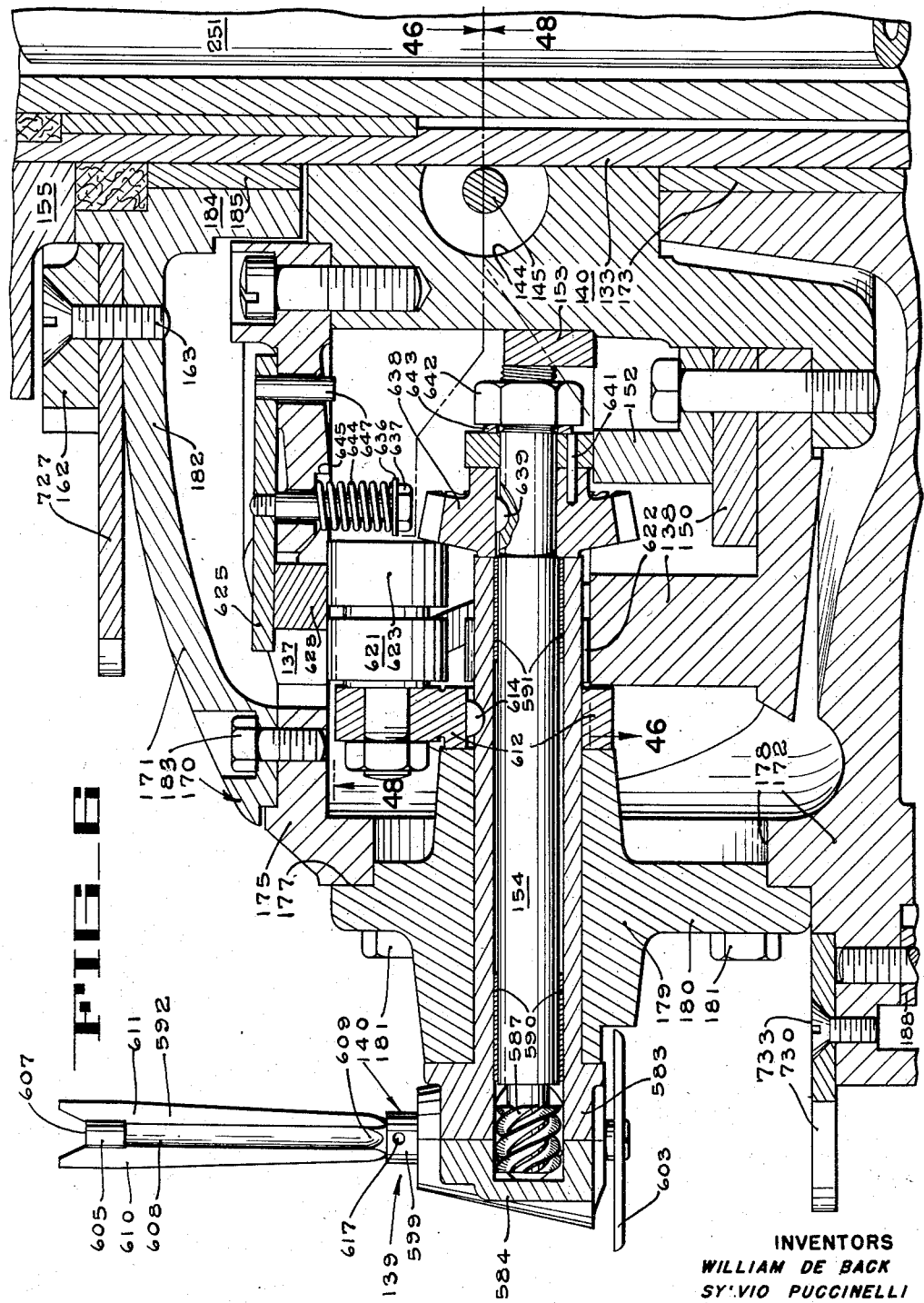

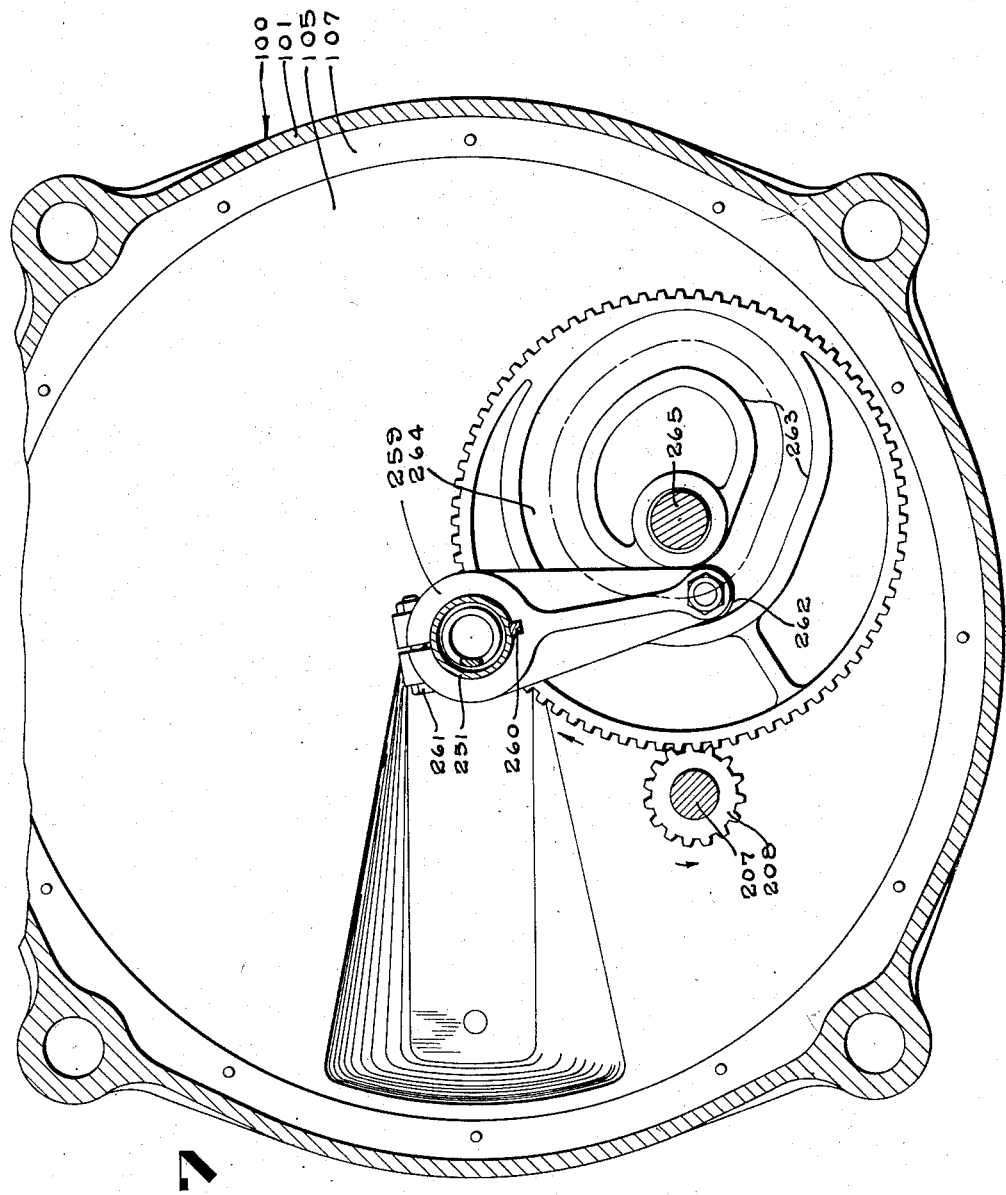

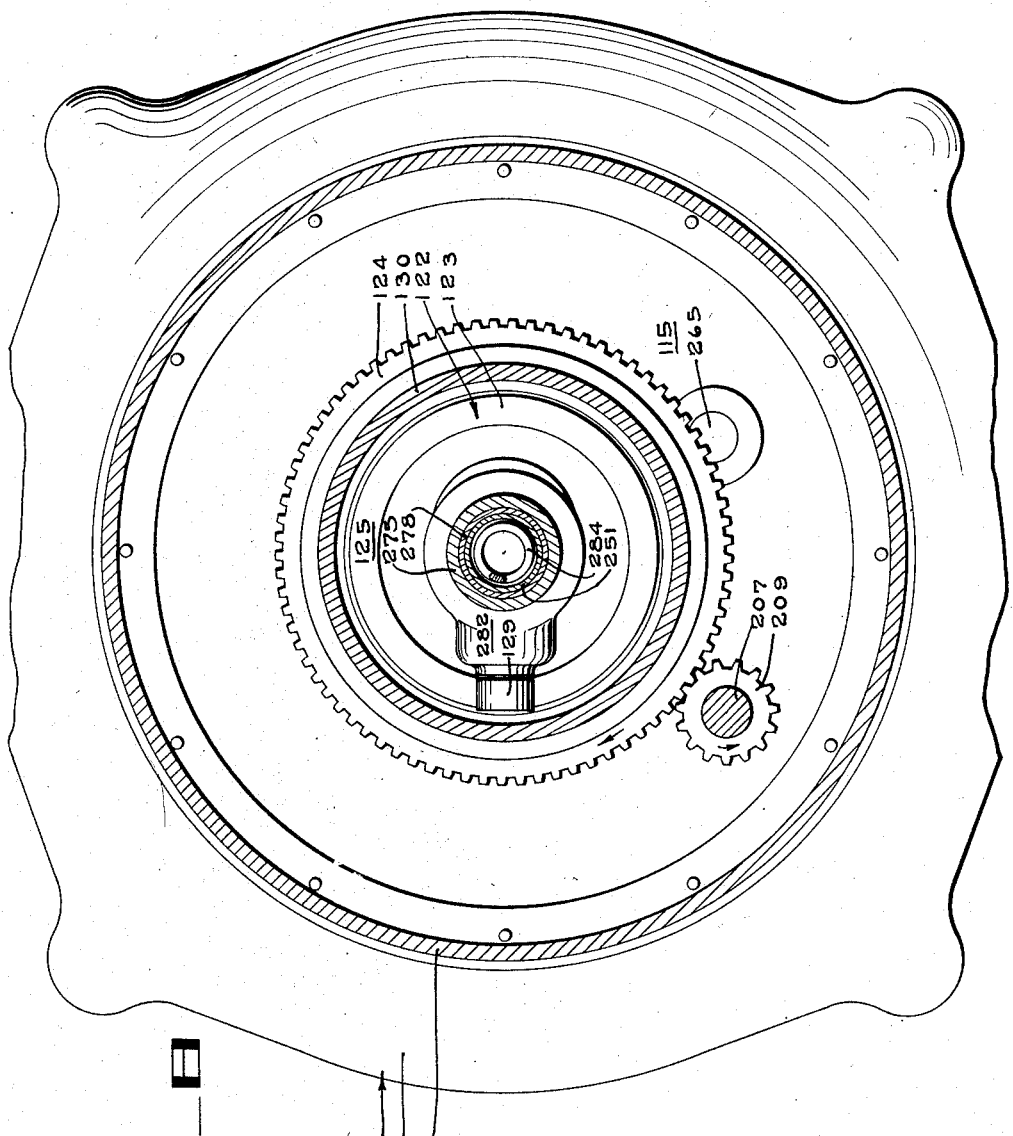

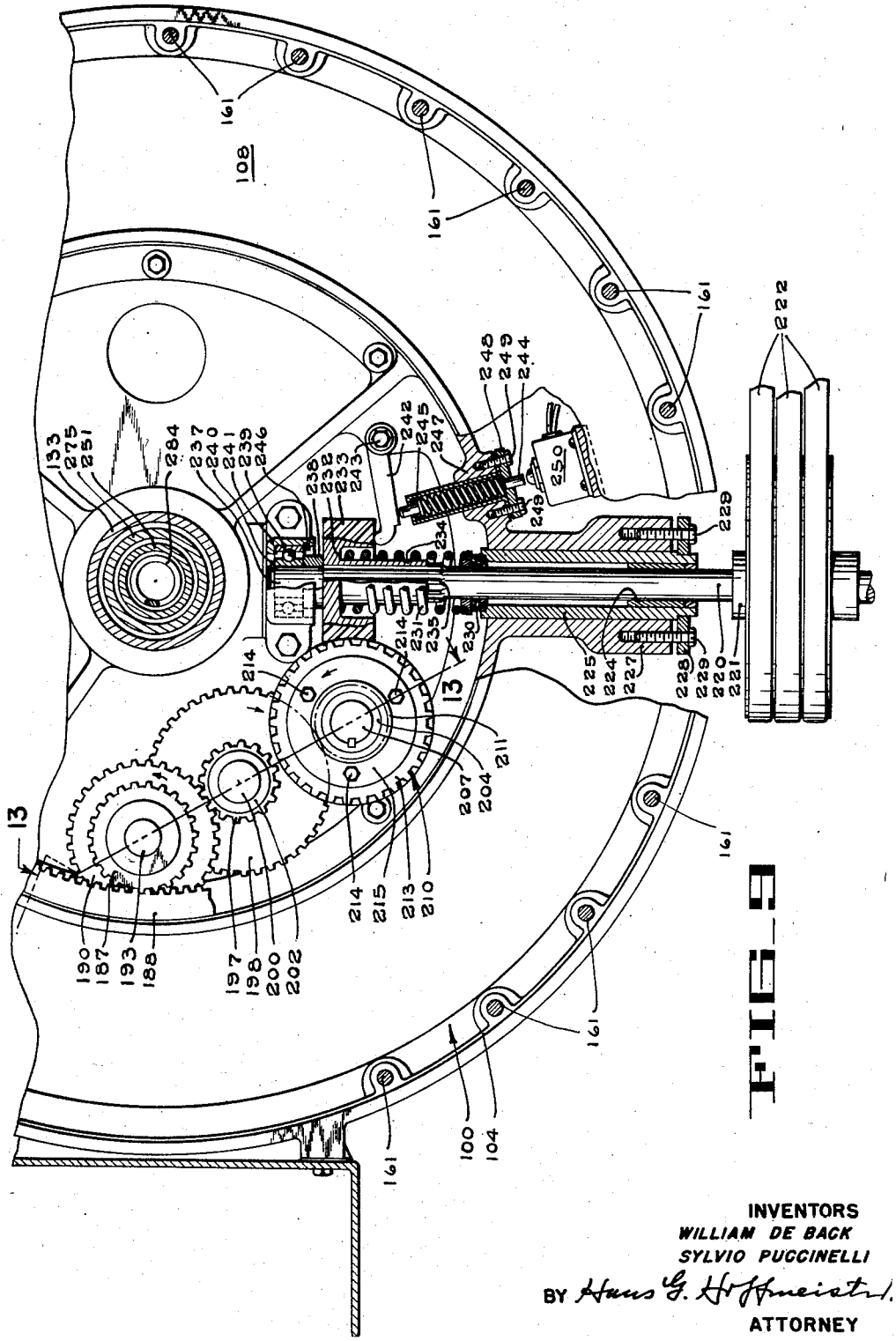

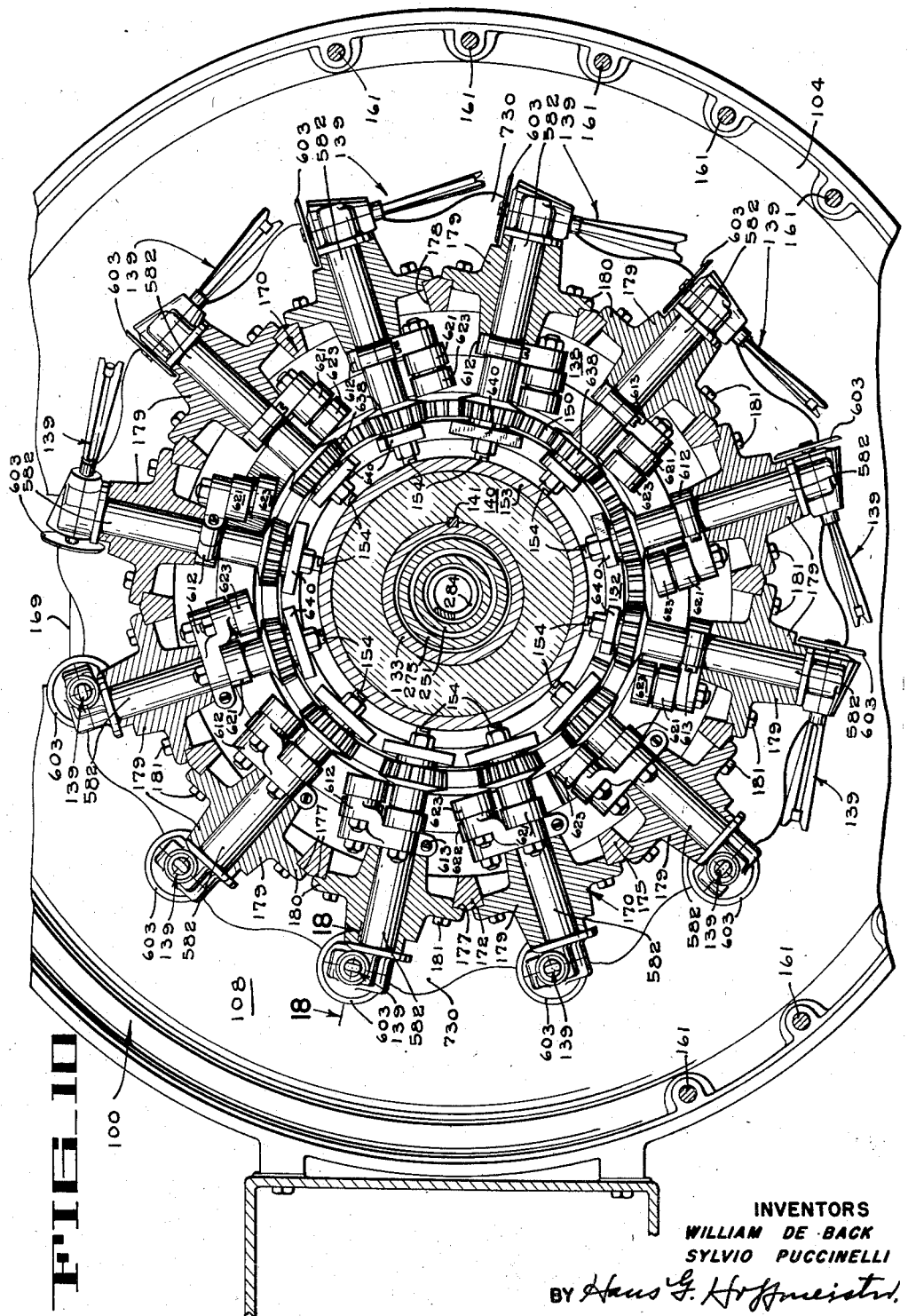

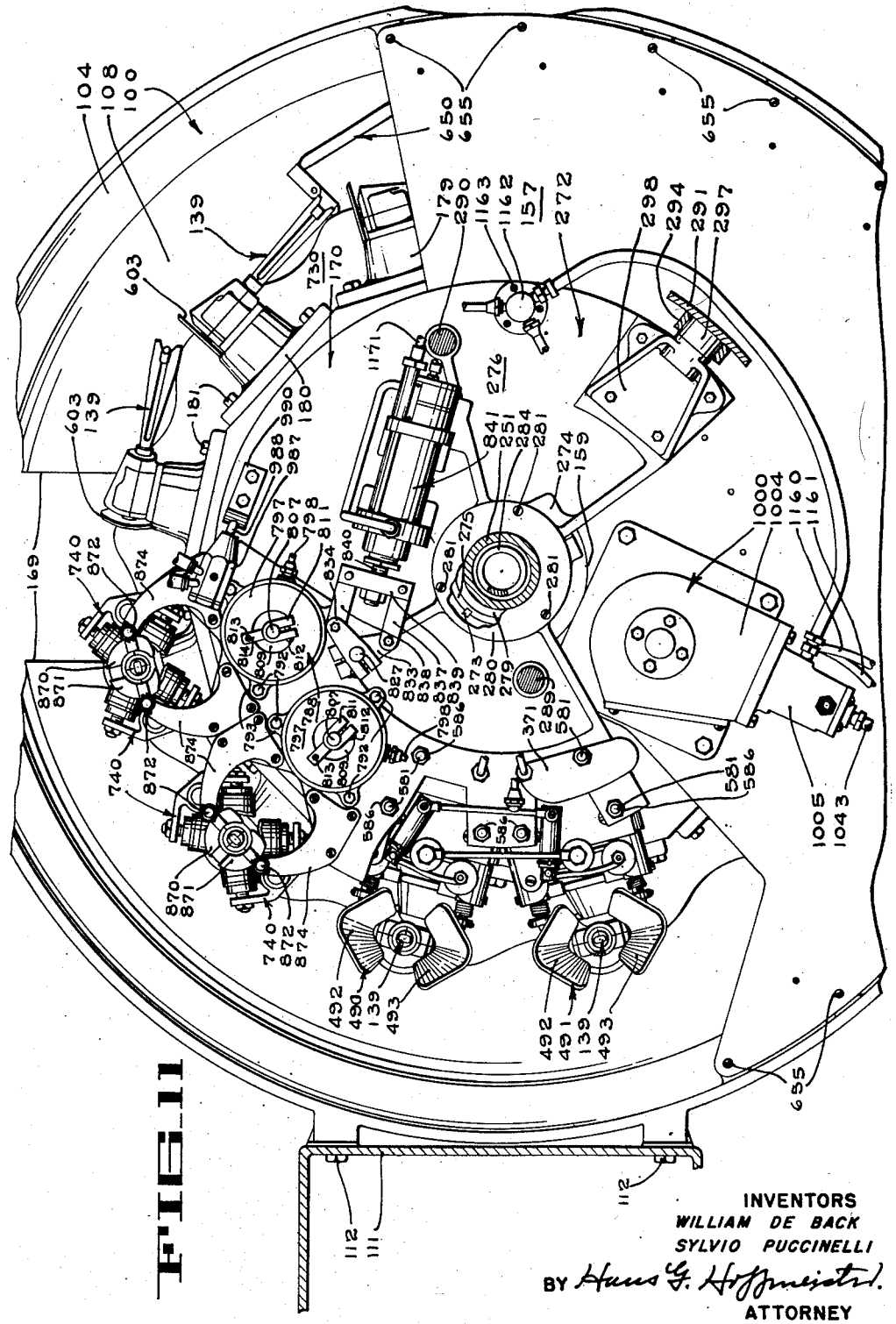

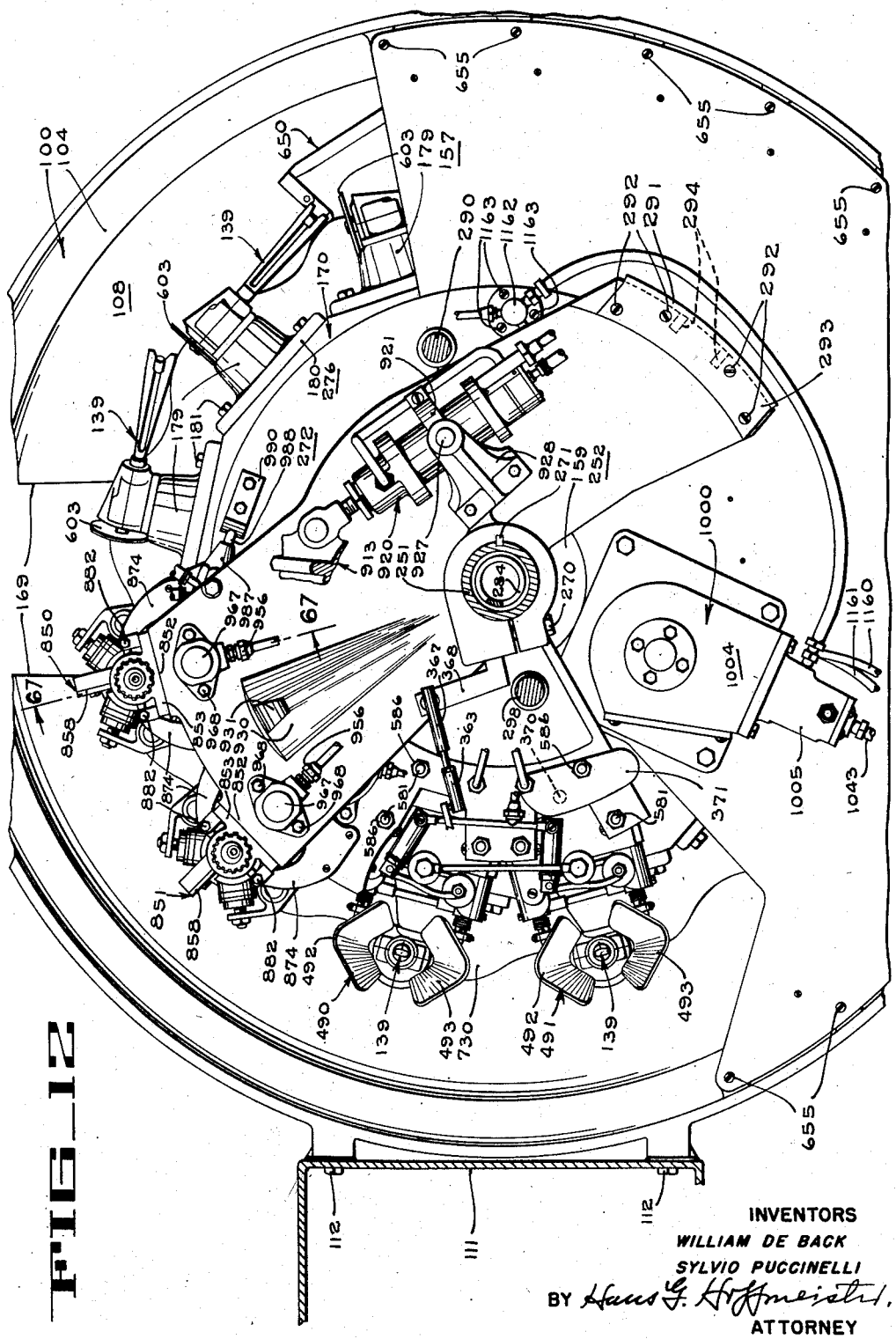

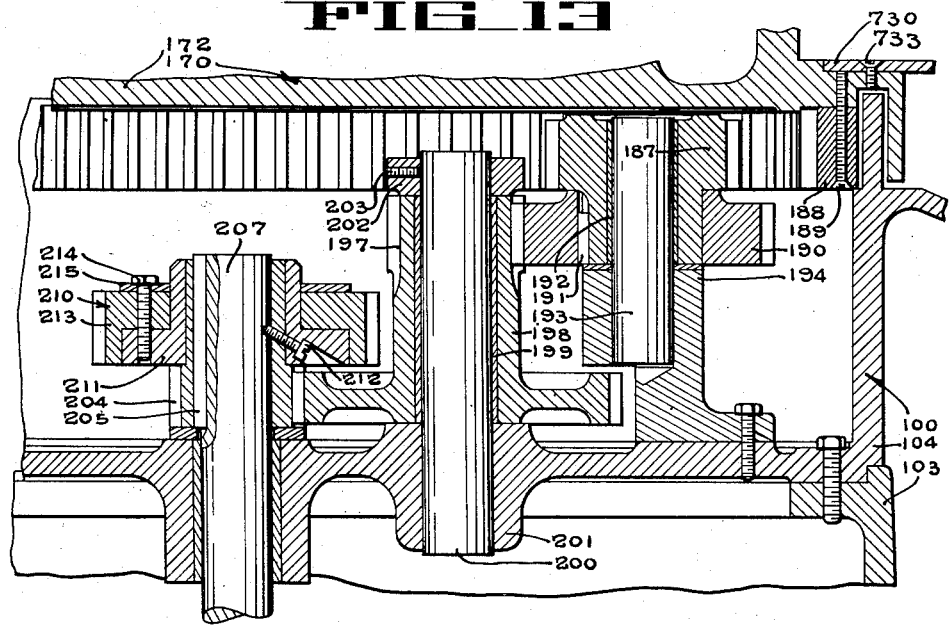
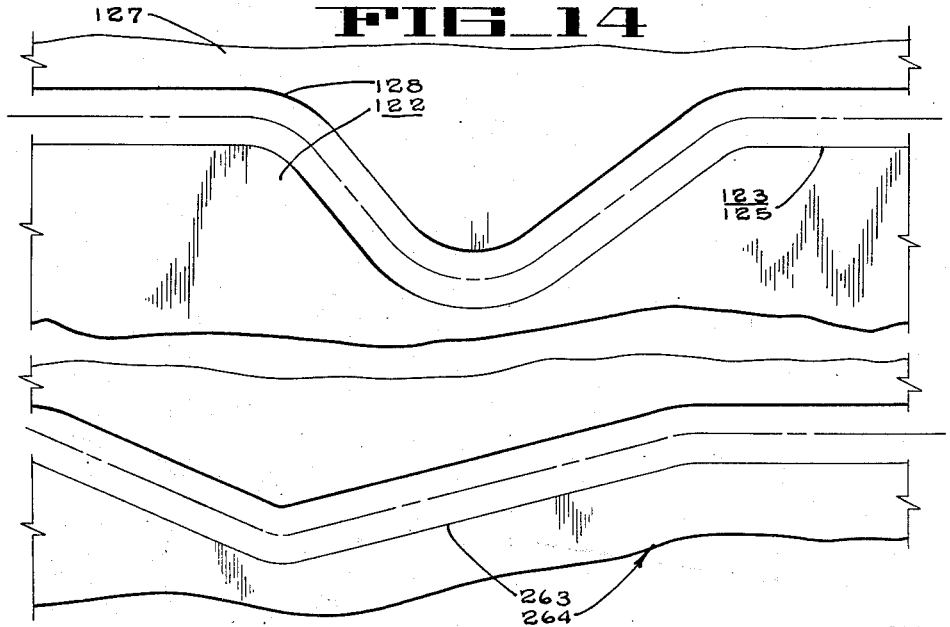

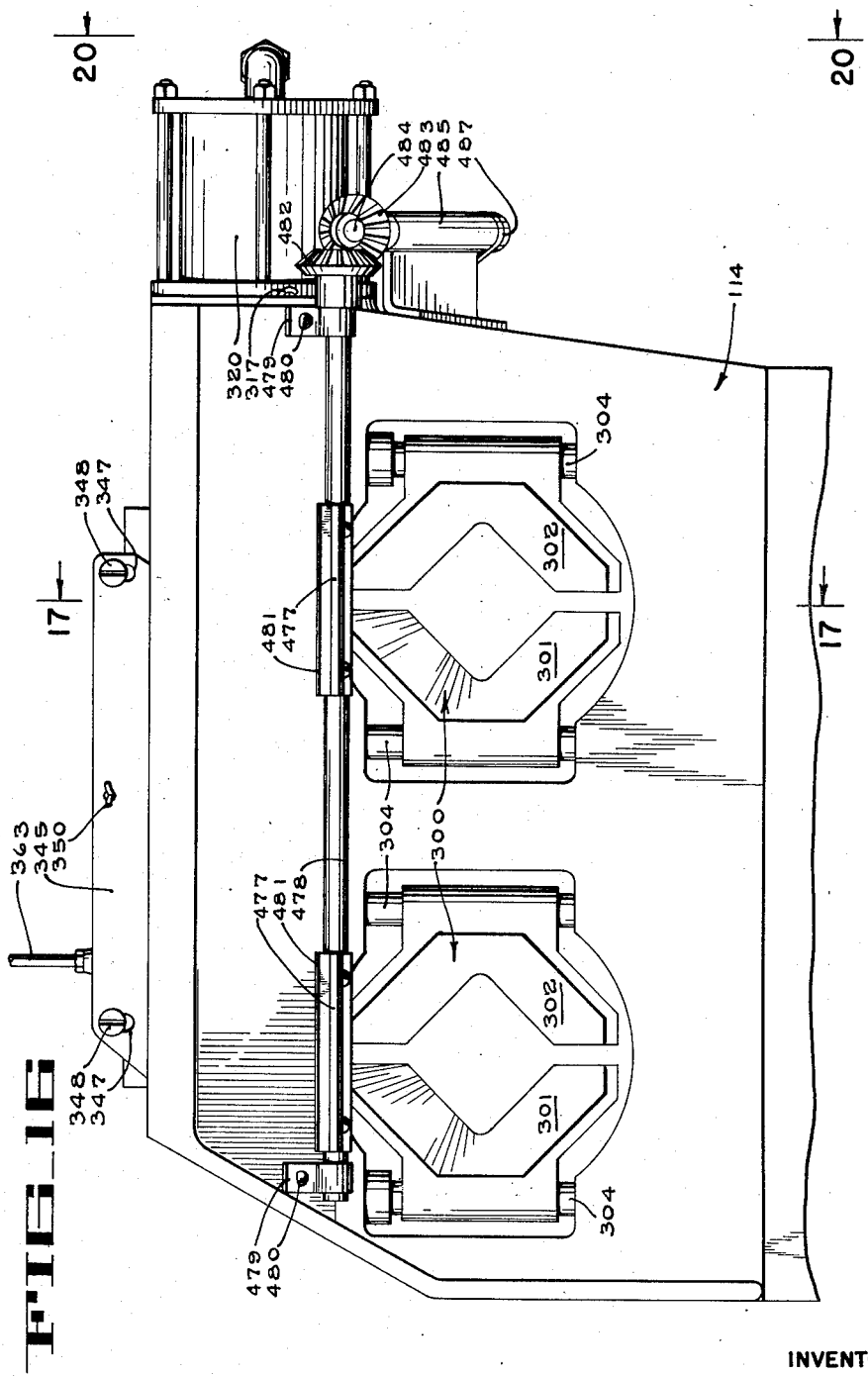

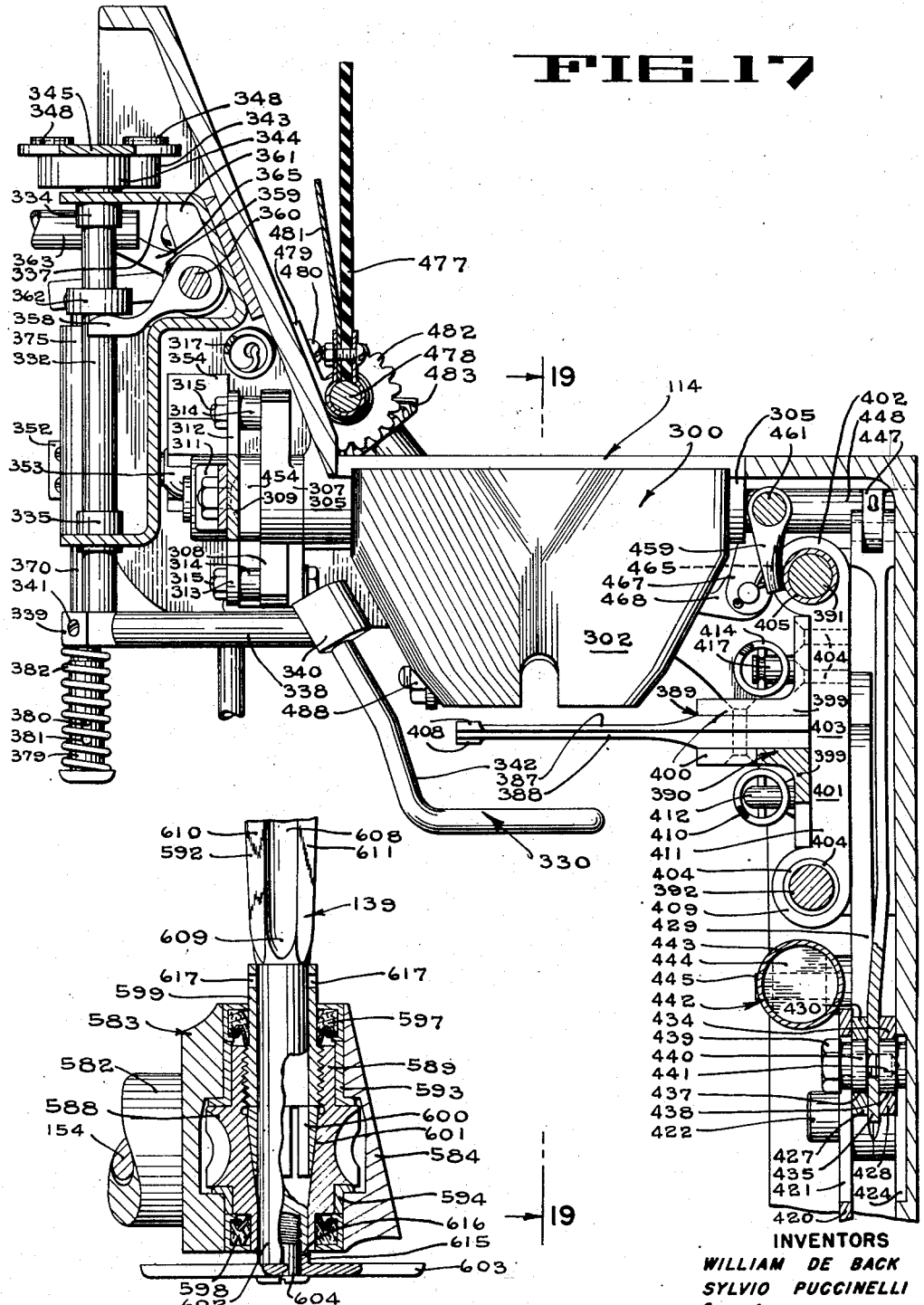

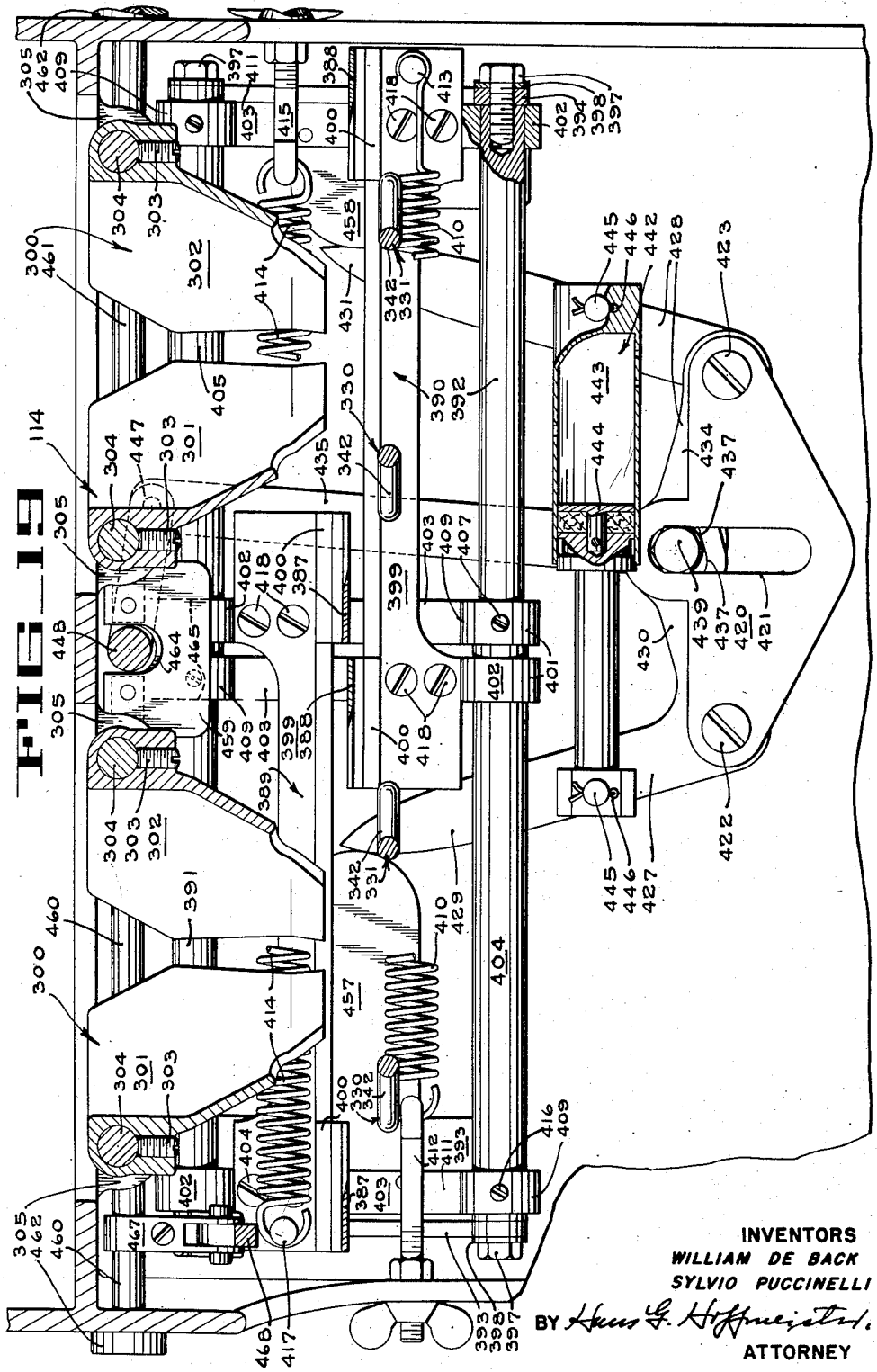

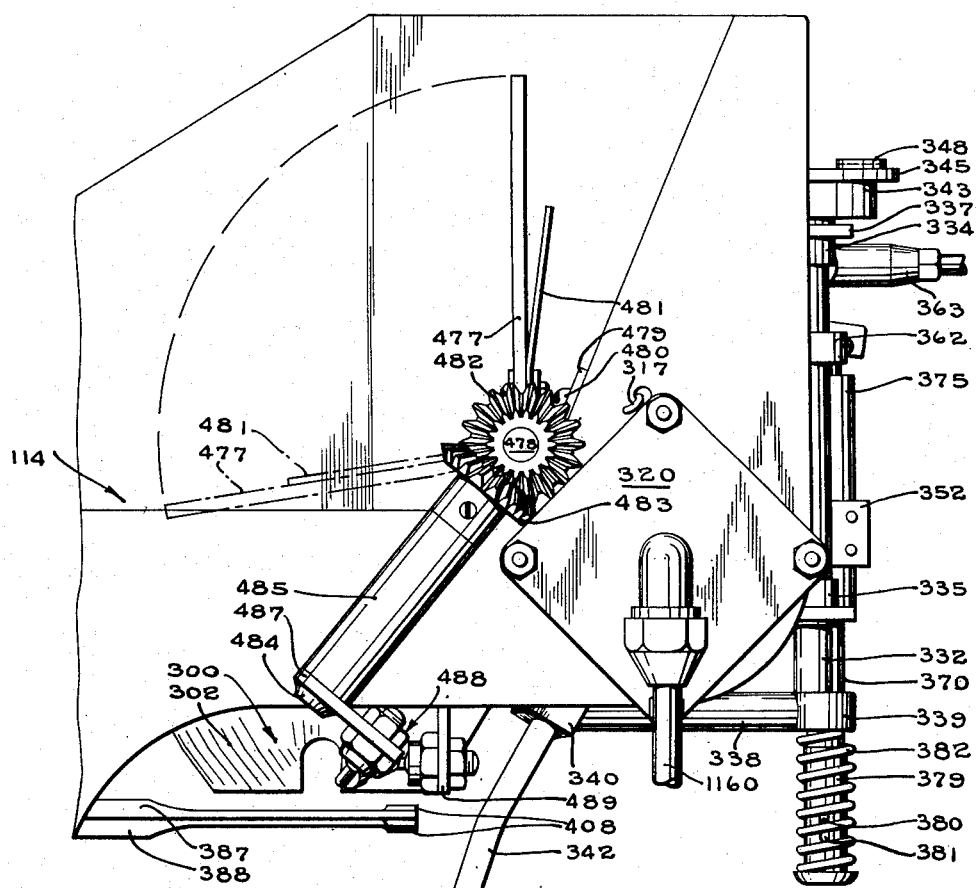
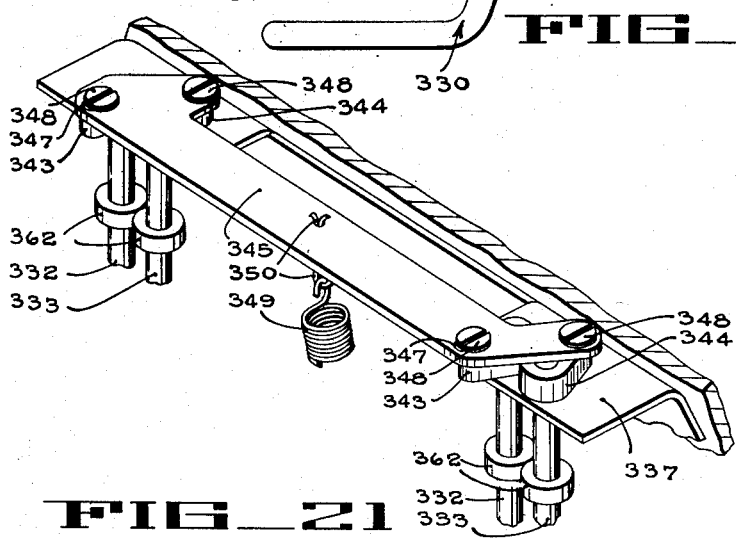

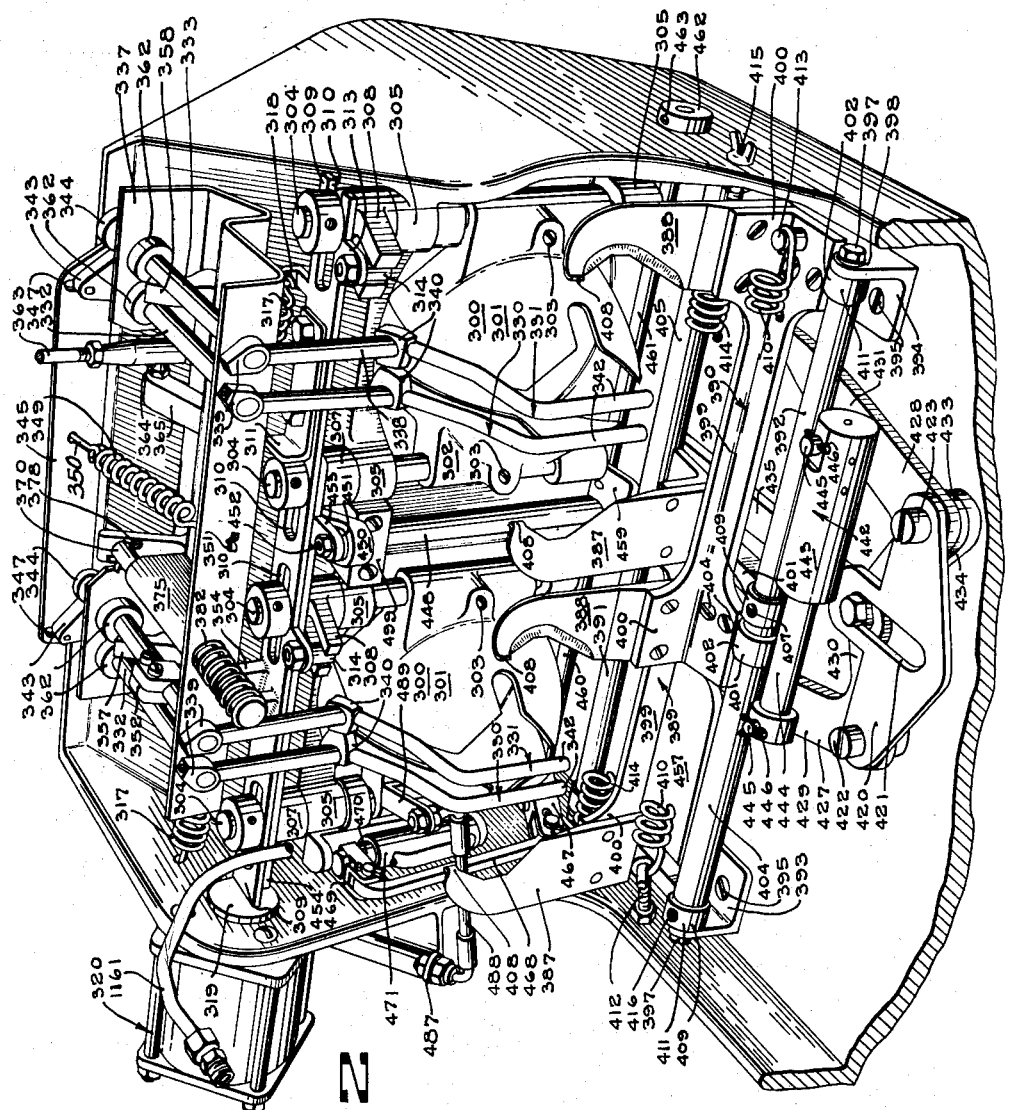

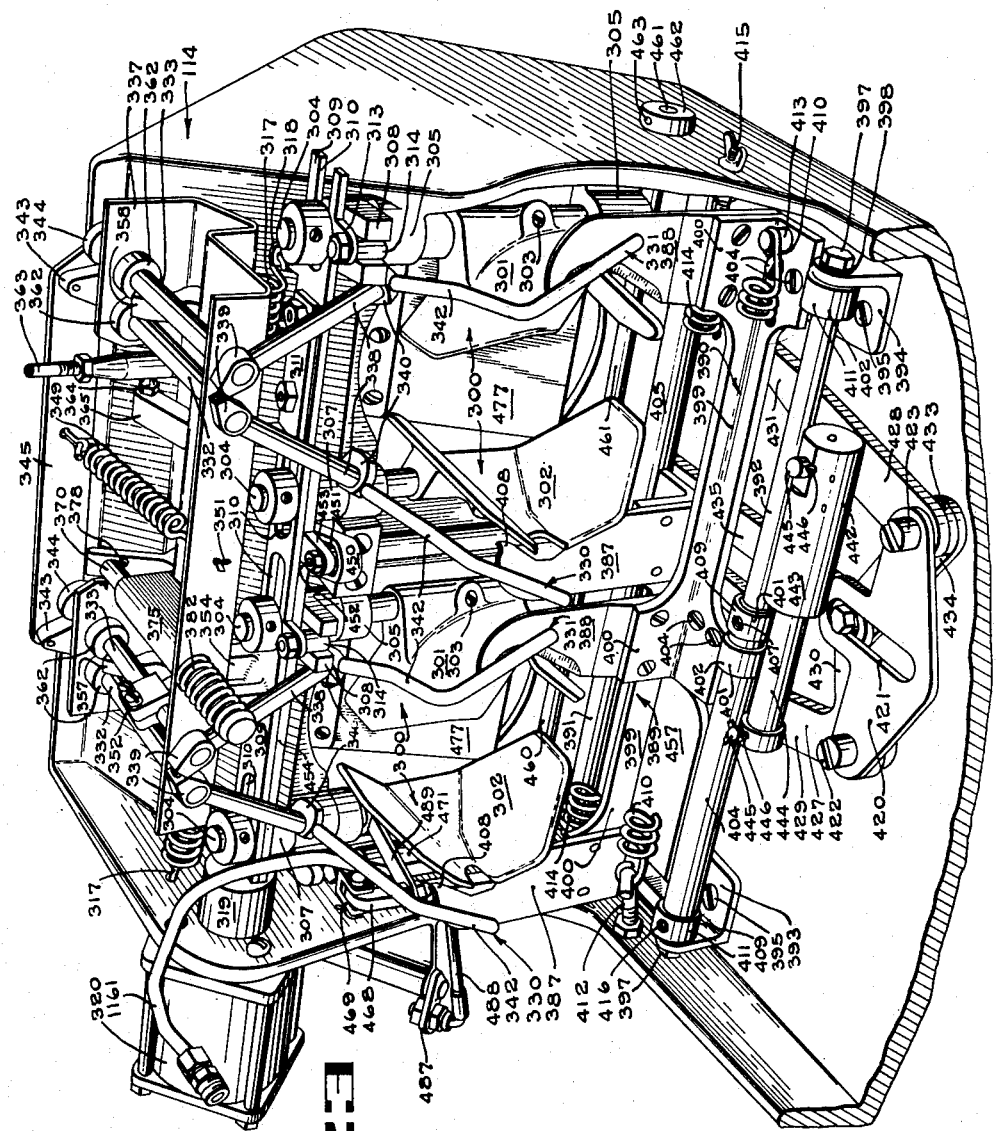
FIG_23

FIG_26
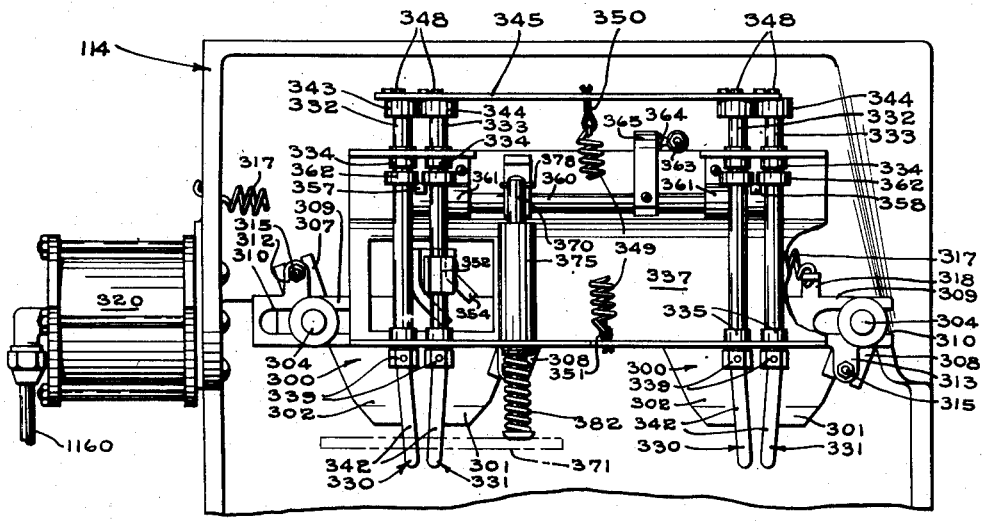
FIG_27
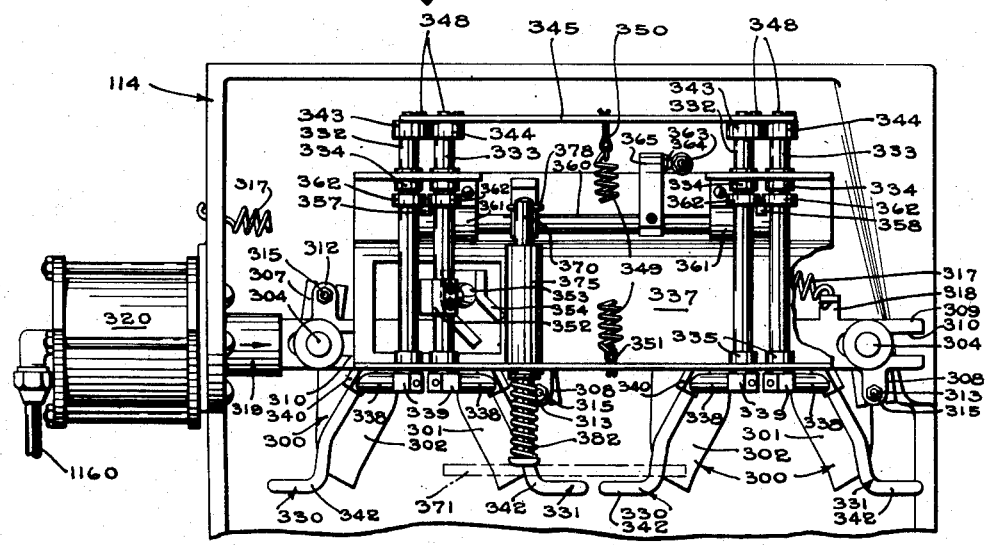
INVENTORS
WILLIAM DE BACK
SYLVIO PUCCINELLI
BY Hans G. Hoffmeister
ATTORNEY

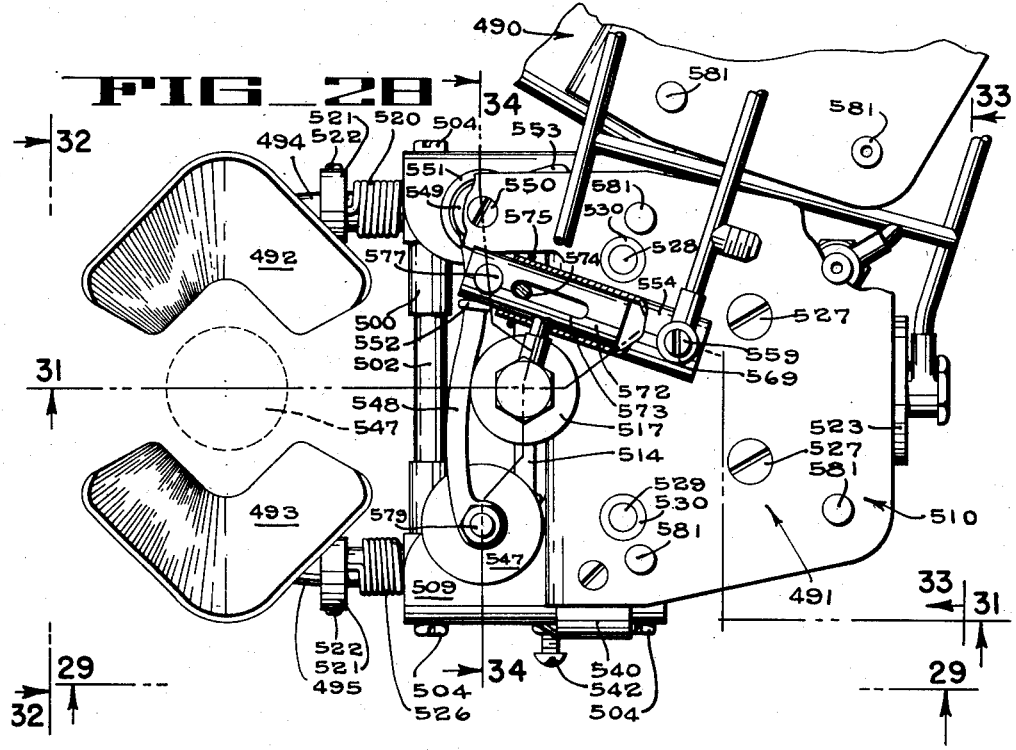
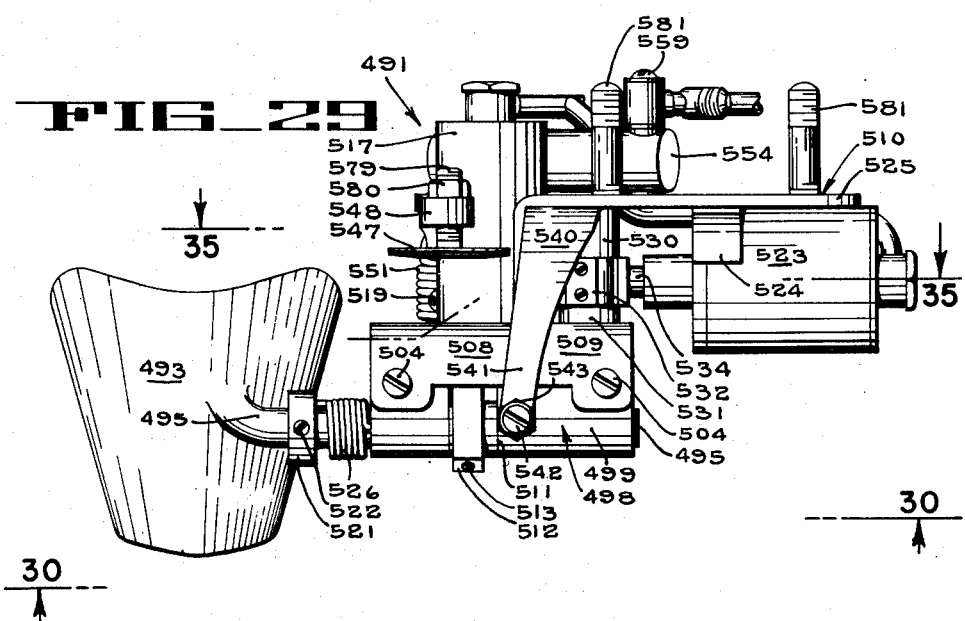

Jan. 11, 1955 W. DE BACK ET AL 2,699,191
FEEDING, STEM END TRIMMING, AND TRANSFER MEANS FOR
ROTARY TURRET TYPE FRUIT PREPARATION MACHINES
Filed Sept. 6, 1949 47 Sheets-Sheet 23
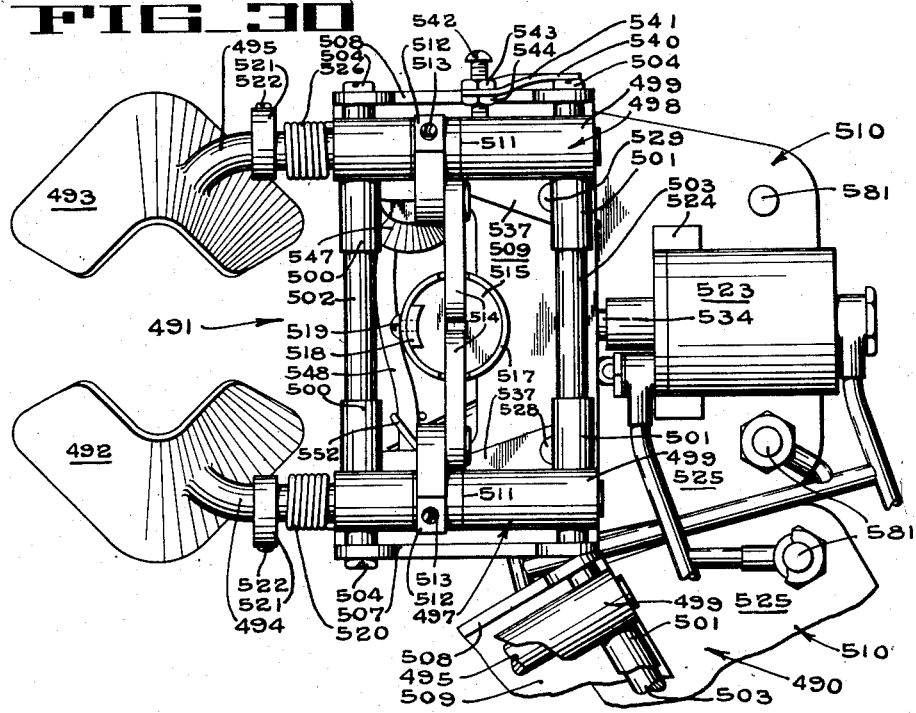
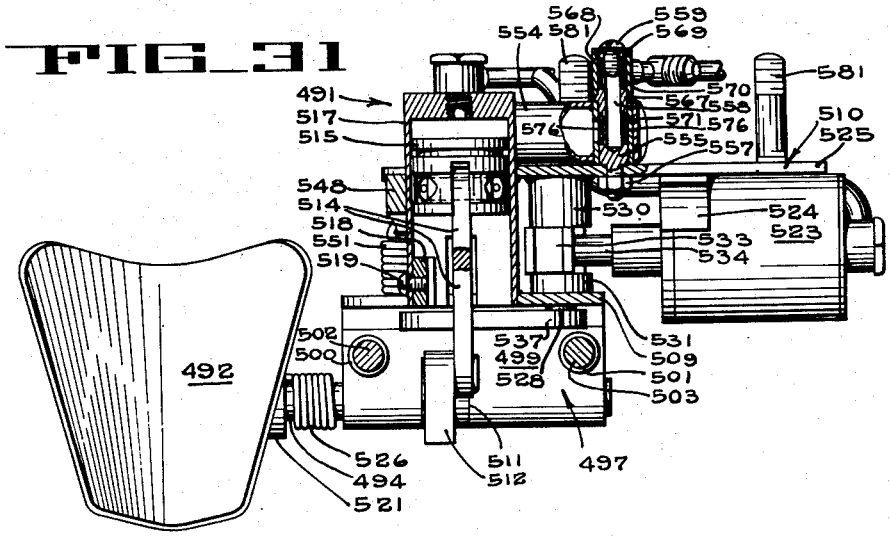
INVENTORS
WILLIAM DE BACK
SYLVIO PUCCINELLI
ATTORNEY

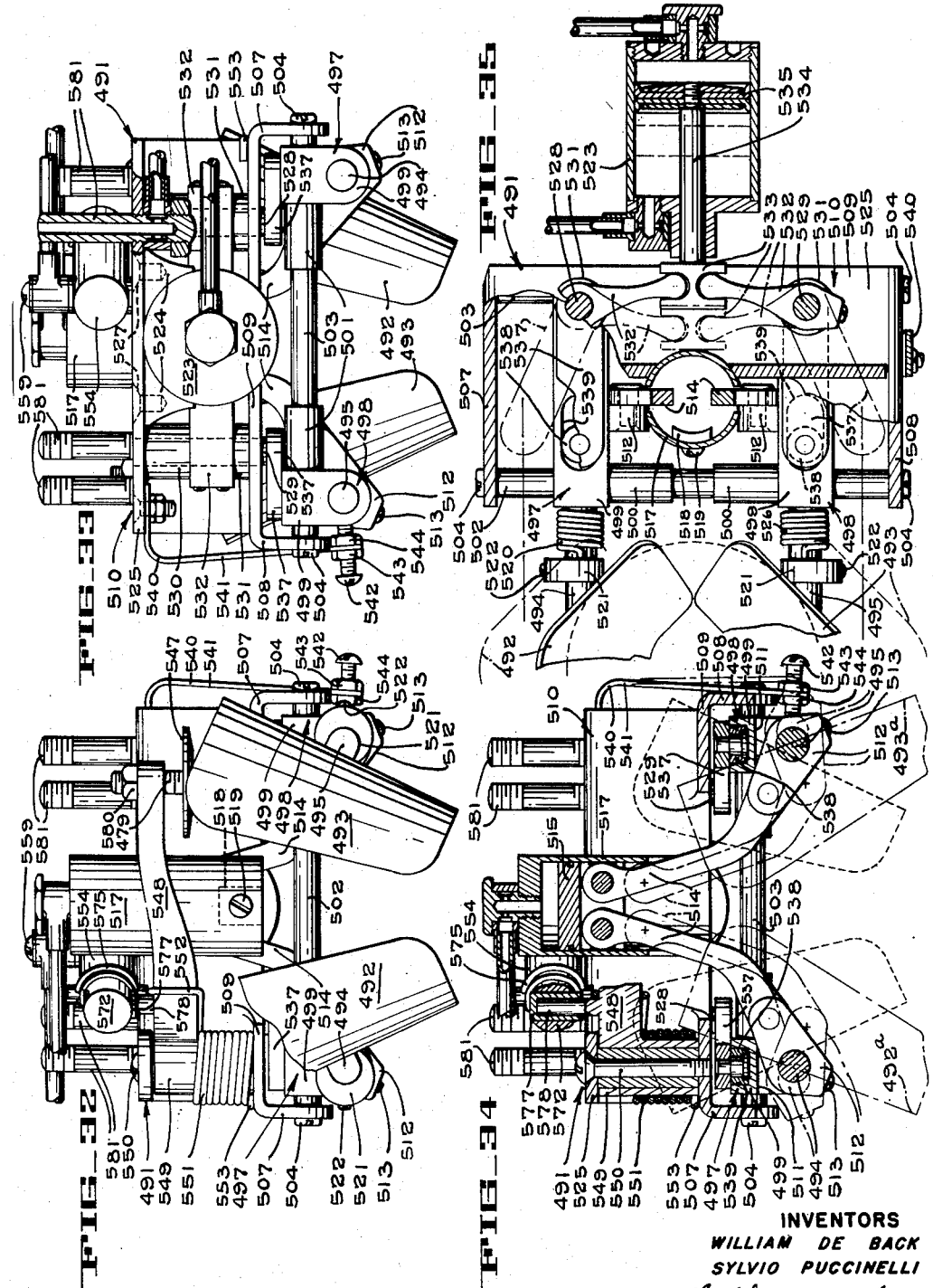

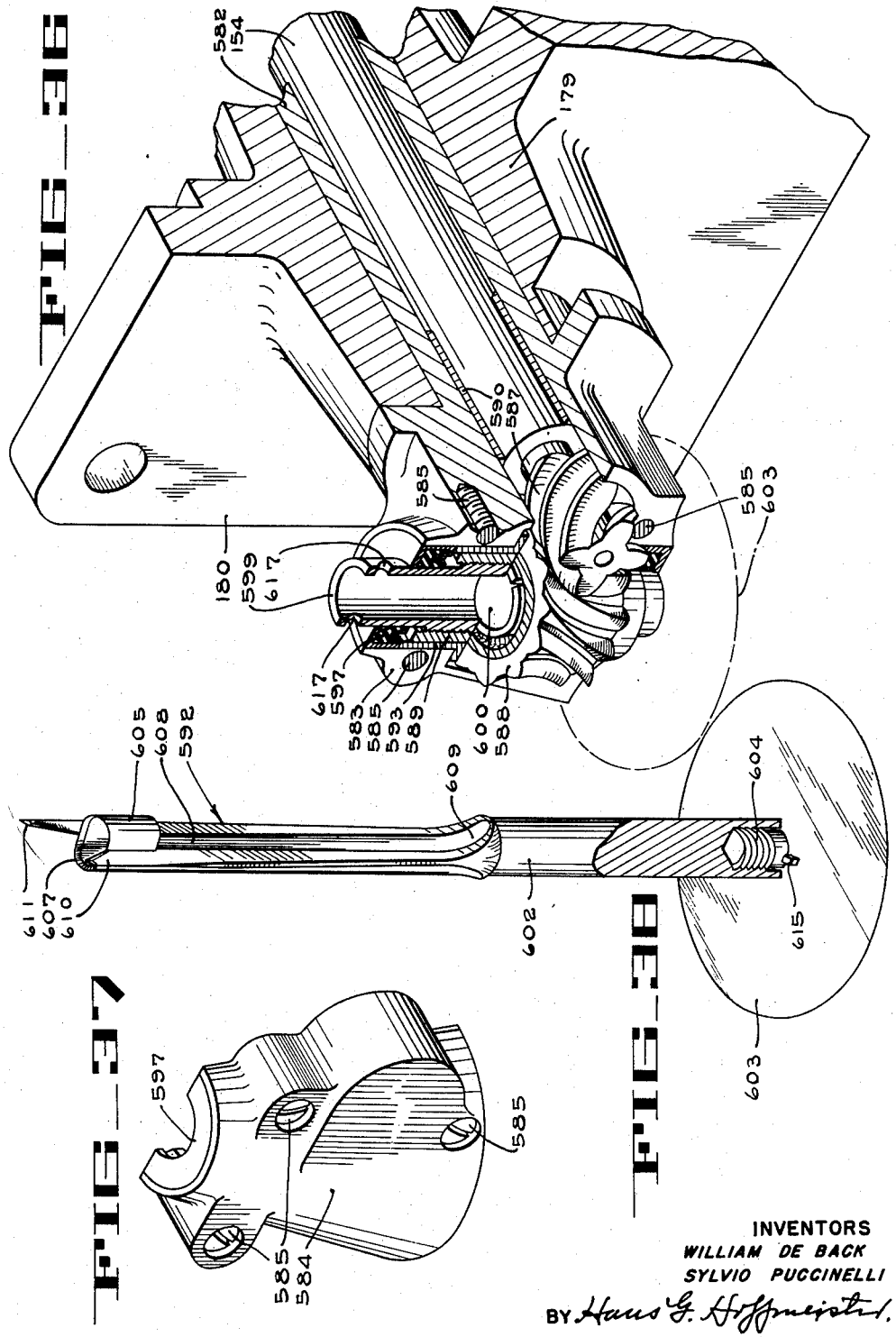

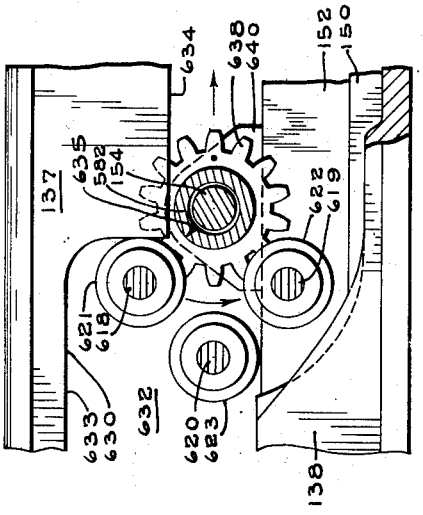
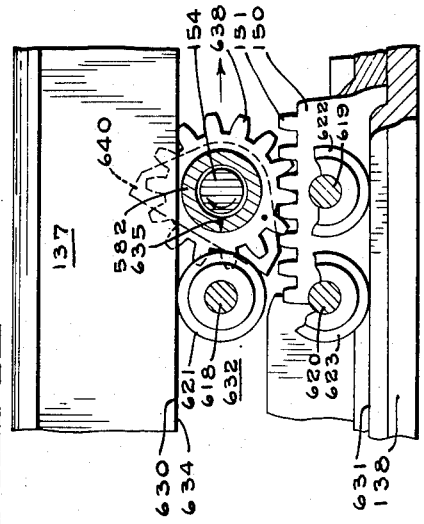
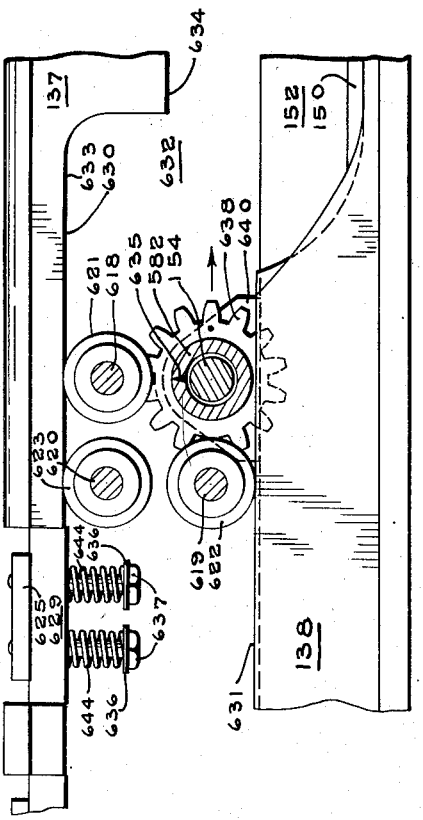
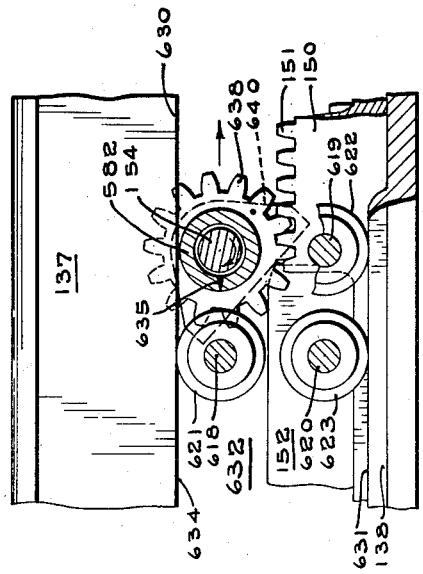
INVENTORS
WILLIAM DE BACK
SYLVIO PUCCINELLI
ATTORNEY

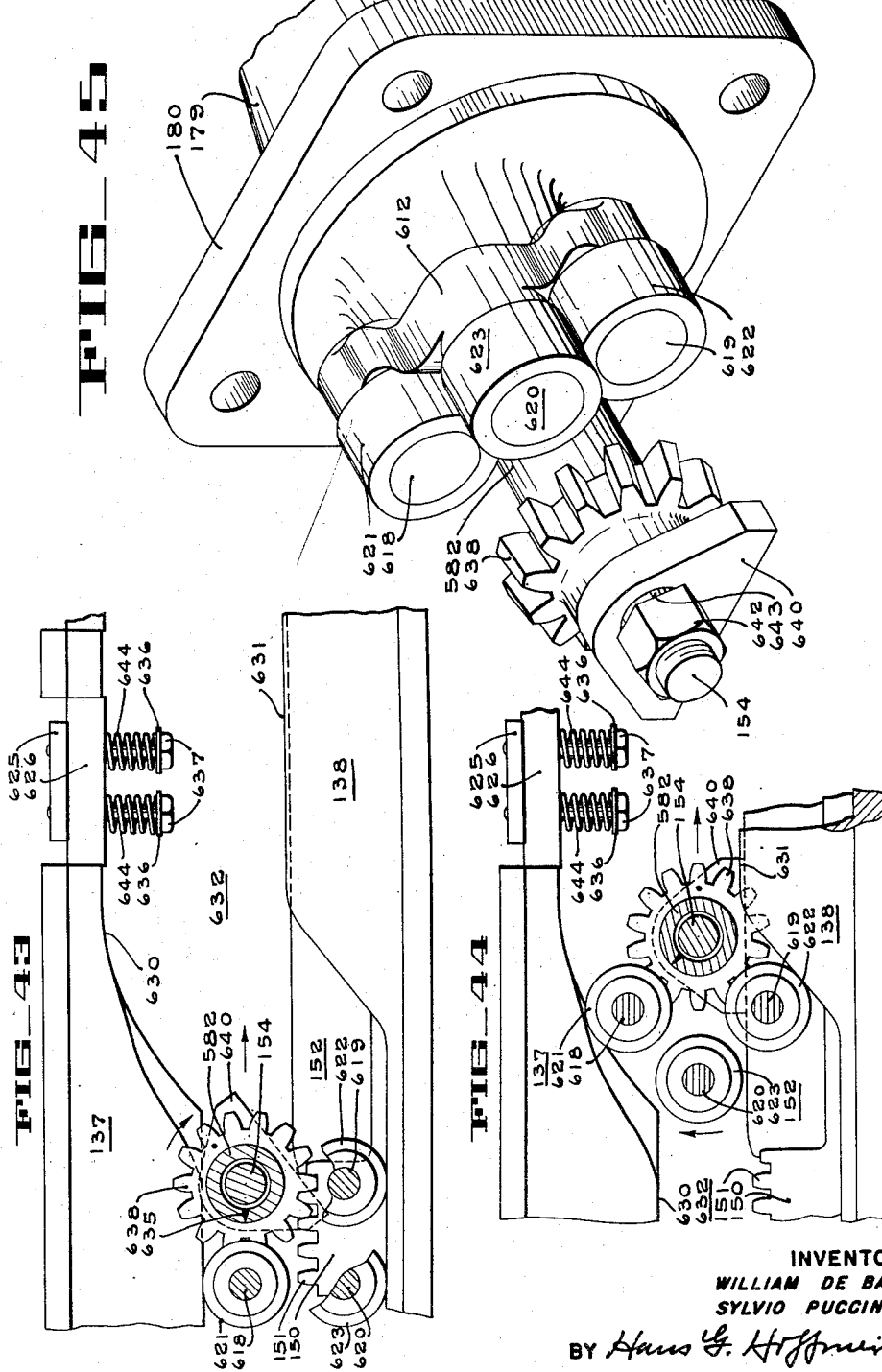

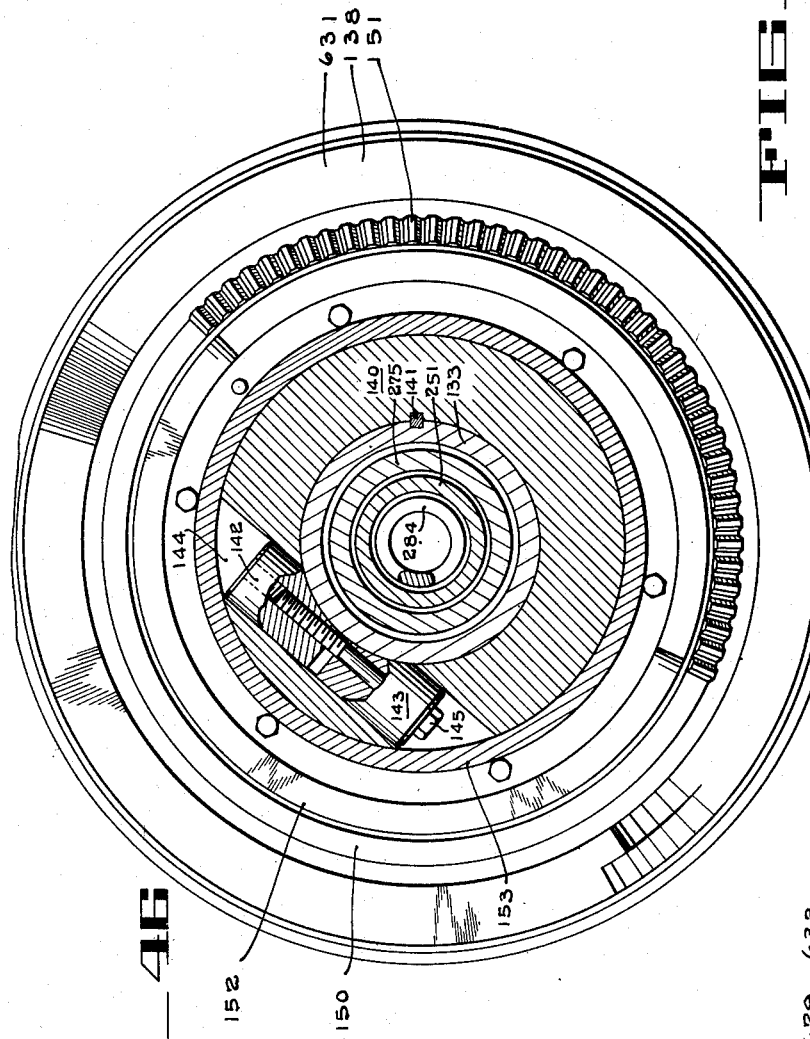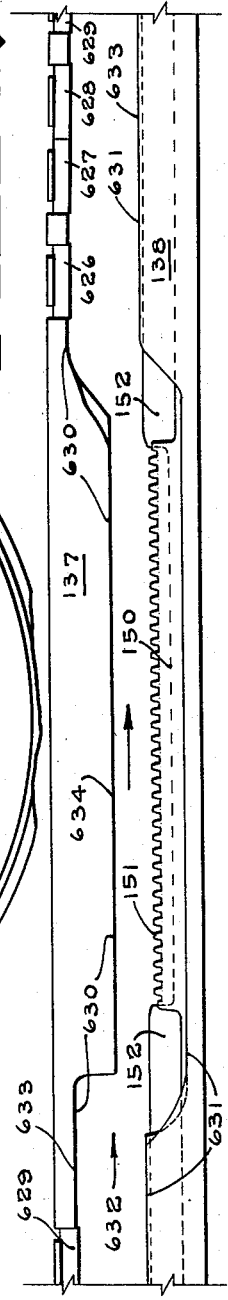

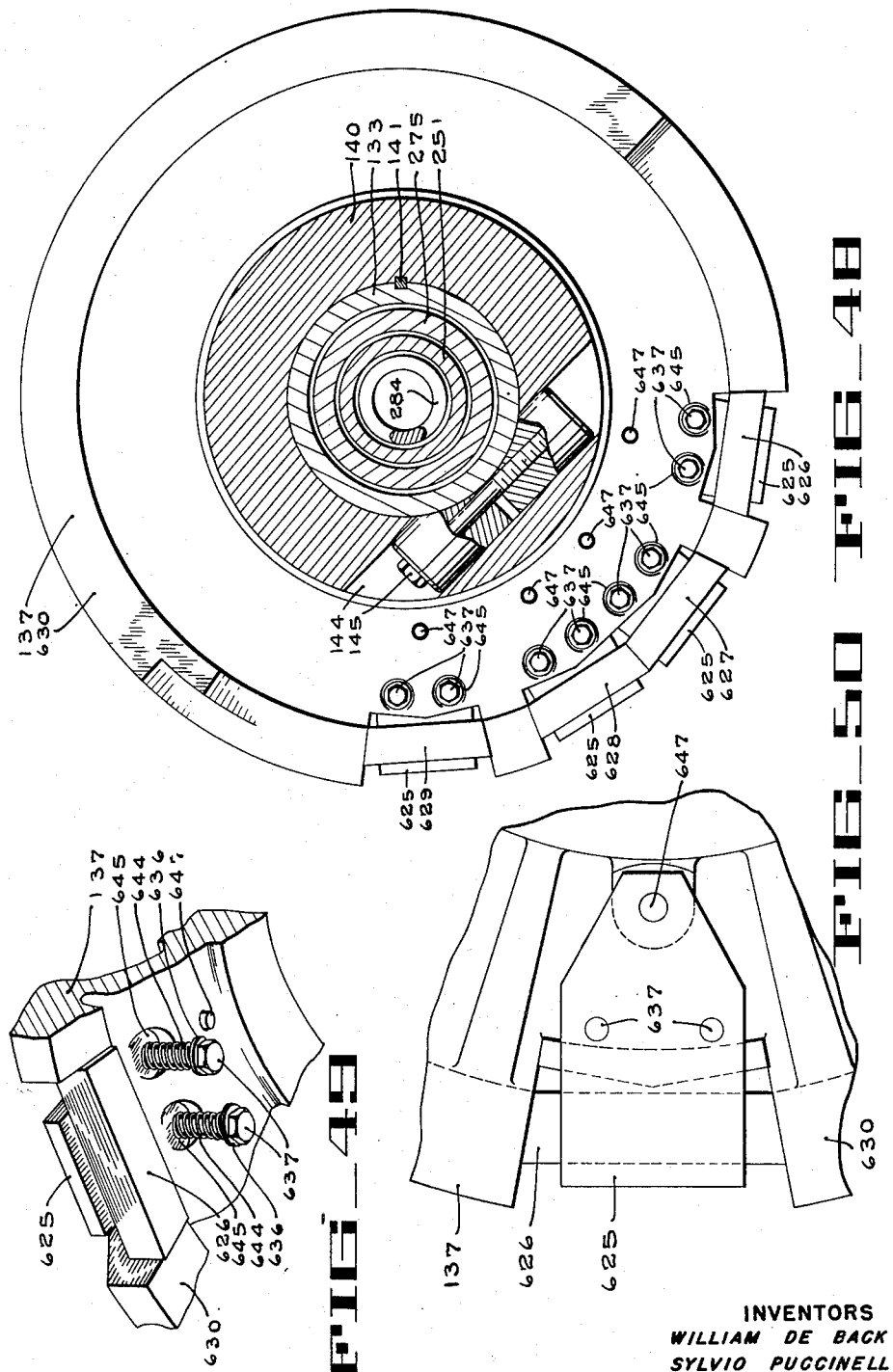

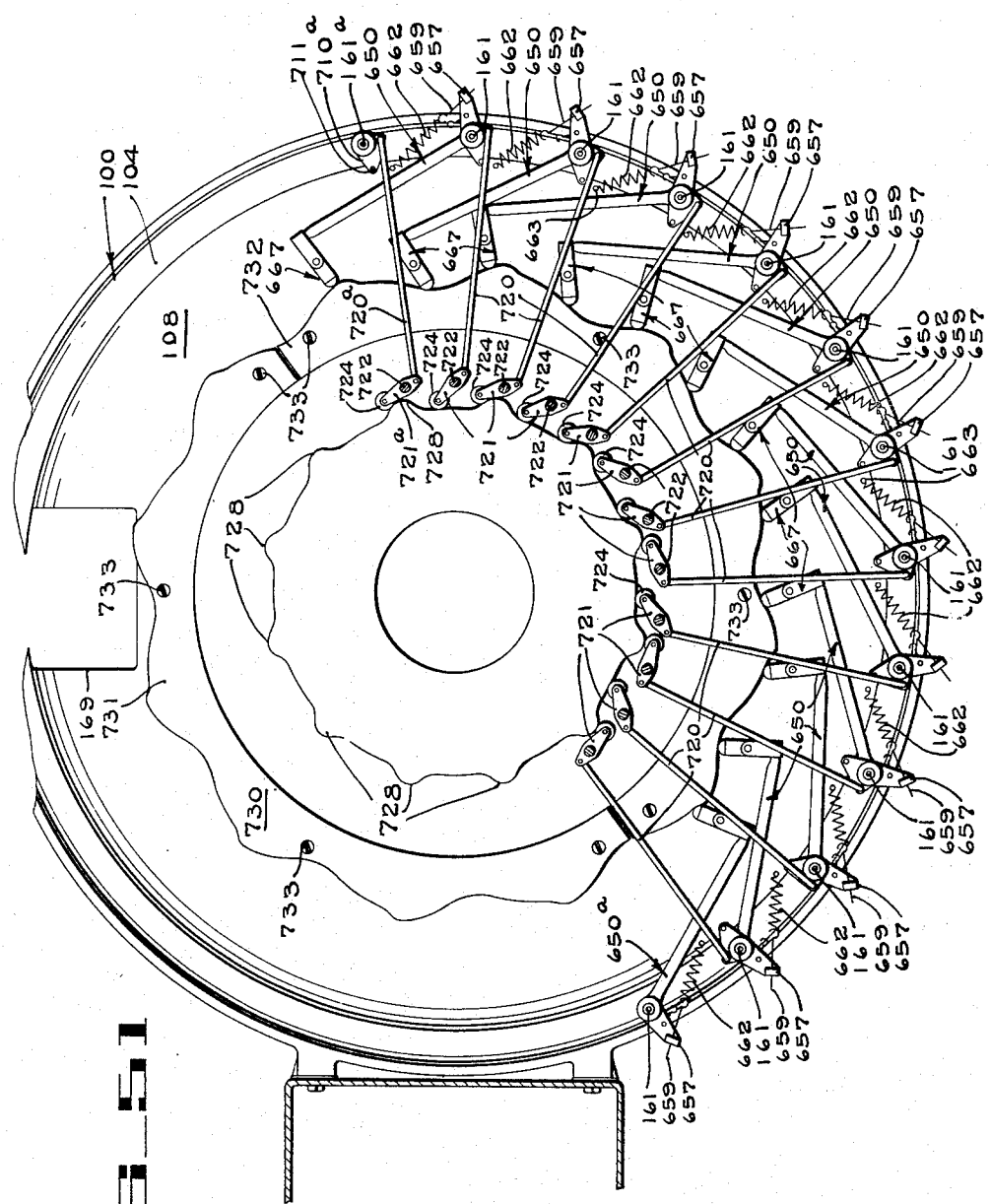

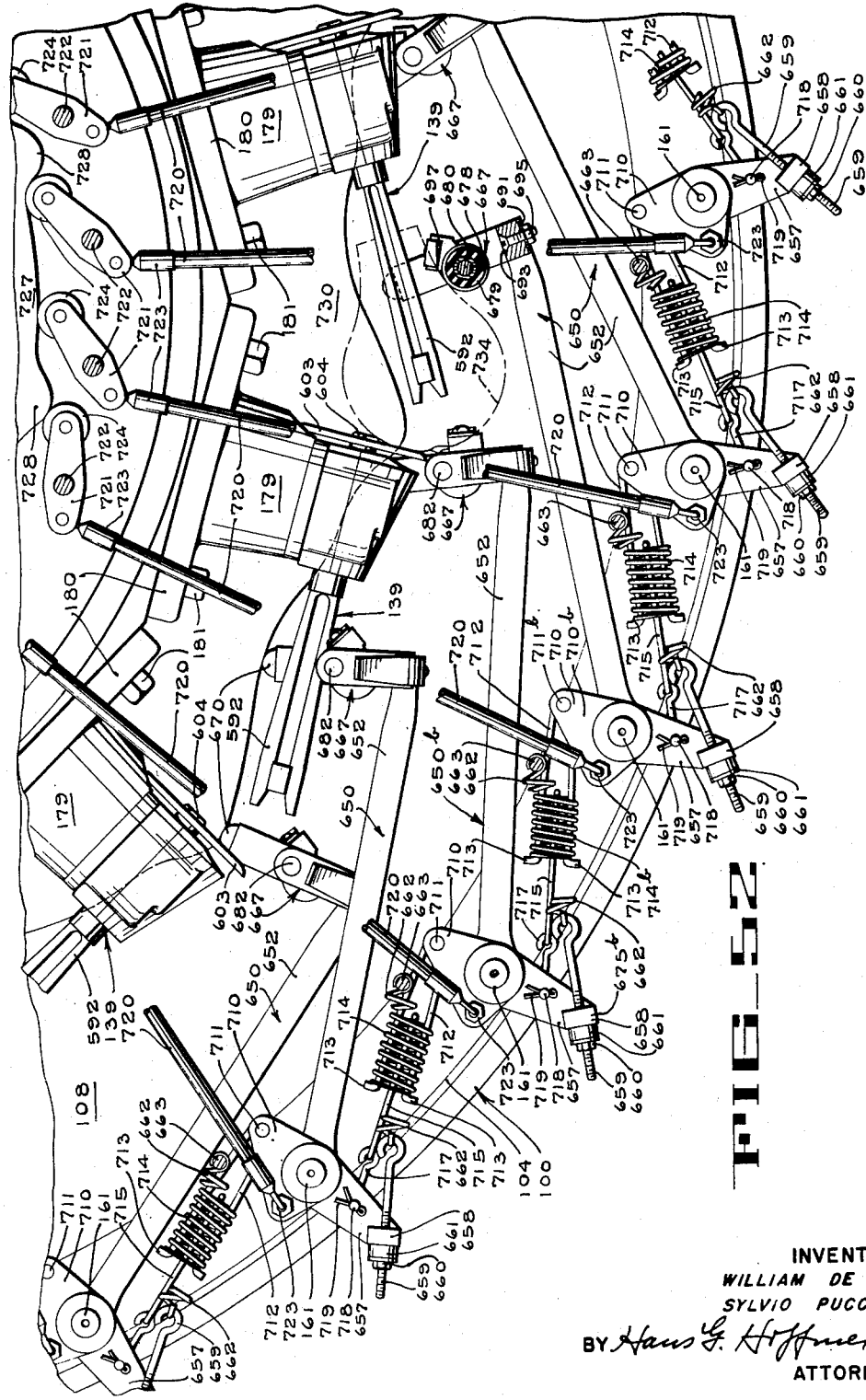

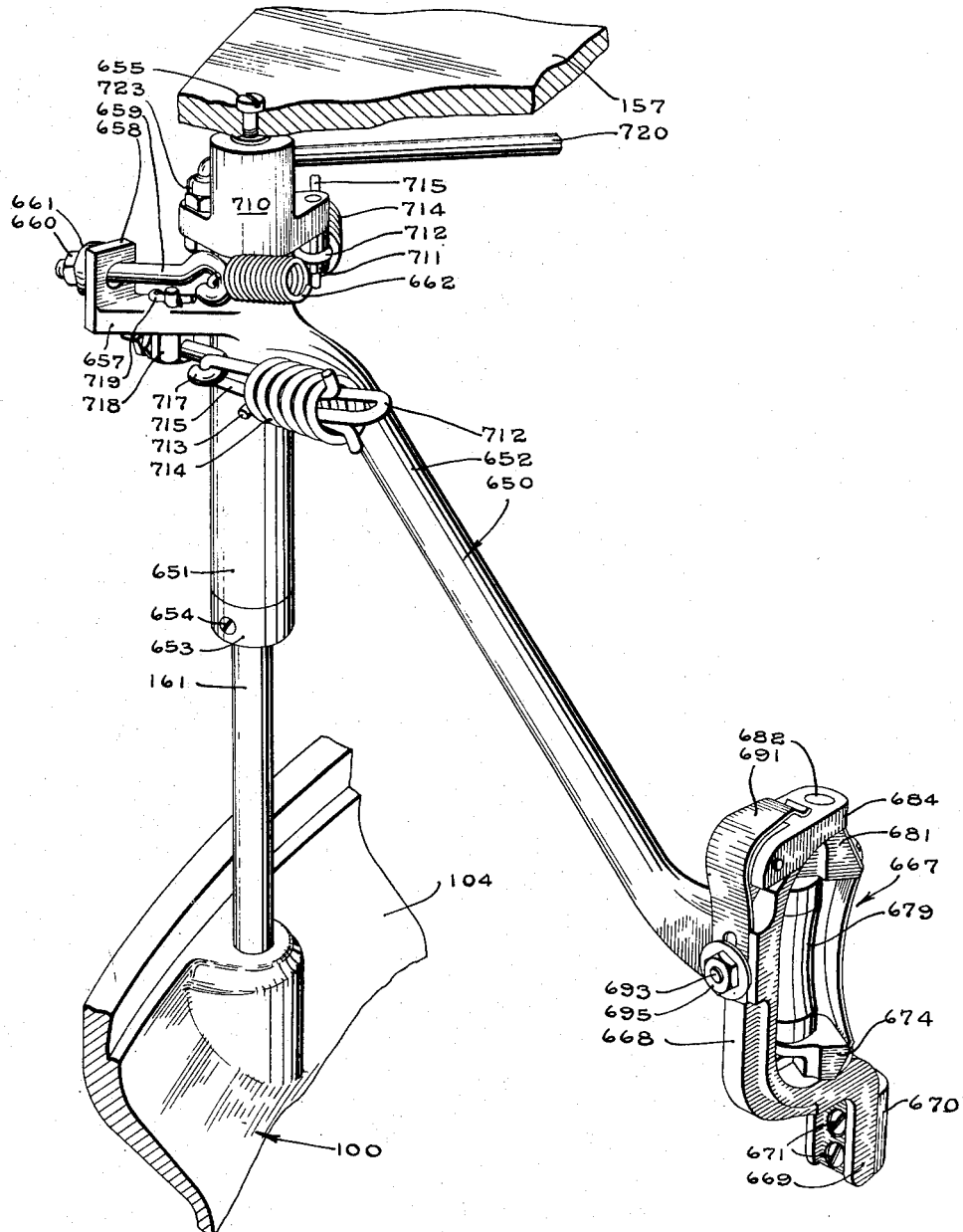
FIG_53

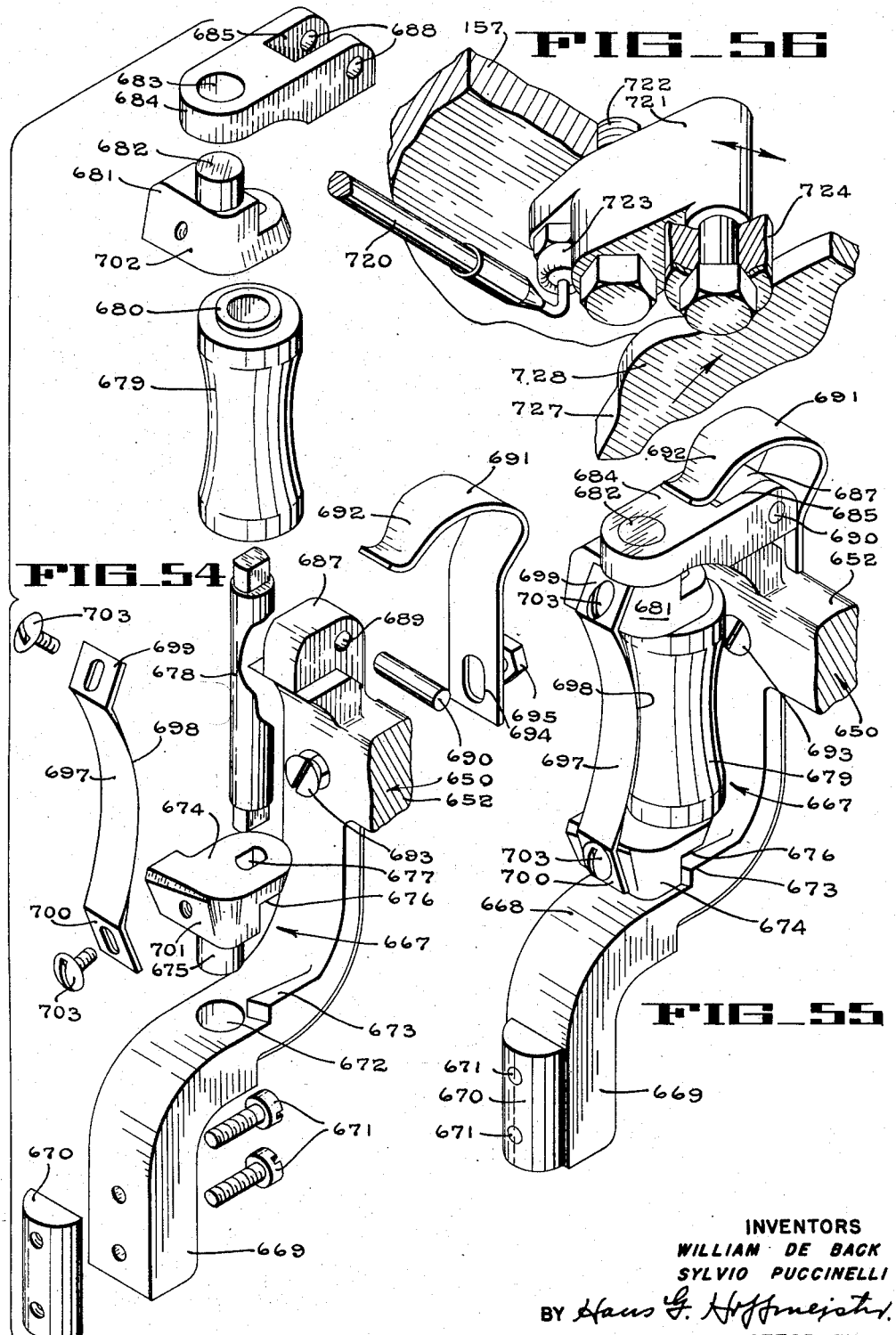

Jan. 11, 1955 W. DE BACK ET AL 2,699,191
FEEDING, STEM END TRIMMING, AND TRANSFER MEANS FOR
ROTARY TURRET TYPE FRUIT PREPARATION MACHINES
Filed Sept. 6, 1949 47 Sheets-Sheet 34
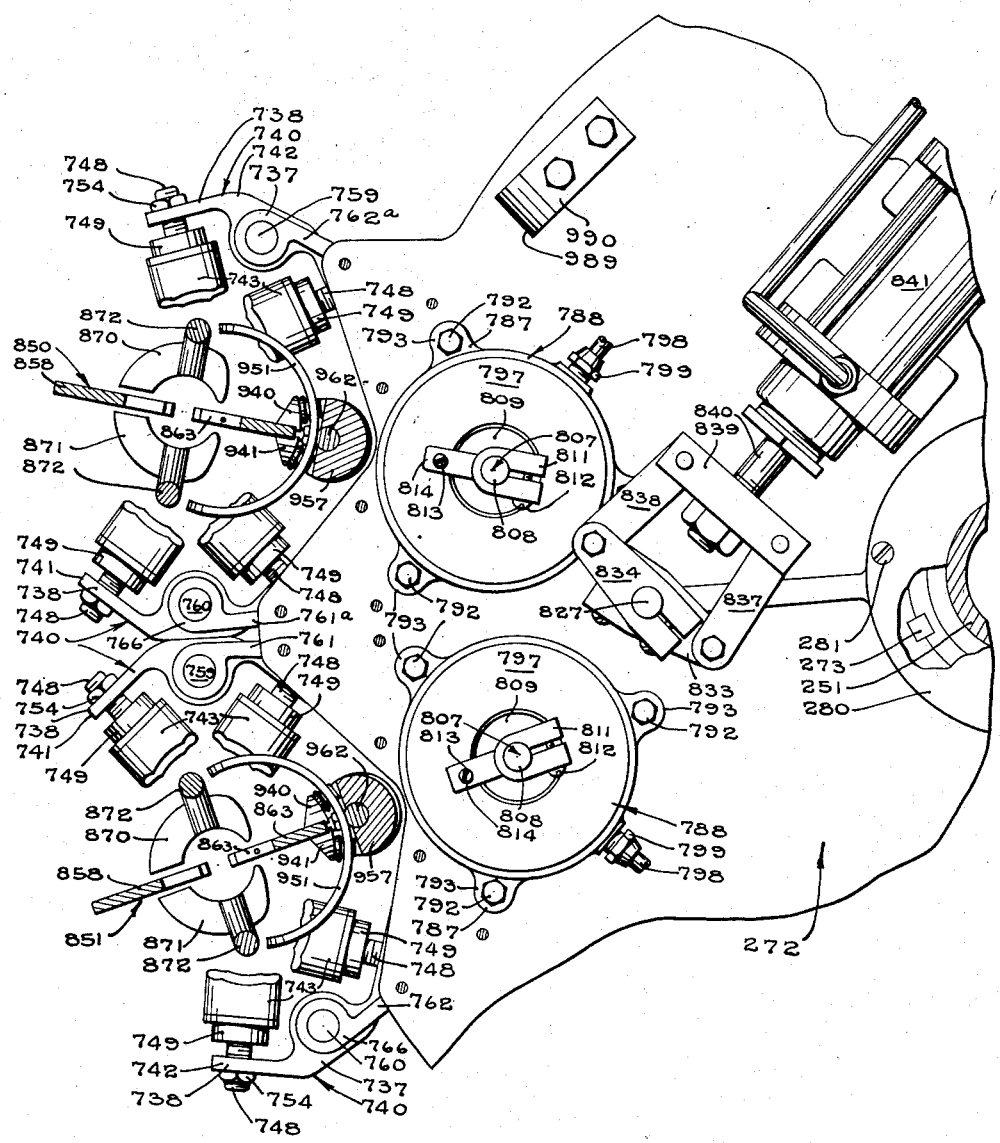
FIG_57
INVENTORS
WILLIAM DE BACK
SYLVIO PUCCINELLI
BY Hans G. Hoffmeister
ATTORNEY

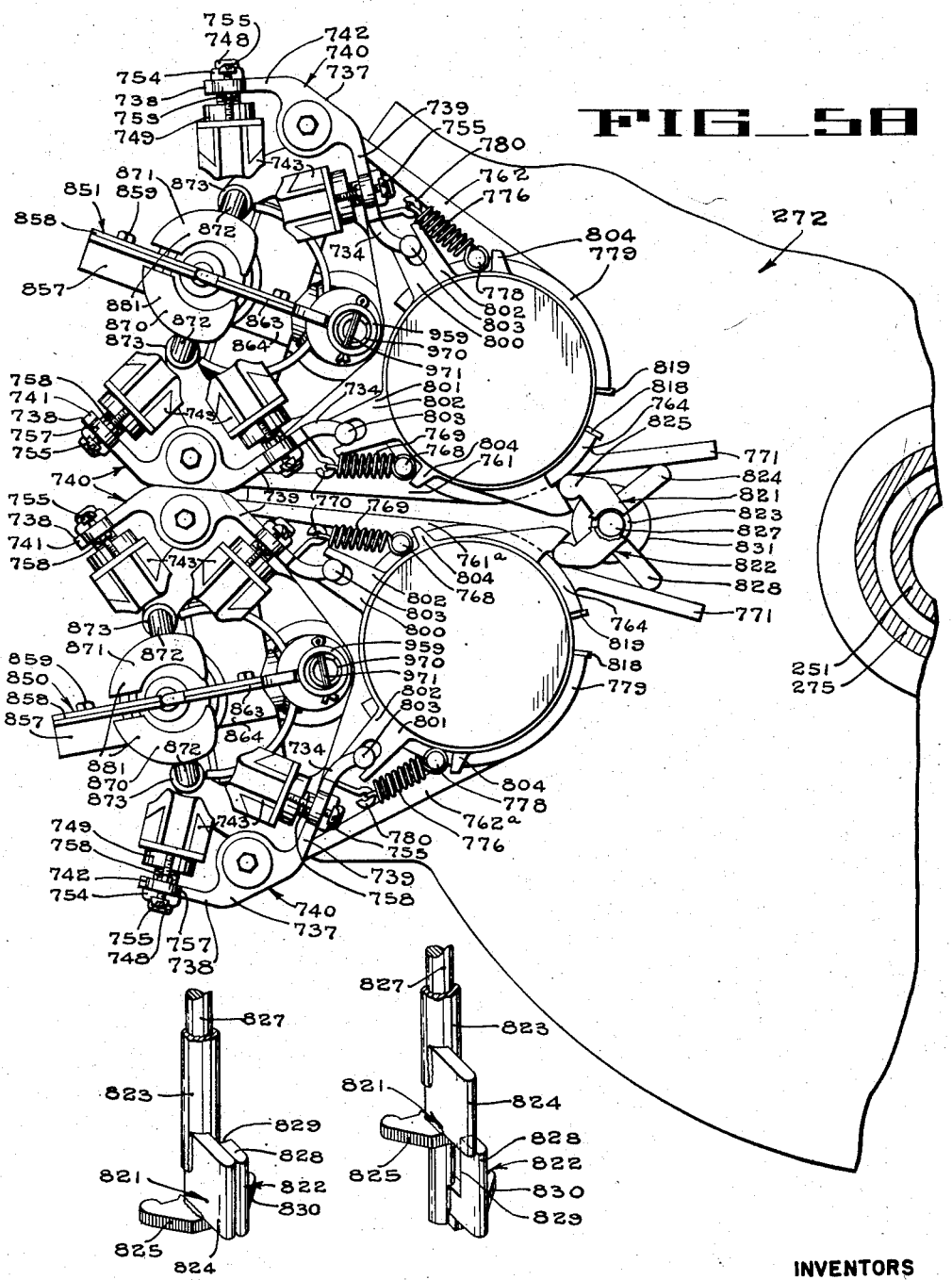

Jan. 11, 1955 W. DE BACK ET AL 2,699,191
FEEDING, STEM END TRIMMING, AND TRANSFER MEANS FOR
ROTARY TURRET TYPE FRUIT PREPARATION MACHINES
Filed Sept. 6, 1949 47 Sheets-Sheet 36
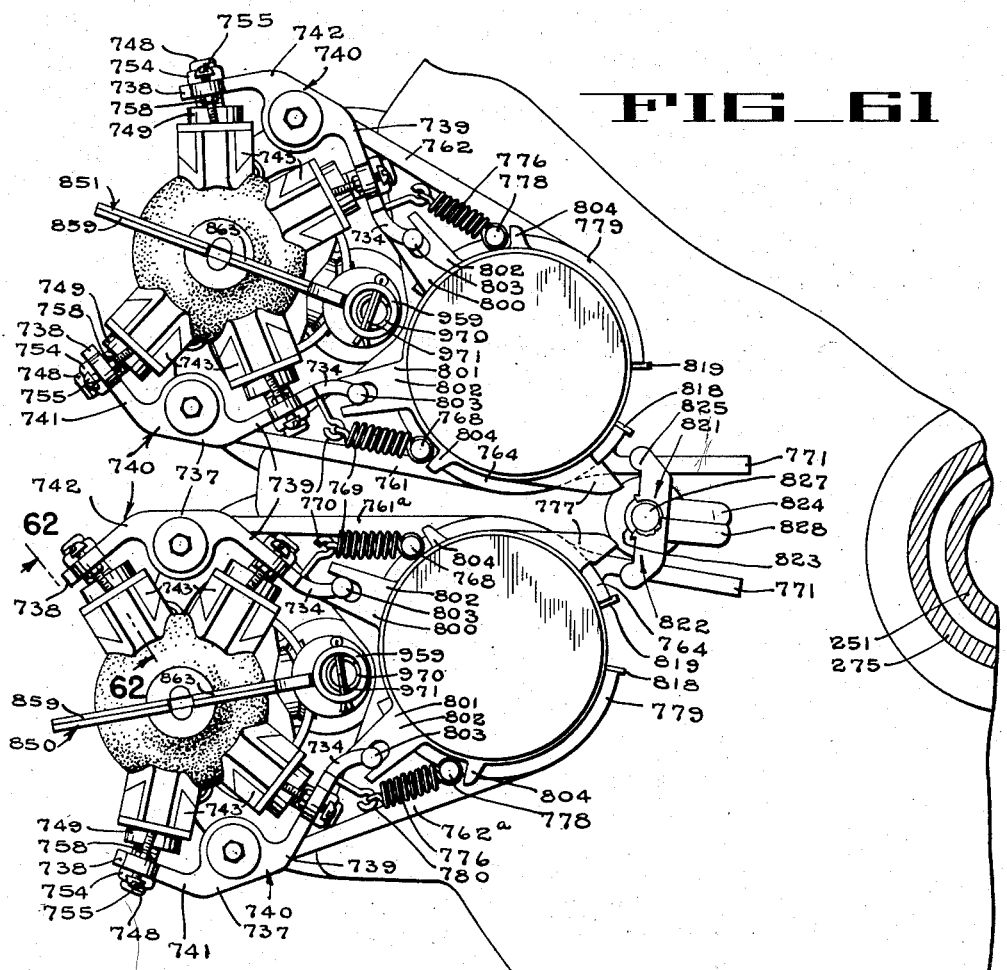
FIG_61
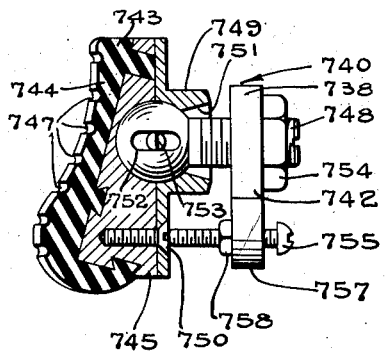
FIG_62
INVENTORS
WILLIAM DE BACK
SYLVIO PUCCINELLI
BY Hans G. Hoffmeister
ATTORNEY

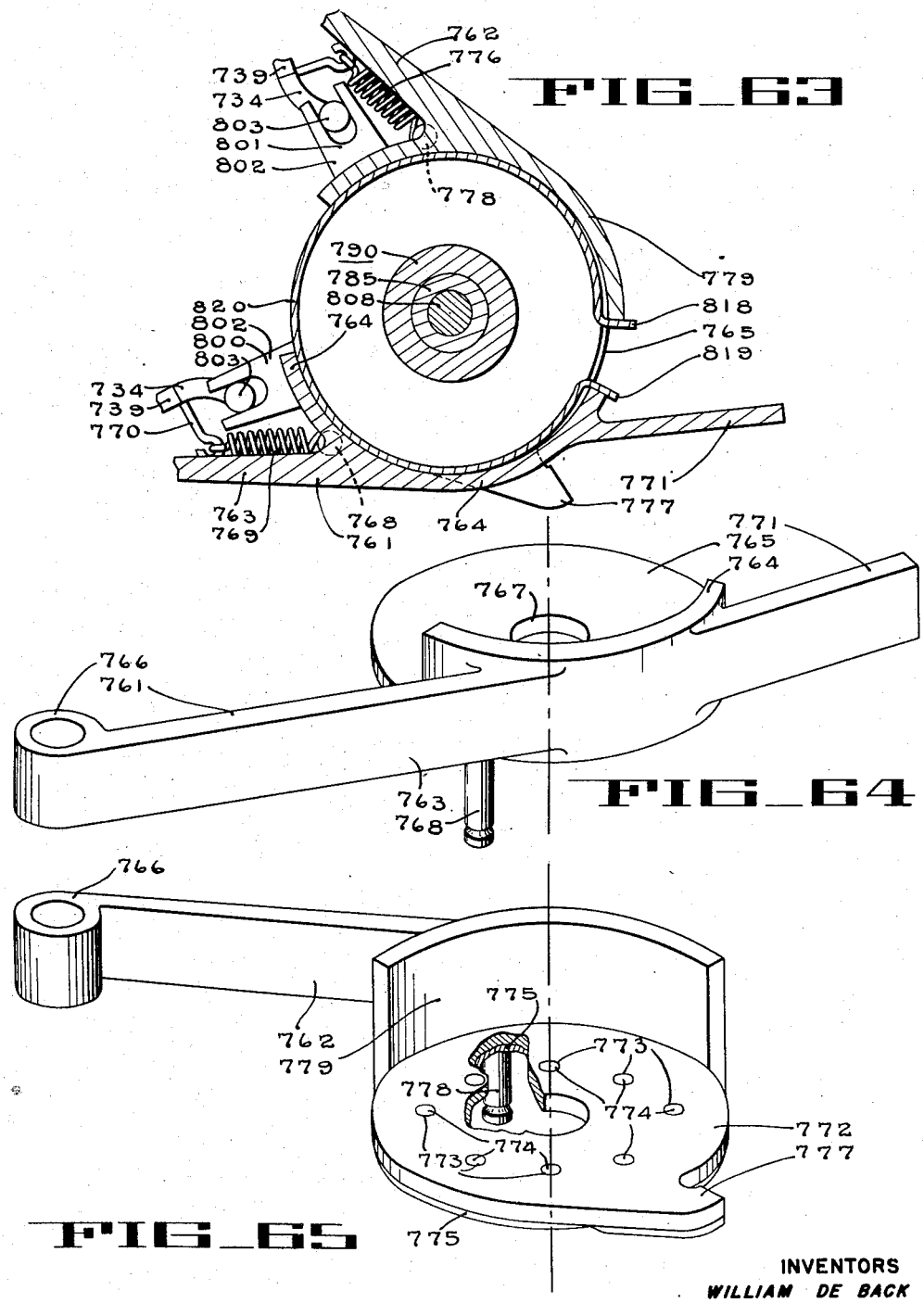

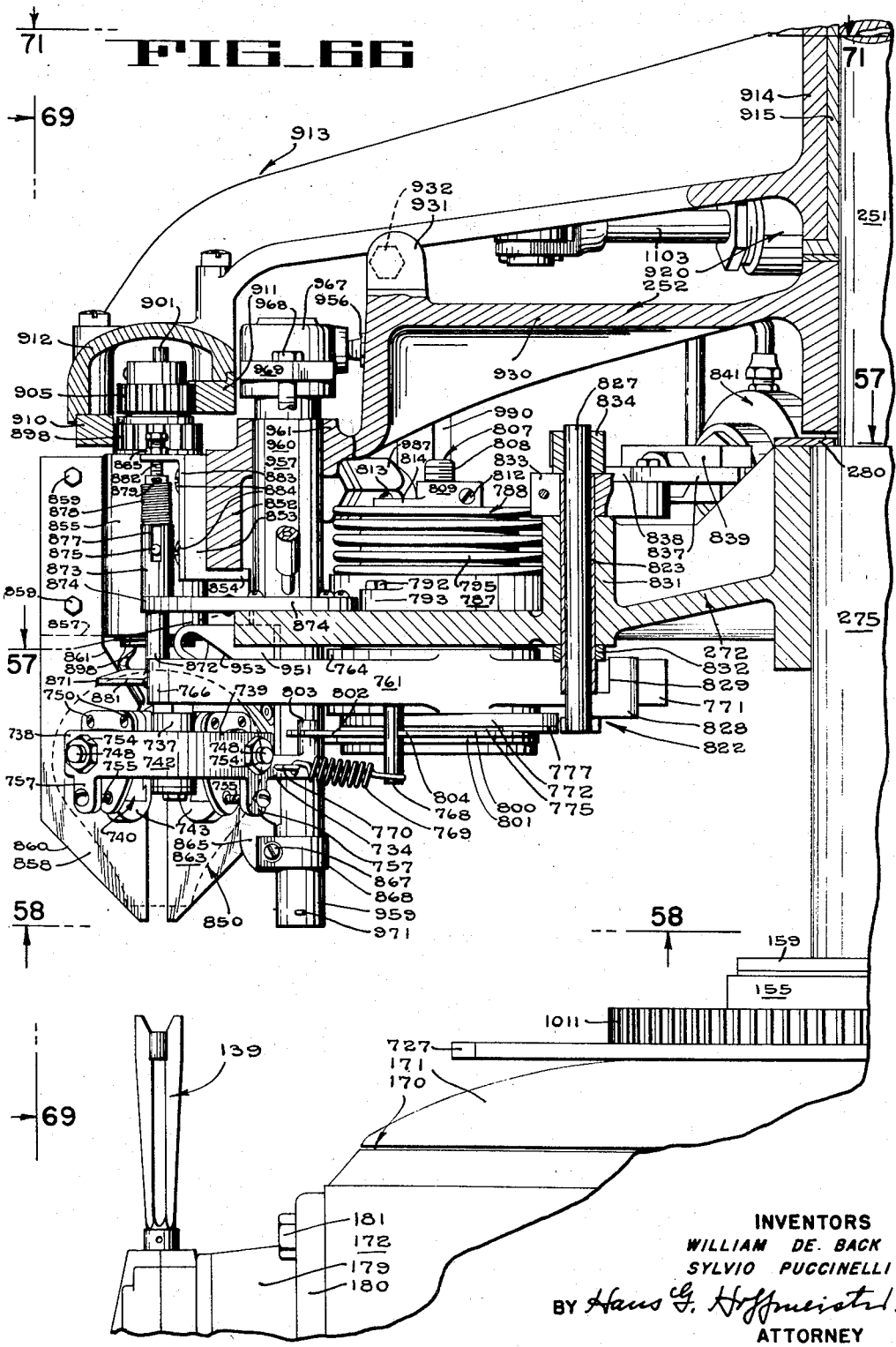

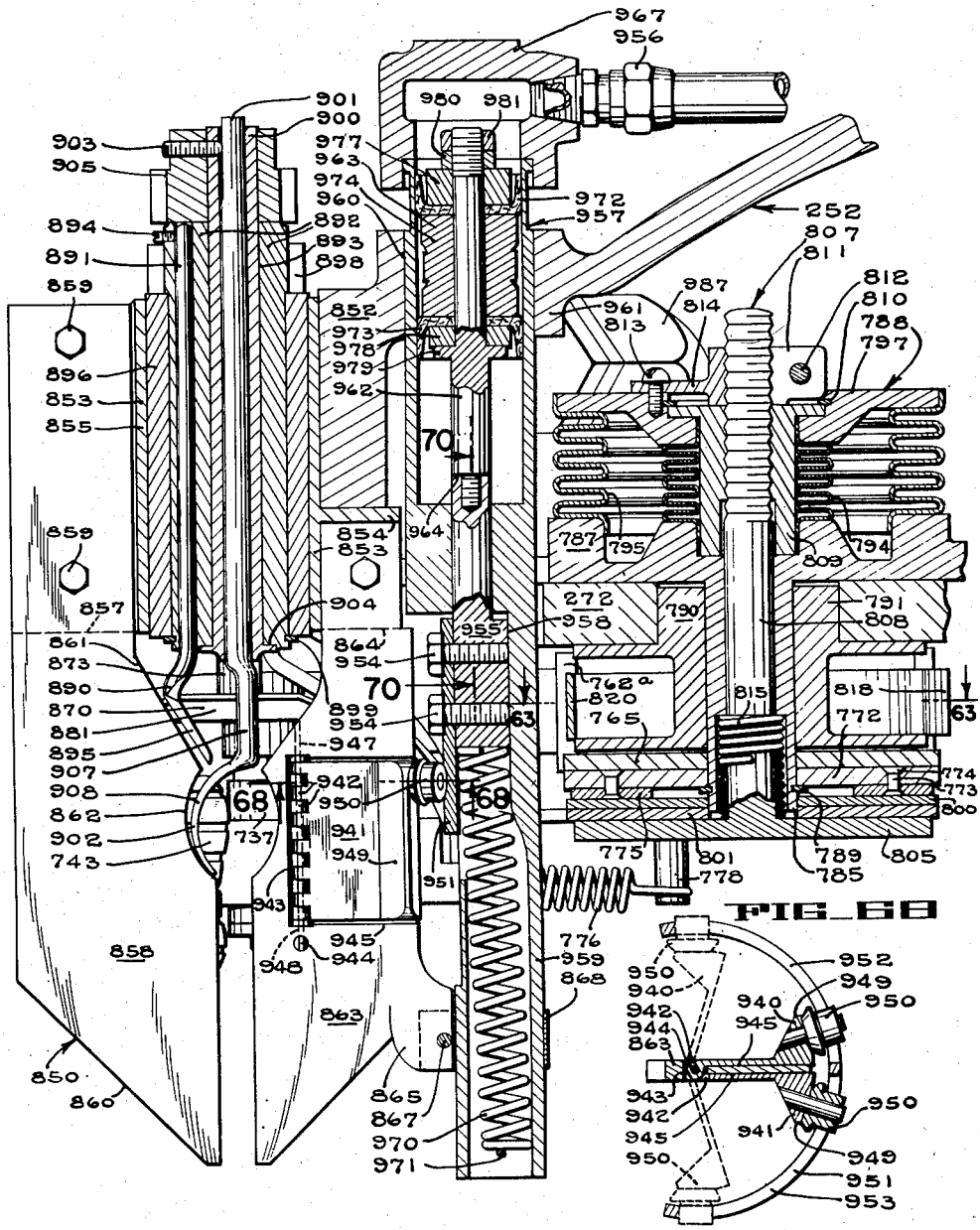

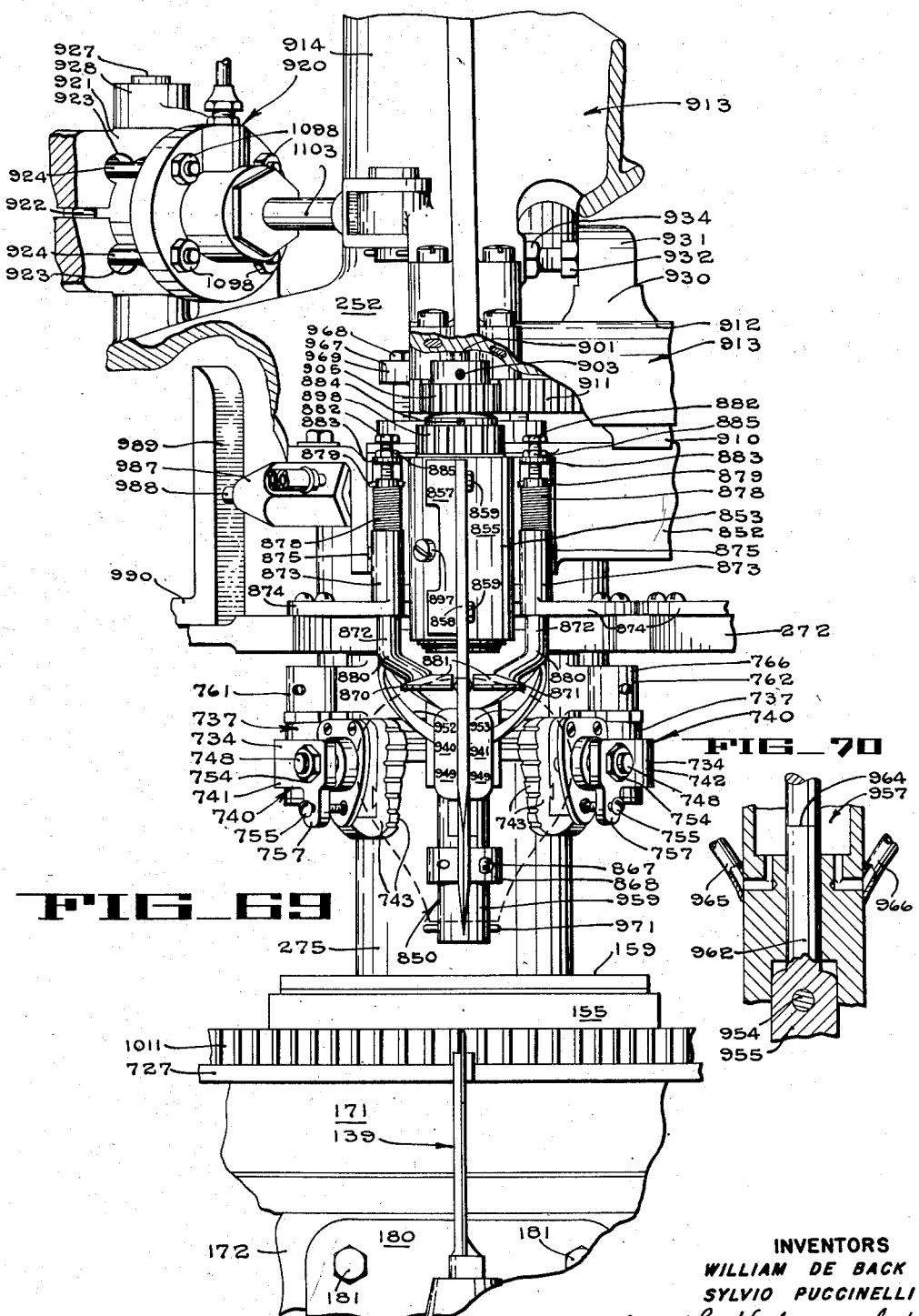

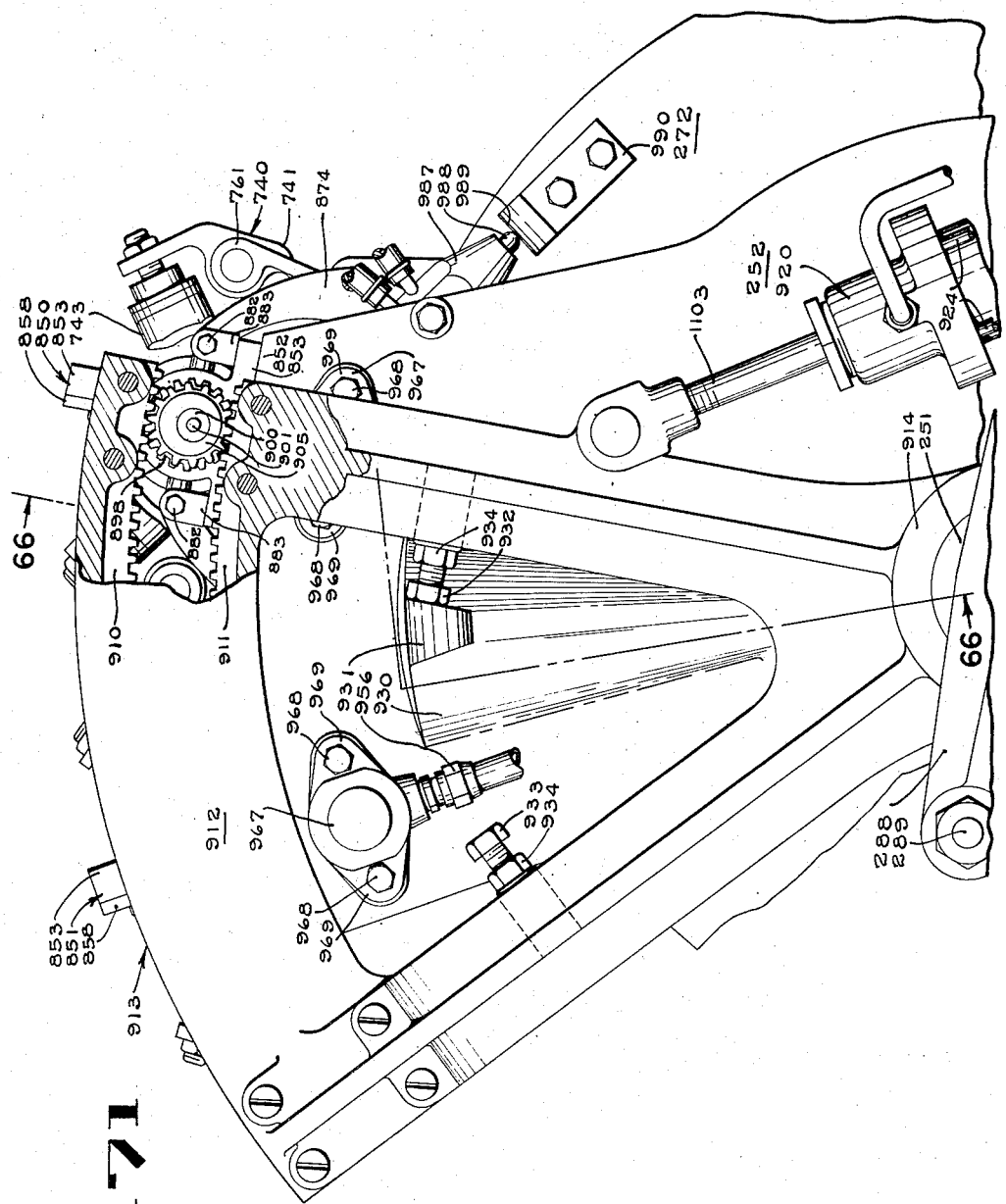

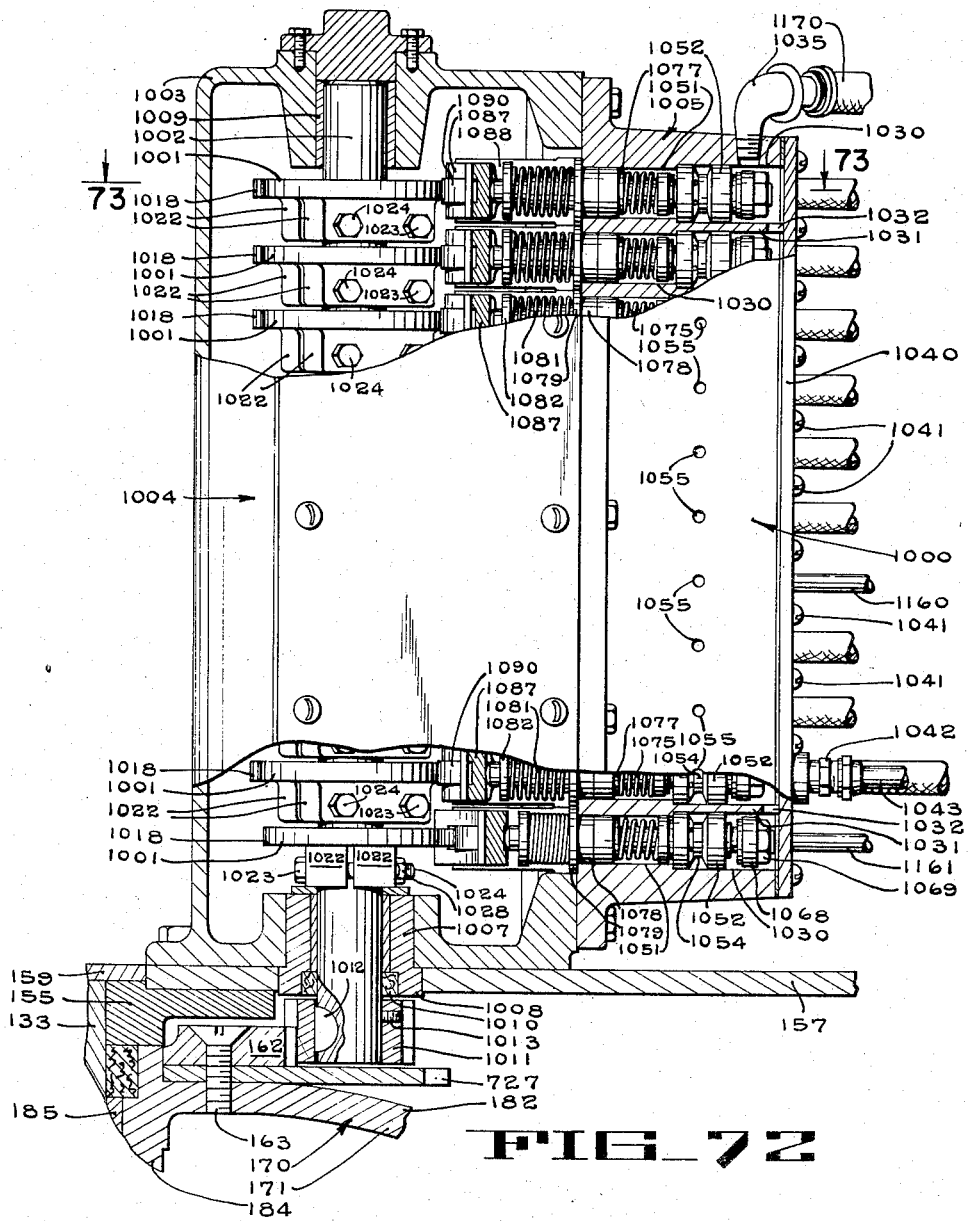

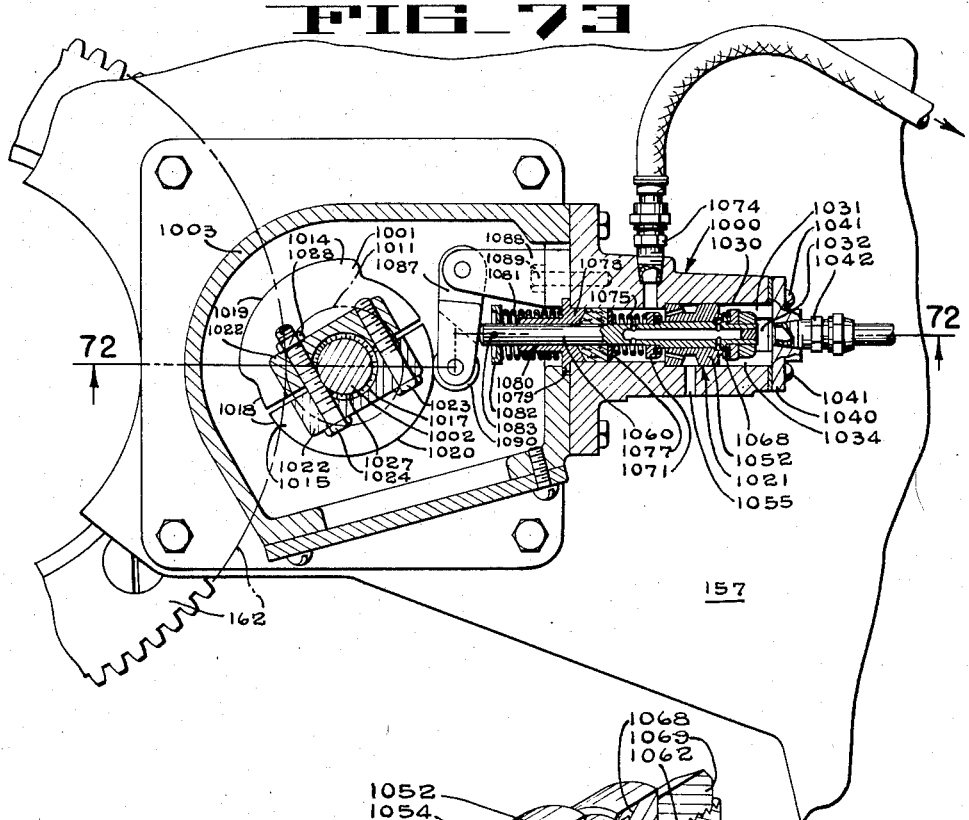
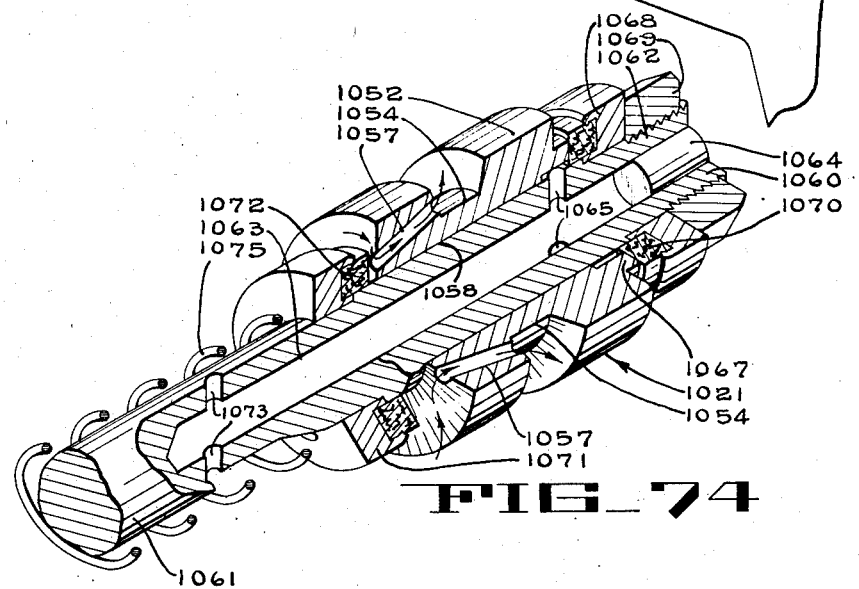

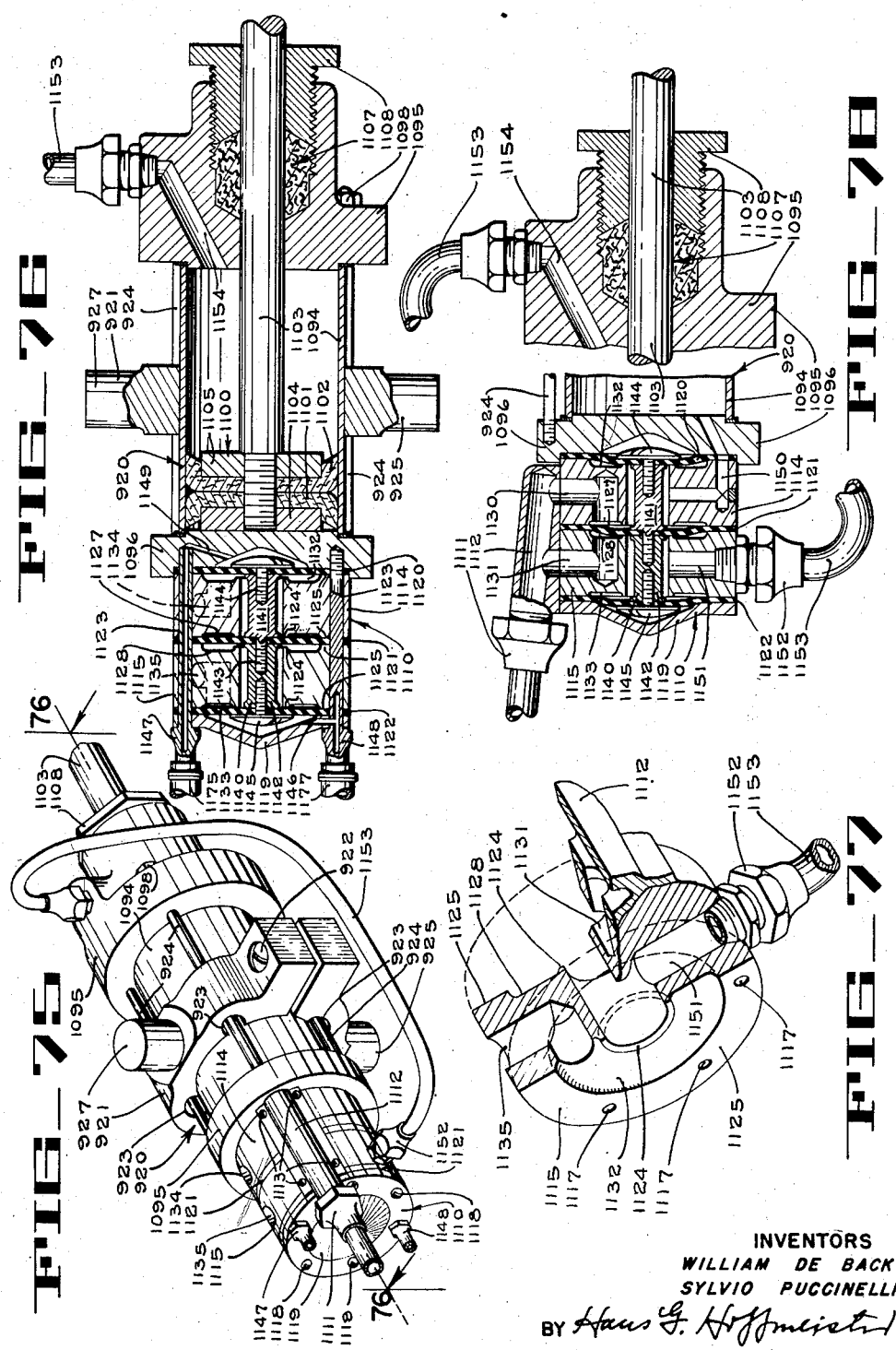

Jan. 11, 1955 W. DE BACK ET AL 2,699,191
FEEDING, STEM END TRIMMING, AND TRANSFER MEANS FOR
ROTARY TURRET TYPE FRUIT PREPARATION MACHINES
Filed Sept. 6, 1949 47 Sheets-Sheet 45
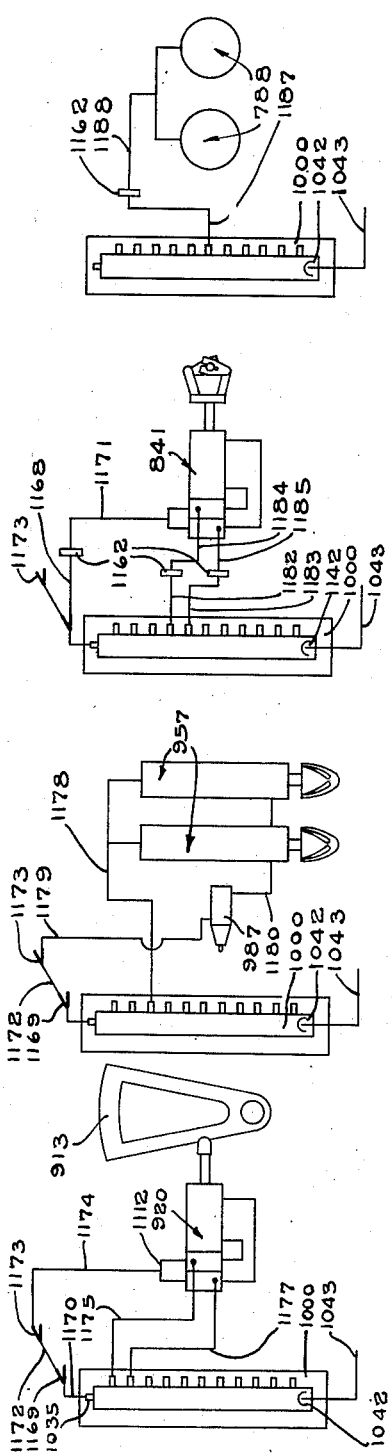
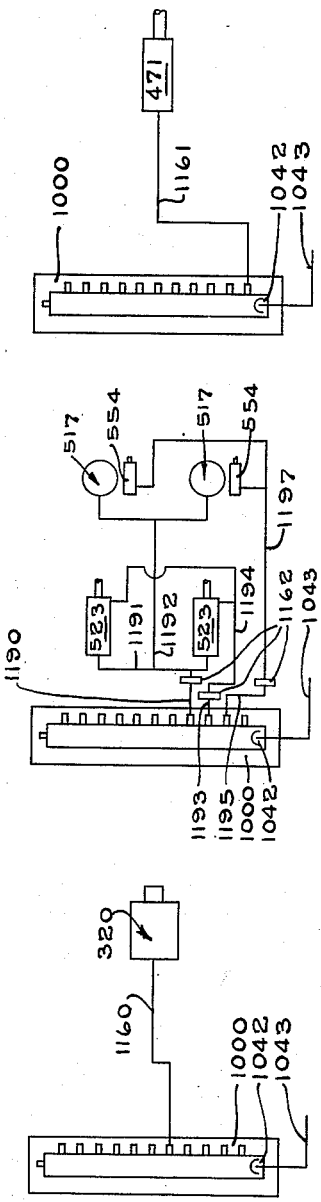
INVENTORS
WILLIAM DE BACK
SYLVIO PUCCINELLI
BY
ATTORNEY

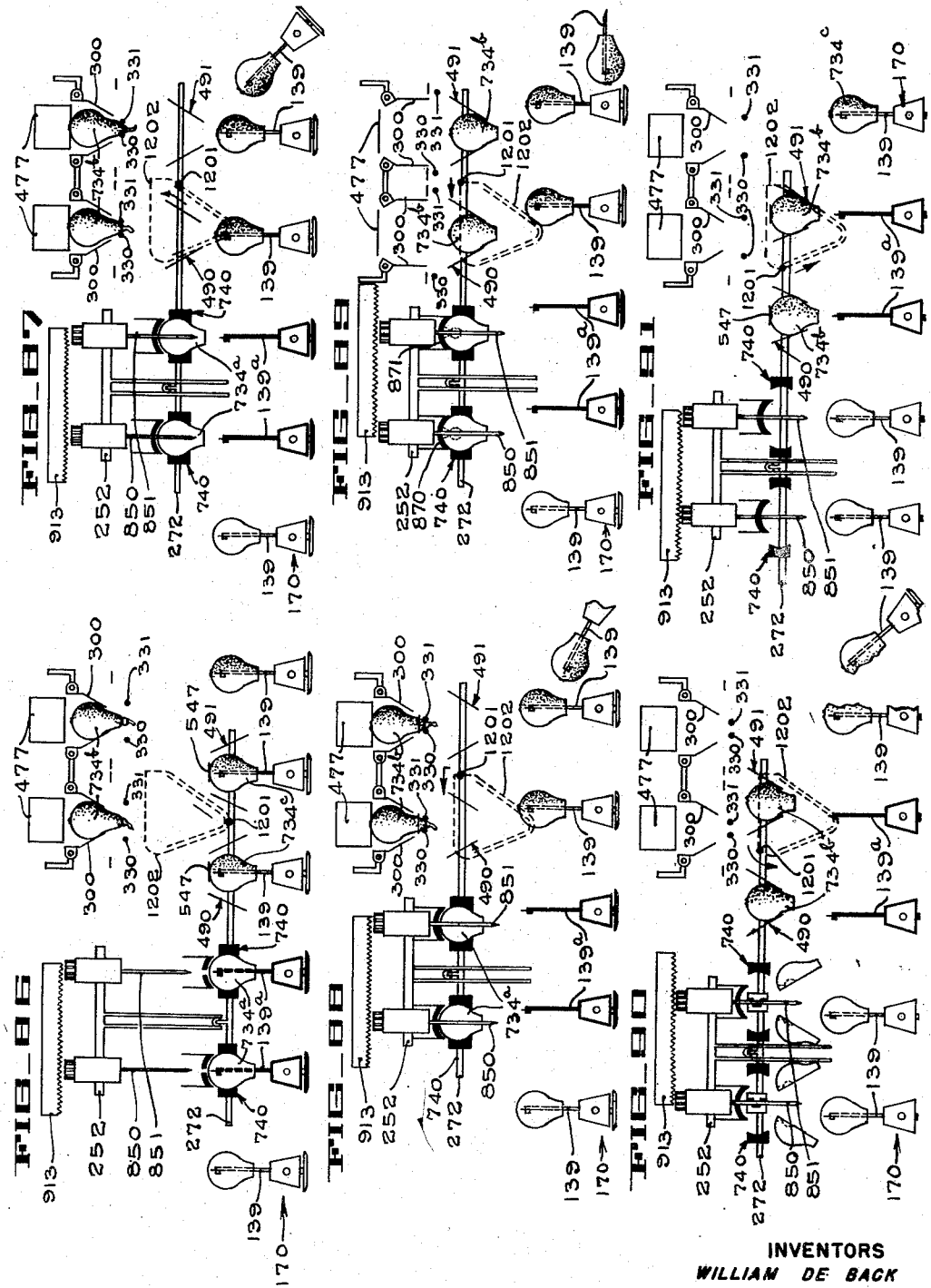

Jan. 11, 1955 W. DE BACK ET AL 2,699,191
FEEDING, STEM END TRIMMING, AND TRANSFER MEANS FOR
ROTARY TURRET TYPE FRUIT PREPARATION MACHINES
Filed Sept. 6, 1949 47 Sheets-Sheet 47
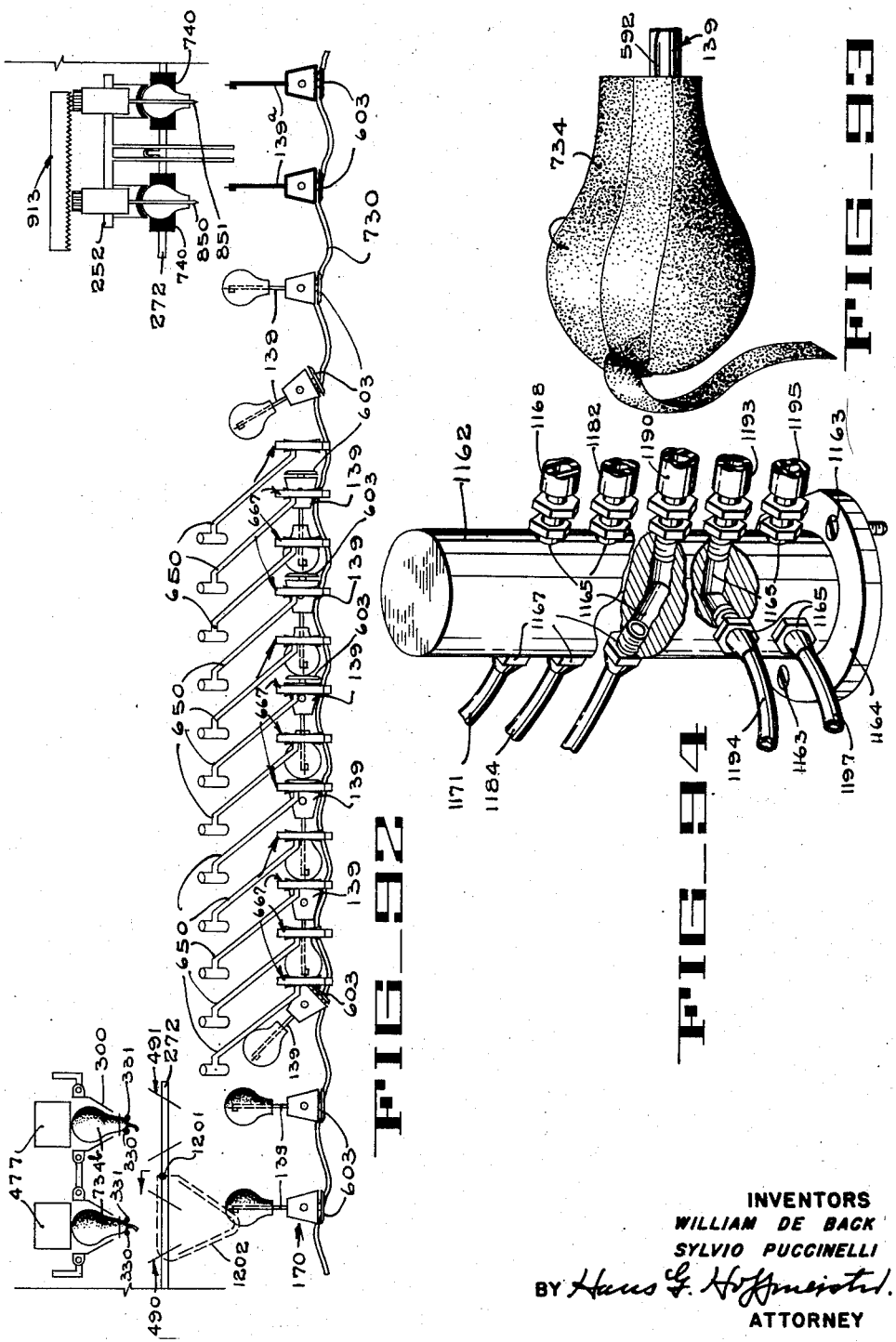
INVENTORS
WILLIAM DE BACK
SYLVIO PUCCINELLI
BY Hans G. Hoffmeister
ATTORNEY

United States Patent Office 2,699,191
Patented Jan. 11, 1955

2,699,191

FEEDING, STEM END TRIMMING, AND TRANSFER MEANS FOR ROTARY TURRET TYPE FRUIT PREPARATION MACHINES

William de Back and Sylvio Puccinelli, San Jose, Calif., assignors to Food Machinery and Chemical Corporation, San Jose, Calif., a corporation of Delaware Application September 6, 1949, Serial No. 114,168

22 Claims. (Cl. 146—51)

This invention appertains to fruit preparation machines, and relates more particularly to improvements in mechanism for preparing fruit, such as pears, for canning or drying.

An object of the present invention is to provide an improved high speed fruit preparation machine.

Another object of the invention is to provide an improved fruit preparation machine wherein the fruit is fed, transferred and impaled on a stemming tube with its stem-blossom axis vertical, is peeled with said axis horizontal, and is halved and cored with said axis vertical.

Another object is to provide a fruit preparation machine, wherein a plurality of impaling fruit holders travel continuously in a recurring cycle between an initial and a terminal processing point, a fruit feeding means operates intermittently in conjunction with a fruit transfer means at the initial point, and a fruit removing means operates intermittently at the terminal point, the operation of all of said means being co-ordinated in timed relation with the continuous travel of said fruit holders.

Another object is to provide a high speed fruit preparation machine wherein a plurality of fruit holders operate in recurring cycles along a horizontal path, a fruit feeding device is mounted in vertically spaced relation above said path and a transfer device operates in recurring cycles, and in timed relation to the fruit holders and feeders, along a cyclical path disposed therebetween.

Another object is to combine and co-ordinate a fruit feeding device for an automatic fruit processing mechanism with improved stem end gauging and trimming means.

Another object of the invention is to provide cooperating fruit feeding and transfer means adapted to operate in timed relation with a plurality of continuously moving stemming tubes, whereby a fruit, placed in a feed cup with its stem-blossom axis aligned with the center line of the feed cup, is fed in similar position through the feed cup into a transfer cup, and then in similar position through the transfer cup to impaled condition on one of said stemming tubes.

Another object of the invention is to feed a fruit into and out of a feed cup and into and out of a transfer cup in a continuous downward direction to facilitate by gravity the feeding and transferring operations and to avoid gravitational axial displacement of irregularly shaped fruit.

Another object is to provide improved mechanism for transferring fruit from a feeding device to a stemming tube turret in a fruit preparation machine.

Another object is to transfer a fruit from an intermittently operated feeding device to a fruit holder traveling around a planiform cyclical path, by transfer means moving in a cyclical path disposed between the feeding device and the path of the fruit holders, the path of said transfer means lying along a curved surface substantially at right angles to the plane of the path of the fruit holders, the transfer means and the fruit holders moving congruently throughout a portion of their paths.

Another object is to co-ordinate the movement of a fruit transferring device around a cyclical path disposed along a generally upright curved surface, with the movement of a continuously moving fruit holder around a cyclical path disposed along a generally horizontal plane.

Another object is to gently squeeze a pear stem-end down in a tapered transfer device conforming generally to the taper of the pear, while restraining camming displacement of the pear by a member overlying the blossom or butt end of the pear, to work the pear toward a position where its stem-blossom axis coincides with the vertical center line of the transfer device.

Another object is to provide fruit transferring means adapted to receive a fruit therein, to position the fruit in axial alignment with an impaling fruit holder, to press the fruit into axially impaled condition on the fruit holder, to open the transferring means to release the fruit for passage therethrough, and then to move to a position clear of the fruit after impalement thereof.

Another object is to provide a fruit preparation machine wherein a fruit is accurately positioned with relation to its stem-blossom axis, and the angular and rotative positions of the fruit are thereafter changed in predetermined sequence relatively to said axis to facilitate and improve the performance of a succession of fruit preparation steps.

Another object is to provide improved stemming tube operation in a fruit preparation machine by tilting the stemming tubes between upright and horizontal position at predetermined stages in their travel through the machine.

Another object is to provide improved stemming tube positioning, tilting and rotating mechanisms at predetermined stages throughout a cycle of operation of a fruit preparation machine.

Another object is to retain a fruit against endwise displacement under axial stresses during an endwise peeling cut without obstructing the operation of the peeling instrumentality used in making the peeling cut.

Another object is to provide a mechanism with tiltable stemming tubes for receiving fruit in axially impaled condition thereon with the tubes in upright position, and then for tilting the tubes to dispose the fruit in axially horizontal position, and moving the fruit in the latter position along a predetermined path past a peeling device.

Another object is to provide a fruit preparation machine having a plurality of tiltable and axially rotatable stemming tubes with off-center fruit retaining means mounted to hold a fruit against withdrawal from a stemming tube upon which it is impaled, without interference with a peeling device adapted to take a longitudinal peeling cut extending the entire length of the fruit.

Another object of the invention is to hold a rotating pear against endwise displacement from a supporting impaling holder during a peeling operation by a rotatable retainer axially offset from the pear's stem-blossom axis, and rotated to minimize frictional engagement with the pear.

Another object is to provide improved fruit peeling facilities for a fruit preparation machine.

Another object is to provide improved fruit peeling mechanism whereby a fruit is carried around a circular path with its stem-blossom axis substantially tangent to such path, the fruit being slowly rotated about its axis while passing a plurality of stationary spring biased peeling devices.

Another object is to provide means for peeling fruit by a succession of lengthwise spiral peeling cuts while the fruit is moving lengthwise along a predetermined path and simultaneously is being rotated about its axis.

Another object is to transfer fruit from an impaled condition on a cyclically moving stemming tube onto a superposed halving, calyx trimming, and seed cell severing mechanism, the superposed mechanism moving congruently with the stemming tube through a portion of its cycle of movement.

Another object is to provide a fruit preparation machine with improved splitting, trimming and coring facilities.

Another object is to perform stemming and seed cell severing operations upon fruit undergoing preparation in a manner to insure removal of the stem and seed cell from the prepared fruit.

Another object is to mount a calyx trimming knife and a seed cell removing knife for simultaneous rotation in opposite directions about relatively eccentric axes and by similarly relatively eccentric gears.

Another object is to provide a high speed powerful pneumatic actuator for a fruit preparation machine.

Another object is to provide a powerful, quick acting, pneumatic cylinder by mounting a rapid actuating diaphragm valve on a cylnider to which a constant source of pressurized air is adapted to be selectively connected through ports controlled by the valve.

Another object is to provide an ejector for ejecting prepared fruit from a fruit preparation machine.

Another object is to provide an ejector for a fruit preparation machine whereby a fruit portion after being split into halves, and while in position on a splitting blade, is subjected to an outward stress away from the blade to break the liquid seal between the blade and the split face of the fruit.

Another object is to provide an improved fruit half ejector flush mounted in the splitting blade of a fruit preparation machine.

Another object is to provide improved, pneumatic actuation and control mechanism for operating selected portions of the mechanism of a fruit preparation machine.

These and other objects and advantages of the invention will become apparent from the following description in conjunction with the accompanying drawings in which:

Fig. 1 is a view in perspective of the drive or peeling side of a fruit preparation machine embodying the invention.

Fig. 2 is a perspective view of the fruit ejecting side of the machine the view illustrating the side opposite to that shown in Fig. 1.

Fig. 3 is an enlarged plan view of the machine.

Fig. 4 is a vertical section of the upper half of the machine taken along line 4—4 of Fig. 3.

Fig. 5 is a vertical section of the lower half of the machine taken along the same line 4—4 of Fig. 3.

Fig. 6 is an enlarged fragmentary sectional view taken in the same plane as Fig. 4 and showing a portion of a stemming tube turret, a stemming tube bushing being shown in section.

Fig. 7 is an enlarged horizontal section taken along the line 7—7 of Fig. 5, the section being taken through the base of the machine and showing a face cam which oscillates a fruit splitting head.

Fig. 8 is an enlarged horizontal section taken along the offset line 8—8 of Fig. 5, the section being taken above the lower cam face of a barrel cam which reciprocates a fruit transfer head.

Fig. 9 is an enlarged fragmentary horizontal section taken along line 9—9 of Fig. 4, portions thereof being broken away to expose driving mechanism.

Fig. 10 is an enlarged section taken along the line 10—10 of Fig. 4 and showing the stemming tube drive mechanism, certain portions being broken away.

Fig. 11 is an enlarged horizontal section taken along line 11—11 of Fig. 4.

Fig. 12 is an enlarged horizontal section taken along line 12—12 of Fig. 4.

Fig. 13 is a further enlarged fragmentary vertical section through a main driving gear train taken along the line 13—13 of Fig. 9.

Fig. 14 is a diagrammatic development on a plane surface of a barrel cam shown in Figs. 4 and 8 for reciprocating the fruit transfer head.

Fig. 15 is a straight line planiform diagrammatic development of a face cam shown in Fig. 7 for oscillating the splitting head and the transfer head.

Fig. 16 is an enlarged fragmentary plan view of the feeding assembly, the fruit feeding cups being shown in fruit receiving condition, the view being taken in the direction of the arrows 16—16 of Fig. 4.

Fig. 17 is a similarly enlarged fragmentary vertical section taken along the line 17—17 of Fig. 16.

Fig. 18 is an enlarged fragmentary section through a stemming tube drive gear taken along the line 18—18 of Fig. 10.

Fig. 19 is an enlarged fragmentary vertical section through the feed assembly taken along the line 19—19 of Fig. 17.

Fig. 20 is an enlarged fragmentary side elevation of the feed assembly taken in the direction of the arrows 20—20 in Fig. 16.

Fig. 21 is a further enlarged fragmentary perspective view of a device for synchronizing pivotal movement of pear gauging fingers associated with the feed assembly.

Fig. 22 is an enlarged fragmentary perspective view of the lower side of a pear feeding assembly as it would appear when viewed from a position below and inwardly of the feed mechanism, the parts being shown in the positions they occupy when gauging the pears prior to performing a stem end trimming operation thereon.

Fig. 23 is a fragmentary perspective view similar to Fig. 22 the parts being shown in the positions they occupy when dropping the pears into the transfer cups.

Fig. 24 is a perspective view somewhat similar to Figs. 22 and 23 portions thereof being broken away, the parts being shown in the positions they occupy during a stem end trimming operation.

Fig. 25 is a somewhat diagrammatic fragmentary elevational view in reduced scale of the radially inward side of the feed mechanism, but showing only the fruit gauging fingers and their associated parts of the feed mechanism, the parts being shown in the normal or fruit receiving condition of the feed mechanism, a plate mounted on the transfer head for holding the gauging fingers in raised condition being shown in dot-dash lines.

Fig. 26 is a fragmentary view generally similar to Fig. 25 except that the parts are shown in their pear gauging position.

Fig. 27 is a view similar to Fig. 26 except that the parts are shown in their pear discharging condition.

Fig. 28 is an enlarged fragmentary plan view of one transfer cup unit and associated parts said unit comprising half of a two cup transfer assembly as used in the illustrated embodiment of the invention, the parts being shown in their normal fruit receiving positions, the operated position of a presser disk being indicated in broken lines.

Fig. 29 is a side elevation of Fig. 28 taken in the direction of the arrows 29—29 of Fig. 28.

Fig. 30 is a bottom view of the parts shown in Figs. 28 and 29 taken in the direction of the arrows 30—30 of Fig. 29.

Fig. 31 is a vertical section through the transfer mechanism taken along the offset lines 31—31 of Fig. 28.

Fig. 32 is a front elevation of a single transfer cup unit taken in the direction of the arrows 32—32 of Fig. 28, a portion being broken away to show a torsion spring, the parts being shown in fruit receiving condition.

Fig. 33 is an elevation of the transfer cup unit of Fig. 32 looking in the direction of the arrows 33—33 of Fig. 28, portions thereof being broken away and the parts being shown in their normal pear receiving condition.

Fig. 34 is a vertical section along line 34—34 of Fig. 28, the parts being shown in solid lines in their normal fruit receiving condition, the relative positions of the transfer cups in such normal condition being indicated in broken lines, the positions of the cups in fruit discharging condition being shown in dot-dash lines.

Fig. 35 is a horizontal fragmentary section taken along line 35—35 of Fig. 29, the parts being shown in constricting fruit gauging condition in solid lines and in separated fruit releasing condition in dot-dash lines.

Fig. 36 is an enlarged fragmentary perspective view of a stemming tube drive assembly with an outer end cover removed and a portion of the stemming tube hub and drive shaft housing broken away.

Fig. 37 is a perspective view of the stemming tube outer end cover removed from the showing in Fig. 36.

Fig. 38 is an enlarged perspective view of a stemming tube as it appears when removed from the machine with a pear retaining disk screwed into one end thereof, the stemming tube being broken away to show its threaded connection with the retaining disk.

Figs. 39 to 44 inclusive show, somewhat diagrammatically as on a curved vertical section taken just outside the stemming tube cam tracks, the mechanism for controlling the tilting of the stemming tubes and their rotation about their own axes.

Fig. 45 is an enlarged perspective view of the inner or driven end of a stemming tube assembly as it would appear when removed from the machine, a portion of the stemming tube hub and the outer end portion of the stemming tube assembly being broken away.

Fig. 46 is a horizontal enlarged fragmentary section in reduced scale along line 46—46 of Fig. 6 portions of a pair of clamping sleeves for clamping the cam supporting hub to a central stationary column being broken away.

Fig. 47 is a planiform diagrammatic development of a cam track for tilting the stemming tubes and associated locking ring and rack for controlling operation of the stemming tubes about their own axes.

Fig. 48 is a horizontal enlarged fragmentary section taken along the line 48—48 of Fig. 6.

Figs. 49 and 50 are enlarged fragmentary lower perspective and top plan views, respectively, of a marginal portion of the upper stemming tube tilting cam plate shown in Fig. 48, showing one of four spring pressed segments inserted in the cam track for maintaining the stemming tubes in absolute vertical position during fruit transferring operations.

Fig. 51 is a somewhat diagrammatic horizontal section of the machine taken along line 51—51 of Fig. 4, parts other than those pertaining to the operation of the peeling mechanisms being omitted.

Fig. 52 is an enlarged fragmentary section taken along the line 51—51 of Fig. 4, a pear being shown in broken lines in position on one of the stemming tubes, and the middle portions of a plurality of cam actuated peeling arm control links and also of a plurality of peeling arm biasing springs being broken away.

Fig. 53 is an enlarged fragmentary perspective view of a peeling arm assembly and its supporting parts.

Figs. 54 and 55 are exploded and assembled views, respectively, in still further enlarged scale, of a peeling head, its supporting arm being broken away.

Fig. 56 is a similarly enlarged perspective view showing the underside of a scalloped cam, cam following roller, rocker arm and connecting link for controlling spring tension on a peeling arm for drawing the peeling knife inwardly over the calyx end of the pear.

Fig. 57 is a fragmentary section taken along line 57—57 of Fig. 66 showing gripping jaws and associated parts for transferring peeled pears onto a splitting knife.

Fig. 58 is a fragmentary bottom sectional view taken along the line 58—58 of Fig. 66 showing the under side of the pear splitting knives and gripping jaws, the jaws being shown in open condition.

Fig. 59 is an enlarged fragmentary perspective view of the lower end portions of a pair of coaxial butterfly levers.

Fig. 60 is a view similar to Fig. 59 showing one of the levers offset axially upwardly from the other.

Fig. 61 is a view similar to Fig. 58 but with the gripping jaws closed over pears which have been drawn up by the gripping jaws onto the splitting knives.

Fig. 62 is an enlarged detail section along line 62—62 of Fig. 61 showing the universal pivotal mounting arrangement for the gripping jaws.

Fig. 63 is an enlarged fragmentary horizontal section taken along line 63—63 of Fig. 67, showing a pair of gripper jaw bracket support arms, the end portions thereof being broken away.

Figs. 64 and 65 are similarly enlarged perspective views of the bracket support arms shown in Fig. 63.

Fig. 66 is an enlarged fragmentary vertical section along the line 66—66 of Fig. 71 showing a splitting blade, with associated fruit gripper and associated seed cell severing and calyx trimming mechanism.

Fig. 67 is a further enlarged fragmentary vertical section taken along the line 67—67 of Fig. 12.

Fig. 68 is an enlarged fragmentary section taken on the line 68—68 of Fig. 67 showing a pair of cam actuated ejector flaps mounted on a splitting knife, the flaps being shown in operated or ejecting condition in broken lines.

Fig. 69 is a fragmentary elevation of one coring and splitting station looking in the direction of the arrows 69—69 of Fig. 66.

Fig. 70 is an enlarged fragmentary section along line 70—70 of Fig. 67 showing the lower end of an ejector actuating cylinder and a portion of a piston rod.

Fig. 71 is an enlarged fragmentary plan view of the splitting, seed cell severing, and calyx trimming station of the machine taken in the direction indicated by the arrows 71—71 in Fig. 66, a portion of a segmental bracket for actuating the seed cell severing and calyx trimming knives being broken away.

Fig. 72 is an enlarged fragmentary view partly in side elevation and partly in vertical section of a cam actuated, pneumatic control valve group and associated parts, the section being taken along line 72—72 of Fig. 73.

Fig. 73 is a horizontal section taken along the line 73—73 of Fig. 72.

Fig. 74 is an enlarged fragmentary perspective view of portions of an air valve embodied in the pneumatic control unit shown in Figs. 72 and 73.

Fig. 75 is an enlarged fragmentary perspective view of a pneumatic cylinder assembly for actuating the seed cell severing and calyx trimming knives.

Fig. 76 is a longitudinal section taken on the line 76—76 of Fig. 75.

Fig. 77 is an enlarged perspective view of a body member of a diaphragm valve associated with the pneumatic cylinder shown in Figs. 75 and 76, portions thereof being broken away.

Fig. 78 is a longitudinal sectional view similar to Fig. 76 taken on a rotated plane through the axis of the cylinder, one portion of said plane passing through an air inlet manifold and the other through the valve end of an air tube, a central portion of the cylinder barrel being broken away.

Fig. 79 is a diagrammatic view of the pneumatic control arrangement for the seed cell severing and calyx trimming knives.

Fig. 80 is a diagrammatic view of the pneumatic control arrangement for the pear ejector mechanism.

Fig. 81 is a diagrammatic view of the pneumatic control arrangement for the gripping jaws.

Fig. 82 is a diagrammatic view of the pneumatic control arrangement for the gripping jaw clutch bellows.

Fig. 83 is a diagrammatic view of the pneumatic control arrangement for opening the feed cups and cocking the stem end trimming knives.

Fig. 84 is a diagrammatic view of the pneumatic control arrangement for operating the transfer cups and presser disks.

Fig. 85 is a diagrammatic view of the pneumatic control arrangement for tripping the sear which holds the stem end trimming knives in cocked position.

Figs. 86 to 91 inclusive are diagrammatic views in the nature of cylindrical projections showing the parts in various stages of operation during a cycle of feeding, transferring, splitting and associated operations on a pair of pears, only a sufficient number of stemming tubes being illustrated to show the transfer of pears from the feeding mechanism into the transfer cups and thence onto the stemming tubes, and their removal from the stemming tubes onto the splitting blades.

Fig. 92 is a diagrammatic view showing the progress of pears through a complete cycle of operation of the stemming tube turret, beginning with the feeding operation and ending with the splitting of the prepared pears and their ejection from the machine.

Fig. 93 is a perspective view of a pear with a peeling cut partially completed thereon to show the helical path of the peeling knife.

Fig. 94 is an enlarged fragmentary perspective view of a connector standard for air hoses and tubes, portions being broken away to show the attaching fittings and air passages through the standard.

Before entering into a detailed description of the illustrated embodiment of the present invention the following brief description will assist in an understanding of the general arrangement and operation of the machine. Throughout the present description of the machine, the words "outwardly" and "inwardly" and words of like import will mean "radially outwardly or inwardly relatively to the central vertical axis of the machine," while "forwardly" and "rearwardly"' and words of similar import will mean "forwardly or rearwardly with respect to the rotative direction of the continuously rotating stemming tube turret." The terms "clockwise" and "counterclockwise" indicate the direction of rotation as viewed from above the machine.

A fruit feeding station A (Figs. 1, 2 and 3), at which an operator stands and feeds fruit into the machine two at a time, is adapted to receive and support containers, or lug boxes as they are called, of the fruit to be prepared, in this instance pears, from an ordinary roller conveyor B. A number of lug boxes are kept constantly at hand on the conveyor, so that as soon as one is emptied another will be immediately available. It will be understood, of course, that automatic feeding mechanism may be substituted for the hand feeding arrangement illustrated. Such a mechanism is shown for example in the pending application of Albert R. Thompson, Serial No.

762,190 filed July 19, 1947, now Patent No. 2,596,798.

The feeding station A has two feed cups, to be described in detail later herein, to receive the pears, stem end down, from the operator. These feed cups are in fruit receiving condition practically all of the time, so that it is not necessary for the operator to maintain a closely timed synchronism of operation with the machine. This tends to speed up operation and greatly reduces operator tenseness and fatigue. The stem ends of the pears are trimmed off in the feed cups just prior to their release therefrom.

A continuously rotating stemming tube turret C is mounted directly beneath the feed cups. A fruit transfer mechanism D (Fig. 1) is mounted for combined rotatively oscillating and vertically reciprocating movement to describe a path along a curved upright surface between the feed mechanism and the stemming tube turret. The operation of the transfer mechanism D is so timed with relation to the intermittent operation of the feed mechanism A and the continuous rotation of the stemming tube turret C as to position the transfer means directly beneath the feed cups when they open to discharge their fruit. The transfer means receives the fruit thus dropped, and then, after aligning the fruit axially, moves the fruit slowly downwardly and swings it in axially aligned congruent relation to impaled condition on a stemming tube 139. Thereafter the transfer means releases the fruit, is raised clear of the fruit, and again is returned to fruit receiving position beneath the feed cups in time to receive the next fruit discharged therefrom.

After a pear has been impaled on a stemming tube 139 the tube is tilted rearwardly from the vertical position, which it occupies during the transfer to the stemming tube stage of the cycle, to an axially horizontal position. In this horizontal position the stemming tube, and the pear impaled thereon, are slowly rotated about their common axis. While thus rotating, the pear is carried past a peeling stage E, Fig. 1, where successive spiral strips of peel are cut lengthwise from the fruit.

After passing the peeling stage of the cycle the stemming tube and the pear thereon again are swung to axially upright position, and pass beneath a combined fruit halving or splitting, seed cell severing, and calyx trimming station F (Fig. 2). This latter station is mounted to oscillate back and forth in timed relation with the operation of the fruit transferring mechanism D and the continuously rotating stemming tube turret C.

A fruit gripping means G (Fig. 2) is mounted to oscillate with the transfer means C and the splitting, calyx trimming and seed cell severing station F. The gripping means reaches down and grips the pears on the stemming tubes as they pass beneath the splitting station F, and draws the pears upwardly onto station F where the halving, seed cell severing and calyx trimming operations are performed.

Thereafter the fruit halves, now completely prepared, are released by the gripping means G and are ejected from the machine. This completes the fruit preparation cycle, and immediately thereafter the now upright stemming tubes from which the pears were removed by the gripping means again pass into alignment with the transfer means D whereupon the above cycle is repeated.

*Frame structure and drive*

The general arrangement of the machine and its principal operating assemblies and the manner of driving these principal assemblies by mechanical drive means will now be set forth. It will facilitate an understanding of the illustrative embodiment of the invention if it is borne in mind that the mechanisms pertaining to the orbital travel of the fruit around the machine are driven mechanically, while the mechanisms pertaining to fruit feeding, impaling, calyx trimming, seed celling, splitting and ejecting are principally operated by pneumatically actuated mechanisms controlled by cam actuated valves operated in timely relation with the mechanical driving mechanism. While having certain advantages, it is obvious, of course, that the pneumatic operation of the illustrated embodiment of the invention could be replaced, by a designer of ordinary skill, with mechanical actuating means such as the usual links, levers, cams, gears and the like employed for such purpose.

It will be of assistance in visualizing the machine as a whole to join the lower broken line of Fig. 4 with the upper broken line of Fig. 5. This will provide a composite vertical sectional view of the entire machine along the line 4—4 of Figure 3.

The present machine has a three part supporting base and drive housing 100 (Figs. 1, 2 and 5) comprising a circular lower base portion 101 of inverted cup shape with supporting legs 102 thereon. A substantially cylindrical intermediate base portion 103 is mounted on the lower base portion 101, and an upper cup-shaped base portion 104 is mounted on the upper edge of the intermediate portion 103. An oil sump and bottom closure plate 105 is secured to an inwardly projecting flange 107 in the lowermost base portion 101.

A circular horizontal waste trough 108 (Fig. 4) for catching the cores and peelings produced during the operation of the machine, surrounds the upper end of the uppermost base portion 104 and forms an integral part thereof. A lug box table 109, for supporting lug boxes 110, indicated in dotted lines in Fig. 1, is mounted on a supporting bracket 111, which is secured by cap screws 112 (Figs. 4 and 5) to a side of the intermediate base portion 103, and also to bosses 113 provided on a side of the annular waste trough 108. This bracket 111 also supports a fruit feed table 114 formed integrally with the feed table 109. A pair of feed cup assemblies, to be described in detail later herein, are mounted on the feed table.

The top closure plate 115 (Fig. 5) of the lowermost base portion 101, has a downwardly extending boss 117 formed centrally thereof. This boss has an internally threaded hole axially therethrough, into which a threaded bearing support bushing 118 is screwed. The bushing is secured in adjusted position by a set screw 119. The bushing 118 has the annular inner race of a roller bearing 121 fitted into an annular recess around its upper end as shown in Fig. 5. The roller bearing 121 is mounted rotatably to support the lower end of a barrel cam 122 which vertically reciprocates a fruit transfer head to be described later herein.

The barrel cam 122 is a composite member as best shown in Figs. 5 and 8, and comprises a lower cylindrical cam portion 123 formed integrally with a lower driven gear portion 124. The lower cylindrical cam portion has a cam face 125 formed on the upper edge thereof. A complementary upper cylindrical cam portion 127 has a lower cam face 128 thereon spaced from the cam face 125 on the lower cam portion 123 by a distance sufficient to permit a cam follower roller 129 to operate between these two cam faces. The upper and lower barrel cam portions 123 and 127 are secured rigidly together in axially aligned adjusted relation by a surrounding cylindrical sleeve 130 which is secured to the upper and lower cam portions by screws 131. The upper barrel cam portion 127 is journaled on a bushing 132 which is mounted on the lower projecting end of a stationary, tubular, central column 133 (Figs. 4 and 5).

The tubular central column 133 has a press fit in an upwardly projecting central boss 134 formed on the bottom plate of the uppermost base portion 104. The column is secured against rotation in this boss by a key 135 (Figs. 4 and 5).

A pair of stationary annular cam tracks 137 and 138 (Figs. 4 and 6) for controlling the tilting movements of stemming tubes 139 as they travel in a circular horizontal orbit around the machine, are mounted on the upper and lower ends, respectively, of an annular hub 140. The hub 140 is mounted on the stationary tubular central column 133, as shown in Figures 4 and 6, and is secured thereto by a locating key 141 (Fig. 4), and a jamb nut 142 and sleeve 143 (Fig. 46) which are inserted in a hole 144 drilled transversely through the hub. The hole 144 opens substantially tangentially into the axial bore of the hub. The jamb nut and sleeve are drawn into tight frictional engagement with the stationary central column 133 by a bolt 145.

A ring 150 having a segmental toothed rack 151 (Fig. 46) cut in the upper side thereof, and a stemming tube gear locking ring 152 (Figs. 4 and 6) are bolted in superposed relation on the lower cam track 138 for purposes to be explained later herein. An abutment ring 153 (Figs. 4, 6 and 10) is pressed onto the slightly reduced upper end of the hub 140 to seat in the shoulder formed by the offset between the lower and upper portions of the hub. The abutment ring 153 is of hard smooth metal such as heavy-chrome-plated steel, and is positioned so that the inner ends of stemming tube drive shafts 154 ride along it to receive the thrust of these shafts created upon their rotation by a worm gear to be described later herein.

A stationary mounting flange 155 (Figs. 4 and 6) is clamped tightly around the upper end of the stationary central column 133, and a stationary peeling arm pivot support plate 157 (Fig. 4) is secured to this flange by screws 158. A grease seal retaining washer 159 is secured in place on the plate supporting flange 155 by screws 160. The peeling arm pivot support plate 157 (Figs. 4 and 5) fixedly supports the upper ends of a plurality of upright peeling arm pivot pins 161 which are mounted between this stationary plate and the outer marginal edge of the annular waste trough 108. The peeling arms and their associated peeling mechanism will be described later herein.

From the foregoing it will be apparent that the central column 133, being securely fixed in the boss 134 of the uppermost base portion, will remain stationary during the operation of the machine; as likewise will the annular hub member 140, the thrust ring 153, the upper and lower stemming tube control cams 137 and 138 mounted on the hub 140, the stemming tube rotary drive rack ring 150, the stemming tube locking ring 152, and the peeling knife pivot support plate 157.

The machine is provided with a stemming tube turret 170 (Figs. 4, 6 and 10) which comprises interconnected upper and lower turret portions 171 and 172. The lower turret portion 172 is journaled on a bearing bushing 173 on the central column 133, and is supported on a thrust washer 174 on top of the boss 134.

The lower turret portion 172 has an upstanding marginal wall 175 around it, on the outer side of which are machined twelve similar, equally spaced, flat, stemming tube mounting faces 177 (Figs. 6 and 10). The wall 175, centrally of each of these faces, has openings 178 therethrough to receive twelve stemming tube mounting hubs 179. Each stemming tube hub has a marginal mounting flange 180 formed integrally therewith which overlies and seats on the face 177 around the hole in which the hub 179 is mounted. The flange 180 is secured to the turret wall by cap screws 181. The details of the stemming tubes will be described in detail later herein.

A rubber waste trough wiping blade 176 (Fig. 4) which conforms to the shape of the waste trough 108 is fastened to a radially projecting bracket 168 on the lower stemming tube turret portion 172 to sweep peelings and cores produced by the operation of the machine around the trough and out through a waste discharge opening 169 (Fig. 11).

The upper stemming tube turret portion 171 (Figs. 4 and 6) comprises a domed plate or cover portion 182 which is secured to the upper edge of the marginal wall 175 of the lower turret portion 172 by screws 183. The domed cover plate 182 has a hub portion 184 which is journaled on a bearing sleeve 185 on the stationary column 133. A ring gear 162 (Figs. 4, 6, 72 and 173) for driving a pneumatic control valve mechanism to be described later herein, is mounted on the upper stemming tube turret member by screws 163.

The entire stemming tube turret assembly is rotated as a unit at a constant speed in a counterclockwise direction during operation of the machine (Figs. 4, 9 and 13) by means of a train of gears (Figs. 9 and 13) the last of which, a spur gear 187, is in toothed driving engagement with an internally toothed ring gear 188 secured to the under side of the lower stemming tube turret portion 172 by screws 189. The spur gear 187 (Figs. 4 and 13) has a downwardly extending hub portion on which a gear 190 is mounted, and is secured thereto by a key 191. A bearing sleeve 192 is inserted in the bore of the spur gear 187 and is journaled on a stub shaft 193, which is mounted with a press fit in a hole in a support 194 secured to the bottom of the uppermost base portion 104.

The second gear 190 in turn is in toothed driving engagement with the upper toothed portion 197 of a double gear 198. A bearing sleeve 199 in the axial bore of the double gear 198 is journaled on a stub shaft 200 having a press fit in a hole in a boss 201 on the upper base portion 104. The double gear 198 is retained on the shaft by a collar 202 secured on the shaft by a set screw 203. The lower toothed portion of the double gear 198 (Fig. 13) is in toothed driven engagement with a pinion 204, secured by a key 205 to the upper end of a vertical drive shaft 207. The drive shaft 207 extends downwardly through the intermediate base portion 103 and into the lowermost base portion 101. On this shaft are secured cam drive pinions 208 and 209 (Figs. 7 and 8) for driving a face cam to be described later herein, and the barrel cam 122, respectively.

A diagonally toothed gear 210, as shown in Figs. 9 and 13, is of composite structure, and comprises a flanged bushing 211 (Fig. 13) which is secured to the upwardly extending hub portion of the pinion 204 by a set screw 212 screwed into a threaded opening in the flanged bushing 211, and passing diagonally through a hole in the hub of the pinion 204 into an indentation in the vertical drive shaft 207. A diagonally toothed annular portion 213, which may be of plastic or other suitable material, is fitted onto the flanged bushing 211 and is secured in position thereon by screws 214 which pass through a retaining washer 215 and the toothed annular portion 213, and are screwed into threaded holes in the flange of the bushing 211.

An automatic overload stop mechanism, for stopping the machine in case of breakage or jamming, is shown in Fig. 9. A drive shaft 220 has a triple grooved pulley 221 secured to its outer end, and is driven by triple V-belts 222 from an electric motor 223 (Fig. 1). The horizontal drive shaft 220 is journaled in a bearing sleeve 224 inserted in the outer end of a bushing 225. The bushing is mounted for axial slidable adjustment in a boss 227 which projects radially from the side of the uppermost base portion 104. The outer end of the axially adjustable bushing 225 is of irregular shape, for example, hexagonal, and fits into a correspondingly shaped hole in a spring pressure adjusting plate 228.

A pair of bushing adjusting screws 229 pass freely through holes in the adjusting plate 228, and are screwed into threaded holes in the boss 227. By screwing these screws inwardly the bushing 225 can be forced axially inwardly. A thrust ball bearing 230 is mounted in a recess in the inner end of the adjustable bushing 225. A coil spring 231 which is mounted around the shaft 220 and is held in compression between the thrust bearing 230 and the bottom of an annular recess 232 in a diagonally toothed drive gear 233.

The gear 233 is in toothed driving engagement with the diagonally toothed portion 213 of the gear 210 keyed to the upper end of the vertical drive shaft 207. The diagonal toothed driving gear 233 has an elongated, internally splined, integral hub portion 234 which is slidably mounted on a correspondingly splined portion 235 of the drive shaft 220 for driven engagement therewith. The inner end of the splined portion 235 of the drive shaft is of slightly reduced diameter as at 237. A spacing collar 238 (Fig. 9) is mounted on this reduced inner end portion, as is also the inner race of a ball bearing 239. The spacing collar 238 is seated against the inner ends of the splines on the splined portion 235 of the drive shaft, and holds the inner race of the ball bearing 239 in endwise spaced relation therefrom. An annular spring retaining clip 240 is seated in an annular groove around the inner end of the drive shaft to retain the inner bearing race and the spacing collar 238 against endwise displacement on the drive shaft 220.

The outer race of the ball thrust bearing 239 is mounted in a bearing support 241 bolted to the transverse bottom plate of the uppermost base portion 104 and is retained in the support 241 by a retaining ring 246 inserted in an annular groove in the support. A switch actuating arm 242 is pivoted on a stud 243 so that a rounded nose portion on the free end of the arm 242 will overlie the outward side of the diagonal drive gear 233.

A spring pressed thrust pin 244 is mounted in a tubular casing 245 which is inserted in a hole through a boss 247 in the side wall of the uppermost base portion 104 and is retained in position therein by a plate 248 which grips a marginal flange on the spring casing and is secured to the boss 247 by screws 249. The inward end of the pin is spaced slightly from the switch actuating arm 242 so as not to exert pressure thereon when the diagonally toothed drive gear 233 is in its normal or radially innermost position, as shown in Fig. 9. The outer end of the spring pressed thrust pin 244 is mounted closely adjacent the actuating button of a sensitive switch 250 so that a short outward movement of the thrust pin will operate the switch, which in turn is arranged to operate a usual cut-off relay to de-energize the driving motor.

The rotative direction of the drive shaft 220, the slope of the teeth of the gear 233 and the direction of rotation of the diagonally toothed composite gear 210 are such that when an excessive driving torque is imposed upon the driving gear 233, the resultant counter-torque and cam action will force the drive gear 233 axially outwardly against the pressure of the compression spring 231, thereby causing the switch actuating arm 242 to move the spring pressed thrust pin outwardly to operate the sensitive switch 250 and thereby de-energize the driving motor. The amount of pressure exerted on the driving gear 233 by the spring 231 may be adjusted by turning the screws 229 inwardly or outwardly as required.

A rotatable tube 251 (Figs. 4, 5 and 7) for supporting and oscillating a fruit halving, calyx trimming and seed cell severing head 252, herein referred to generally as the splitting head, is journaled in a bearing sleeve 253 in the externally threaded lower bearing support bushing 118. The oscillating tube 251 is supported against downward axial thrust by a ball thrust bearing 254. The lower race of the ball bearing 254 is seated on the upper end of the externally threaded bushing 118, and the upper race of this bearing is engaged by an offset shoulder 255 formed by reducing the diameter of the lower end portion of the splitting head support tube 251. This shoulder is widened to provide additional thrust support for the bearing by welding a collar 257 around the tube with the lower face of the collar in the same transverse plane as the shoulder 255 on the shaft. To prevent upward displacement of the oscillating tube 251, a plain thrust washer 258 is mounted between the lower face of the internally threaded boss 117, and a face-cam-actuated oscillating arm 259 (Figs. 5 and 7).

The oscillating arm 259 (Figs. 5 and 7) is secured, by a key 260 and a clamp bolt 261, to the lower end of the oscillating, splitting head support tube 251. The arm 259 has a cam follower roller 262 journaled on a post on its outer end. This cam roller is mounted to ride in a cam groove 263 formed in the upper side of a face cam 264. The face cam (Fig. 7) is journaled on a stub shaft 265 mounted with a press fit in a hole in the upper plate 115 of the lowermost base portion 101. The face cam 264 has an annular toothed periphery, concentric with its axis of pivotal support on the stub shaft 265. This toothed periphery is in driven engagement with the drive pinion 208 keyed to the lower end of the vertical drive shaft 207. This drive shaft, as set forth previously herein, is driven by the diagonally toothed driven gear 210 in the gear train shown in Figs. 9 and 13. The face cam is rotatably driven at six times the speed of the stemming tube turret 170. The splitting head 252 (Figs. 4 and 12) is secured by a pair of clamp bolts 270 and key 271 (Fig. 12) to the upper end of the oscillating tube 251.

A transfer head 272 (Figs. 4 and 11) is secured by a key 273 and a split clamp 274 (Fig. 11) to the upper end of a vertically reciprocating tube 275. The vertically reciprocating tube 275 has bearing sleeves 277 and 278 mounted in its upper and lower ends, respectively. These bearings journal the oscillating splitting head support tube 251 to permit axially slidable movement of the transfer head support tube 275 thereon. A packing ring 279 (Figs. 4 and 11) is retained in an annular recess in the upper end of the reciprocating transfer head support tube 275 above the upper bearing sleeve 277 therein, by a retaining washer 280, which is secured to the transfer head by three small screws 281.

A barrel cam follower support arm 282 (Figs. 5 and 8) is secured to the lower end of the reciprocating, transfer head mounting tube 275, and the barrel cam follower roller 129, previously referred to herein, is journaled on a bolt 283 mounted to extend radially from the arm 282. The barrel cam drive pinion 209 (Fig. 8) secured to the vertical drive shaft 207, is in toothed driving engagement with the gear portion 124 formed on the lower portion 123 of the barrel cam 122. The barrel cam 122 is rotated by its drive pinion 209 at the same rotative speed as the face cam 264, namely, six times the speed of the stemming tube turret 170.

A coil compression spring 284 (Figs. 4 and 5) for counter-balancing the weight of the transfer head 272, is mounted internally of the oscillating tube 251. The lower end of the spring 284 is supported on a perforated disk 285 welded transversely across the lower end of the bore of the oscillating tube 251. The counterbalancing spring 284 exerts a resilient upward pressure on the lower end of a threaded boss 286 screwed into the upper end of a tube 287 slidably inserted in the upper end of the oscillating tube 251. A cross arm 288 having the boss 286 formed centrally thereon, is secured transversely across the upper end of the spring pressed tube 287 and this cross arm is connected (Figs. 1 to 4) by depending posts 289 and 290, to the transfer head 272. The force of the coil spring 284 in compression is designed to substantially counter-balance the weight of the transfer head.

In addition to being moved reciprocally by the action of the barrel cam 122, the transfer head 272 also is connected to oscillate in unison with the splitting head 252 by a roller and track interconnection between these two members best shown in Figs. 1, 11 and 12. The oscillating splitting head 252 has a downwardly extending arcuate track supporting plate 291 secured to a marginal edge thereof by screws 292 (Fig. 12) passing downwardly through holes in a laterally extending flange 293 of the track supporting plate which overlies the margin of the splitting head 252.

A vertical, radially inwardly opening channeled cam track 294 is formed by a pair of ribs welded vertically on the inner side of the arcuate plate 291 and spaced apart to receive therebetween a follower roller 297 (Fig. 11) journaled on a bracket 298 secured to the transfer head 272. During vertical reciprocating movement of the transfer head 272 therefore, this roller and track arrangement causes the transfer head to be oscillated in synchronism with the splitting head.

From the foregoing it will be apparent that upon operation of the driving motor the stemming tube turret will be rotated continuously at a constant speed, the splitting head will be oscillated back and forth, and the transfer head, with a major portion of its weight counter-balanced by the coil compression spring 284, will be reciprocated vertically while being oscillated in synchronism with the splitting head, the cyclical rate of operation of the transfer and splitting heads being six times the rotative rate of the stemming tube turret.

*Feeding and stem end gauging mechanism*

The feeding and stem end gauging mechanism (Figs. 1, 3, 4, 16, 17, and 19 to 27 inclusive) comprises a pair of feed cup assemblies 300 mounted beneath openings in the feed table 114. Since both feed cup assemblies are the same, one only thereof will be described.

Each fruit receiving feed cup comprises a pair of downwardly tapered half cup portions 301 and 302 of substantially rectangular cross section. Each of these cup portions is secured by a set screw 303 (Fig. 19) to a mounting shaft 304 which is pivotally mounted in bearing brackets 305 (Fig 17) mounted on the under side of the feed table. One of each pair of the feed cup mounting shafts 304 (Figs. 17 and 22) has an upwardly extending bifurcated actuating arm 307 secured on its inward end, while the other of said shafts has a similar but downwardly extending actuating arm 308 secured thereon.

A feed cup actuating slide member 309 is mounted for endwise slidable movement transversely of all of the feed cup shafts 304 (Figs. 17 and 22). Slotted holes 310 are provided in the slide member 309 to receive the feed cup shafts 304 therein. The holes are of a length to permit sufficient longitudinal sliding movement of the slide 309 to operate the feed cups as will be explained later herein. A limit stop abutment 311 (Figs. 17, 22, 23 and 24) is mounted for longitudinal adjustment on the slide 309 to extend part way over one of the slotted holes 310 to permit adjustment of the normal or closed position of the feed cups.

A pair of laterally projecting ears 312 and 313 (Figs. 26 and 27) are formed on opposite sides of the slide 309, and each of these ears has a roller 314, journaled on a stud 315, mounted thereon. These rollers are adapted to ride between the bifurcations of the oppositely extending bifurcated actuating arms 307 and 308 on the feed cup shafts to swing the half portions 301 and 302 in opposite directions toward or away from each other during endwise movement of the actuating slide 309.

A feed cup closing coil spring 317 (Figs. 23 and 25)

is held in tension between a bracket 318 on the slide 309, and a side flange of the feed table 114 to urge the slide toward the left from the cup's open position shown in Fig. 23, thereby closing the feed cups and urging the piston plunger 319 of an air cylinder 320 toward the left to its normal or unoperated condition (Fig. 22). Actuation of the air cylinder 320 forces the piston plunger 319 toward the right to the position illustrated in Fig. 23 for opening the cups.

Since pears vary as to their diameter and length of neck, pears inserted stem end first into the feed cups would be apt to have their lower ends located at different heights relative to the lower ends of the feed cups. It is desirable to position the stem ends of the pears in predetermined position relatively to stem end trimming knives to insure uniform stem trimming. To achieve such uniform positioning of the stem ends of the pears, a pair of gauging fingers 330 and 331 are mounted, one on the lower end of each of a pair of vertical gauging finger support shafts 332 and 333 (Figs. 17, and 20 to 27).

The gauging finger shafts are pivotally and slidably mounted in vertically aligned bushings 334 and 335 in the upper and lower horizontal flanges, respectively, of a sheet metal bracket 337, shown best in Figs. 17 and 22. The bracket is secured to the inner face of an inwardly sloping wall of the feed table 114. On the lower end of each of the gauging finger support shafts 332 and 333 is secured a laterally extending arm 338 having enlarged lug portions 339 and 340 on the ends thereof (Figs. 17 and 23). The lug 339 on one end of each of these arms is drilled to receive the lower end of the vertical support shaft 332 or 333 therein, and is secured in adjusted position thereon by a set screw 341. The lug 340 on the other or free end of each of the gauging finger support arms 338 has a hole drilled diagonally therethrough to recieve therein the upper end of a bent rod 342 which constitutes the gauging finger.

The lower end portions of the gauging fingers 342 are bent to extend transversely beneath the feed cups, and are adapted to be swung from a fully opened or separated position (Fig. 27) wherein they will clear a pear dropped between them upon the opening of the feed cups, to a fully closed position (Fig. 26) wherein they will grip and center the stem of a pear between them.

The upper ends of the gauging finger support shafts 332 and 333 (Fig. 21) have similar but oppositely extending lever arms 343 and 344 secured thereto. A spring biased plate 345 for exerting resilient downward pressure on the gauging finger support arms, and for synchronizing pivotal operation of the gauging finger shafts with each other, overlies the upper ends of the gauging finger support shafts and their lever arms 343 and 344 (Fig. 21). The synchronizing plate 345 has laterally elongated slotted openings 347 (Fig. 16) to receive the shanks of crank studs 348 therein, one of which is screwed into the outer or free end of each of the lever arms 343 and 344. Since the arms 343 and 344 of each pair of gauging fingers extend laterally therefrom in opposite directions, longitudinal movement of the synchronizing plate will cause the fingers of each pair to rotate synchronously in opposite directions toward or away from each other as the case may be. A coil spring 349, for urging the gauging fingers downwardly, is connected in tension between a cotter pin 350 mounted in a hole in the synchronizing plate 345 and a cotter pin 351 in the lower flange of the mounting bracket 337, respectively.

A cam actuated lever arm 352 (Figs. 23, 25, 26 and 27) for pivotally operating the gauging fingers 330 and 331 is clamped securely to one of the gauging finger support shafts 333. Due to the interconnection between the gauging fingers provided by the synchronizing plate 345, pivotal movement of any one finger causes corresponding but opposite rotative movement of the fingers of each pair thereof. A cam follower roller 353 is journaled on the free end of the lever arm 352 and rides in an angularly bent cam track formed in an upwardly extending cam bracket 354 on the feed cup actuating slide 309. This angle cam track is of sufficient height to permit the roller 353 to ride up and down therein while the gauging finger shafts 332 and 333 are being moved from their lowermost position (Fig. 25) to their uppermost position (Figs. 26 and 27).

When the gauging finger support shafts 332 and 333 are in their lowermost position (Fig. 25) the cam follower roller 353 will be positioned adjacent the lower end of the angle cam 354 which will tend to swing the gauging fingers of each pair apart, while, when they are raised to their uppermost limit of movement (Fig. 26) the roller will be in the upper vertical portion of the cam track tending to swing the fingers together. However, regardless of their vertical position, when the air cylinder 320 is operated to move the piston plunger 319 to actuate the feed cup slide 309 the cam actuated arm 352 will be swung toward the right from the position of Fig. 26 to the position of Figs. 23 and 27. This movement of the feed cup slide, which opens the feed cups, also swings the gauging fingers wide apart so as to permit pears dropped by the feed cups to fall freely between the gauging fingers.

The raising of the gauging finger support shafts 332 and 333 against the tension of the coil spring 349 (Figs. 3, 12, 17, 22, 25 and 26) is accomplished by a pair of fingers 357 and 358 secured by set screws 359 to a rock shaft 360 pivotally mounted in brackets 361 (Fig. 17) secured to the inner side of the gauging finger mounting bracket 337. The inward or free end of each of the fingers 357 and 358 (Figs. 17 and 22) extends between a pair of gauging finger support shafts 332 and 333 and directly beneath a pair of collars 362 secured by set screws on the gauging finger support shafts. Thus a rocking movement of the rock shaft 360 from the position shown in Fig. 17, to swing the free ends of the fingers 357 and 358 upwardly, will raise the gauging finger support shafts (Fig. 26) against the tension of the coil spring 349.

Rocking the shaft 360 thus to raise the gauging fingers is accomplished by a thrust link 363 (Figs. 3, 4, 12 and 17) the outermost end of which is pivotally connected by a usual ball type connector 364 to the free end of a lever arm 365 which also is secured to the rock shaft 360. The inner end of this thrust link 363 is slidably inserted in a tubular socket 367 (Figs. 3 and 12) which is pivotally connected to the outer end of a bracket 368 secured to the splitting head 252 to swing therewith. The sliding socket connection 367 is designed to have the link 363 bottom therein slightly before the splitting head reaches its counterclockwise limit of swing on each cycle thereof so that during the terminal portion of such swing the link 363 will swing the arm 365 rocking the rock shaft 360 and raising the free ends of the fingers 357 and 358 to raise the gauging fingers 330 and 331 to their uppermost position (Figs. 26 and 27).

It is necessary to retain the gauging fingers in their upraised condition after a pear has been dropped by the opening of the feed cups for a length of time sufficient to permit a pair of transfer cups, hereinafter described, to swing sidewise to a position beyond both feed cups in order to prevent interference between the gauging fingers and an uppermost portion of the transfer cups. However, since the splitting head and the interconnected transfer cups begin to swing in a clockwise direction shortly after each opening of the feed cups, and since such clockwise rotative movement of the splitting head as seen in Fig. 12 will remove the thrust from the thrust link 363, thereby tending to allow the gauging fingers to be drawn downwardly by their coil spring 349, supplementary means are provided for holding the gauging fingers raised until the transfer head 272 starts its downward travel.

Such supplementary means for holding the gauging fingers in their upraised condition comprises a spring biased thrust pin 370 (Figs. 17, 25, 26, 27) which is adapted to be engaged by an oblong plate 371 (Figs. 11 and 12) mounted on the transfer head 272. This plate 371 is of sufficient length to remain beneath the thrust pin 370 during the portion of the oscillation of the transfer head when the head is up. The thrust pin 370 (Figs. 17, 20, 22 and 25) is mounted for vertical slidable movement in a bushing 375 secured to the inward side of a vertical wall portion of the sheet metal bracket 337. A cotter pin 378 (Fig. 22) limits the downward movement of the thrust pin to the position shown in Fig. 25.

A tubular sleeve 379 with a button head is mounted for limited slidable movement on the lower end of the pin 370. The sleeve 379 is limited in its sliding movement by a stop pin 380 mounted in a hole transversely through the lower end of the pin 370, with the ends of the pin riding in elongated slots 381 (Figs. 17 and 25) in the sleeve. A light coil spring 382, insufficient to overcome the tension of the gauging finger return spring 349, is mounted in compression between the marginal flange of the button head of the sleeve 379 and a washer 383 which is mounted on the pin 370 and is secured against upward displacement by cotter pin 384 mounted through a hole in the thrust pin. The thrust pin 370 is of a length to be engaged by the elongated plate 371 on the transfer head 272 when the transfer head is in its raised condition with the sleeve 379 raised to bottom the coil spring 382.

Thus the gauging fingers 330 and 331 are raised to their uppermost limit of movement (Figs. 26 and 27) by the action of the thrust link 363 as the splitting and transfer heads reach their common limit of counter-clockwise rotation, and the gauging fingers are retained in such raised condition after the splitting and transfer heads swing in a clockwise direction until the transfer head moves downwardly sufficiently to permit the spring 349 to lower the gauging fingers to their normal position (Fig. 25).

*Stem end trimming mechanism*

Two oppositely facing pairs of notched, spring biased, stem end trimming blades 387 and 388 are mounted beneath each of the feed cups 300, to clip off the stem ends of the pears after they have been raised upwardly in the feed cups by the gauging fingers (Figs. 17, 19, 22, 23, and 24). These stem end trimming blades are mounted inwardly of the outer vertical lower wall of the feed table 114 on two oppositely moving carriages 389 and 390 with the notched sharpened edges of each cooperating pair of blades facing toward each other.

The two carriages are mounted for opposite endwise slidable movement on a pair of track rods 391 and 392, which in turn are mounted, by bolts 397 and washers 398 (Fig. 19) between mounting brackets 393 and 394, secured by screws 395 (Figs. 23 and 24) to the inner face of the vertical wall of the feed table 114. The two stem end trimming blades 387 facing in one direction are mounted on the carriage 389, while the two cooperating blades 388 facing in the other direction are mounted on the other carriage 390. Each carriage comprises a longitudinally extending body member 399 with a pair of blade mounting brackets 400 formed integrally thereon. The blade mounting brackets 400 are offset laterally from the longitudinal mid-plane of their body members by a distance equal to the thickness of the blades 387 and 388.

The two carriage body members are similar to each other, but are mounted in end-for-end reversed position, so that when the blades of the two-cooperating pairs thereof approach into overlapped shearing relation as shown in Figs. 17 and 24 they will lie in close, shearing juxtaposition to each other without binding. The inner end 408 of each of the trimming blades is bent at an acute angle away from its cooperating blade to act as a cam tab to prevent the blades from overlapping and interlocking with each other during a cutting stroke.

Carriage end members 401 and 411 are mounted one on each end of each carriage body member 399. These end members each comprise a central vertical bar portion 403 (Figs. 17 and 19) with rounded end bosses 402 and 409 formed one on each end thereof. Each body member 399 is secured to its end members 401 and 411 by screws 418 (Fig. 19).

The rounded bosses 402 and 409 of the right hand end member 401 of the left hand carriage 389 as shown in Fig. 19 are drilled out to receive bracing tubes 404 and 405 therein, respectively. The boss 409 is secured to the tube 404 by a set screw 407, while the other boss 402 of the same end member 401 slides freely on the other tube 405. The boss 409 of the left hand end member 411 of the left hand carriage is secured by a set screw 416 to the other end of the tube 404, and the boss 402 of this end member 411 slides freely on the rod 391.

The right hand carriage is constructed the same as the left hand carriage and is mounted reversely thereto as shown in Fig. 19. The tubes 404 and 405 are slidably mounted on the track rods 392 and 391, respectively. The two carriages are mounted with one end member 401 of each interposed between the end members 401 and 411 of the other, as shown for example in Fig. 19, so that the carriages are free for relative endwise sliding movement on the rods 391 and 392 between their cocked positions shown in Fig. 19 and their actuated positions shown in Fig. 24.

A coil spring 410 is mounted in tension between a screw hook 412 (Figs. 22 and 23) secured to the left hand side flange of the feed table 114 as viewed in Fig. 19, and a stud 413 mounted on the opposite end of the right hand knife carriage 390. A similar coil spring 414 is similarly connected between a second screw hook 415 secured to the right hand side flange of the feed table and a stud 417 on the left hand end of the left hand blade carriage 389. The tension of these two coil springs tends to draw their connected carriages 389 and 390 and the two pair of blades mounted thereon toward each other into shearing relation as shown in Fig. 24. The blades 387 and 388 are mounted on the carriages so as to be in a centered position beneath the feed cups at the end of their operative or cutting stroke which is limited by the abutting of the carriage end members against each other in the position shown in Fig. 24.

The blade supporting carriages are moved to their open or cocked positions shown in Figs. 19, 22 and 23 by the blade cocking slide member 454 upon operation of the feed cup actuating air cylinder 320. The carriages are latched in this open or cocked condition by a sear plate 459 (Fig. 19) which has a notched recess 465 therein to receive the bosses 402 and 409 of the adjacent carriage end members 401 of the blade carriages when in their cocked positions shown in Fig. 19 and retain the carriages in such cocked positions. The means for actuating the sear plate will be described later herein.

The mechanism for cocking the stem end trimming blades comprises a cocking lever retaining plate 420 (Figs. 17, 19, 22 and 23) having a vertical slotted opening 421 therein. The plate 420 is mounted on stud screws 422 and 423 to be supported in inwardly spaced relation from the outer wall of the feed table 114. The feed table wall has a vertically elongated recess 424 therein (Fig. 17) directly underlying the slotted opening 421 in the retaining plate 420 and conforming in size and shape to the slotted opening.

A pair of bell crank cocking levers 427 and 428 are pivotally mounted on the stud screws 422 and 423. The left hand bell crank cocking lever 427 as shown in Figs. 19 and 22 is made from a single plate of metal, and has an upwardly directed carriage engaging arm 429, and an integrally formed laterally directed link-connected arm 430. The right hand bell crank lever 428 is similar in outline to the single piece left hand bell crank lever 427, but is assembled from three parts (Figs. 19 and 22) comprising an arm 431 similar to the upwardly directed arm 429 of the left hand bell crank lever, a spacing washer 433 and a laterally directed link-connected arm 434 similar to the laterally directed, arm 430 of the left hand bell crank lever. All three of these parts comprising the right hand bell crank lever 428 are brazed or welded together into a single composite unit. The offset structure thus provided for the right hand bell crank lever is necessary in order that the upwardly directed arms 429 and 431 of the two bell crank levers will lie in the same plane with each other while the two laterally directed arms 430 and 434 will be offset from each other, and thereby will permit these two arms to be superposed as shown sectionally in Fig. 17 with a vertically reciprocating thrust link 435 interposed between them.

The superposed portions of the lateral arms 430 and 434 of the bell crank levers are provided with similar slotted openings 437 and 438 (Figs. 17 and 19) elongated in direction of the length of the lever arm in which they are provided. A cocking lever actuating pin 439 (Fig. 17) is mounted in a hole in the lower end of the vertical thrust link 435, with the inner end of the pin passing through the slotted hole 437 in the lateral arm 434 of the bell crank lever 427 and riding in the elongated recess 424 in the feed table wall, and its outer end similarly passing through the elongated hole in the lateral arm of the other bell crank lever 428 and riding in the slotted opening 421 in the retaining plate 420.

A pair of rollers 440 and 441 are mounted on the pin 439 on opposite sides of the vertical thrust link 435, and these rollers ride in the slots 437 and 438 in the lateral arms of the bell crank levers, and swing the bell crank levers about their axes on vertical reciprocation of the thrust link 435.

The upper end of the thrust link 435 is bifurcated (Fig. 17) and is pivotally connected to the outer end of a lever arm 447 inserted between the bifurcations of the lever arm. The lever arm 447 is secured to a rock shaft 448 (Figs. 17 and 22) which is pivotally mounted in a hole drilled in the forward wall of the feed table and in a bearing boss 449 on the under side of the feed table (Fig. 22). A second lever arm 450 for operating the rock shaft 448 (Figs. 22, 23 and 24) is mounted on the inner end thereof. The inner lever arm 450 has a longitudinally slotted opening therein to receive a roller 451 (Figs. 22, 23 and 24) journaled on a stud 452 mounted on an ear 453 which extends laterally downwardly from the blade cocking slide 454.

The blade cocking slide 454 is generally similar to the feed cup actuating slide 309 and has three longitudinally slotted openings to receive the three left hand feed cup support shafts 304 therein as shown in Figs. 22, 23 and 24. The blade cocking slide 454 is interposed between the feed cup actuating slide 309, and the feed cup actuating lever arms 307 and 308 and is slidable relatively to the feed cup actuating slide 309, so that when the feed cup actuating slide 309 is returned, by the feed cup closing coil spring 317, to its normal condition shown in Fig. 22 after actuation by the piston plunger 319 of the air cylinder 320, the blade cocking slide 454 will not be forced to return therewith but may remain in its right hand cocked position as shown in Fig. 22.

The left-hand end of the blade cocking slide, as shown in Figs. 22, 23 and 24, is positioned to be engaged by the piston plunger 319 upon actuation of the air cylinder 320, so that when the feed cups are opened by the actuation of this air cylinder, the knife cocking slide 454 will be operated simultaneously therewith, thereby rocking the shaft 448 and forcing the cocking link 435 upwardly to the position shown in Figs. 19 and 22. This swings the bell crank levers 427 and 428 in opposite rotative directions about their axes on the studs 422, 423 moving their upwardly extending arms 429 and 431 away from each other. The upper ends of the upwardly extending bell crank lever arms 429 and 431 are positioned between a pair of thrust plates 457 and 458 mounted one on each of the blade carriages 389 and 390, so that the blade carriages are moved apart endwise by the pivotal movement of the bell crank levers to separate the blades as shown in Figs. 19 and 23.

A dash pot 442 (Fig. 19) comprising a cylinder 443 and piston 444, is mounted between pivot pins 445 on the upwardly directed arms of the bell crank levers 427 and 428, respectively, to cushion their action when moving from a cocked to an actuated position under the tension of their actuating springs. The dash pot piston and cylinder are retained on their mounting pins by cotter pins 446.

The sear plate 459 (Figs. 17, 19 and 24) which latches the carriages in their cocked position, is riveted and brazed (Figs. 17 and 19) to bridge the gap between the separated ends of a pair of axially aligned rock shaft portions 460 and 461. These rock shaft portions are pivotally mounted in holes in the side flanges of the feed table 114 (Figs. 19 and 24) and are secured against endwise displacement therein by collars 462 secured to the outer ends of the rock shaft portions by set screws 463 (Figs. 23 and 24). The sear plate 459 is notched out at 464 (Fig. 19) to allow the knife cocking shaft 448 to pass freely therethrough.

The sear recess 465 in the outer face of the sear plate 459 (Figs. 19 and 24) is adapted to receive, and to retain in cocked position, therein, the rounded upper end bosses 402 and 409 of the interposed carriage end members 401 when they are brought together (Fig. 19) in their blade-separated or cocked position against the tension of the blade carriage actuating coil springs 410 and 414.

A sear actuating lever arm 467 (Figs. 17, 19, 22 and 24) is secured to the sear mounting rock shaft portion 460 near the left-hand end thereof, and is connected by a link 468 and bracket 469 to the spring biased piston 470 of a pneumatic cylinder 471. On introducing compressed air into the cylinder 471 the piston 470 will be raised against the tension of its spring, not shown, thereby raising the link 468 and rocking the sear shaft 460 to raise the sides of the sear recess 465 out of latching engagement with the relatively interposed carriage end members 401. The coil springs 410 and 414 thereupon draw the blade carriages 389 and 390 rapidly together against the cushioning resistance of the dash pot 442 to the position shown in Fig. 24.

The feed interrupting flaps 477 (Figs. 16, 17 and 20) which may be of sheet rubber, are mounted to extend radially from a rock shaft 478 which is pivoted in brackets 479 secured by screws 480 to the sloping inner wall of the feed table 114. The flaps are of a size and shape substantially to cover the feed cup openings when the flaps are swung downwardly to the closed position indicated in dot-dash lines in Fig. 20. A backing finger 481 of sheet metal is mounted on the inner or upward side of each flap to prevent the flap from flexing unduly when the rock shaft is swung rapidly downward during a flap closing operation.

A bevel driven gear 482 (Figs. 16, 17 and 20) is secured to a laterally extending end portion of the flap mounting shaft 478, and is in toothed, driven engagement with a similar bevel driving gear 483 mounted on a shaft 484 (Figs. 16, 20 and 23) journaled in a bracket 485 secured along the side flange of the feed table. The lower end of the shaft 484 has a lever arm 487 secured thereto which is connected by linkage 488 (Figs. 20 and 24) to an arm 489 secured to the mounting shaft 304 of the lefthand feed cup half portion 301. Thus upon an opening movement of the feed cups, the feed interrupting flaps 477 will be swung downwardly to their closed position, and upon a closing movement of the feed cups, the flaps will be swung to their raised, open, position.

*Fruit transfer and impaling mechanism*

The mechanism for receiving the pears when they are dropped from the feed cups 300, and for impaling them on the stemming tubes, is shown in Figs. 4, 11, and 28 to 35 inclusive. A pair of transfer cup assemblies 490 and 491 are mounted on the transfer head 272 to extend outwardly therefrom. The transfer head 272, as described previously herein, is mounted on the upper end of the vertically reciprocating tube 275 to reciprocate therewith, and has track and roller connection 294 and 297 (Fig. 11) with the oscillating splitting head 252 to also oscillate therewith. Since the two transfer cup assemblies 490 and 491 are similar to each other, one only will be described.

The transfer cup assemblies are removable bodily from the transfer head plate 276, and one thereof is shown in such removed condition in Figs. 28 to 35 inclusive. The transfer cup assemblies are mounted on the transfer head plate 276 by a plurality of studs 581 extending upwardly from the transfer cup frame and inserted in holes provided therefor in the transfer head. Nuts 586 screwed onto the studs 581 secure the assemblies in mounted position (Figs. 4 and 11). The transfer cups 490 and 491 comprise a pair of downwardly tapered, similar, but reversed, half cup portions 492 and 493 of substantially rectangular configuration in cross section.

The transfer cup portions are mounted on the bent ends of supporting shafts 494 and 495, respectively, which in turn are pivotally mounted in carriages 497 and 498. The carriages also are similar, but opposite, to each other.

Each transfer cup supporting carriage (Figs. 30 and 31) comprises a body portion or block 499 having a flat top and rounded under side. A pair of laterally extending tubular inserts 500 and 501 are mounted in holes drilled transversely through each body portion 499 near the ends thereof, and these inserts are brazed in position therein. The tubular inserts 500 and 501 are slidably mounted on a pair of track rods 502 and 503. The track rods are securely mounted, by screws 504, between the downturned ends 507 and 508 of a lower transverse sheet metal portion 509 of a transfer cup mounting bracket 510.

Each carriage body portion 499 has a notch 511 in its under side to receive the hub of a cup-tilting lever 512 therein. Each cup tilting lever 512 is mounted on one of the transfer cup mounting shafts 494 or 495 and is secured thereto by a set screw 513 (Fig. 30). Connecting links 514 (Figs. 30 and 34) are pivotally connected at their lower ends to the lever arms 512 and at their upper ends (Fig. 34) to a piston 515 mounted in a pneumatic cylinder 517 which in turn is mounted in a rounded notch in the outer edge of the lower sheet metal bracket plate 509 and is brazed thereto (Figs. 30, 31 and 35).

A downward limit stop for the piston 515 comprises a block 518 (Figs. 30, 31, 32 and 35) secured on the inner side of the cylinder 517 by a screw 519 which is inserted through a hole in the cylinder wall and is screwed into a threaded hole in the block. Thus on a downward movement of the piston 515 the transfer cup portions 492 and 493 will be swung downwardly about their pivotal mounting shafts 494 and 495 toward fruit releasing position as shown in dot-dash lines 492a and 493a in Fig. 34.

Oppositely coiled torsion springs 520 and 526 (Figs. 28, 29, 30, 31 and 35) for urging the cups toward a normal, upwardly swung position, are mounted to encircle the cup mounting shafts 494 and 495. The outer or left-hand end portions of each of the torsion springs 520 and 526 (Figs. 28 to 31 inclusive) are bent to extend axially endwise from the coil. These endwise extending portions of the springs are inserted in holes drilled in collars 521 secured in adjusted position, by set screws 522, to the transfer cup mounting shafts 494 and 495, respectively. The inner or right-hand end portions of the torsion springs as shown in Figs. 28 to 31 inclusive, are similarly bent and are inserted in holes drilled in the outer ends of the carriage body members 499. The torsion springs tend to swing the shafts 494 and 495 and their supported transfer cup portions inwardly and upwardly about their respective shafts (Fig. 34) toward a fruit receiving position as shown in Fig. 32, thereby tending to raise the cup tilting piston 515 to its normal position shown in Fig. 34.

In addition to the pivotal movement about their shafts, the transfer cups are mounted for bodily lateral movement toward and away from each other by slidable movement of their supporting carriages 497 and 498 on the rods 502 and 503. Co-ordinated slidable movement of the transfer cup carriages toward and away from each other is accomplished by a usual type of double acting air cylinder 523 (Fig. 35) brazed into a correspondingly curved recess in the under side of a pillow block 524 (Figs. 31 and 33) secured to the under side of an upper bracket portion 525 by two countersunk head screws 527, (Figs. 28 and 33). A pair of pivot posts 528 and 529 (Figs. 28 and 35) are each pivotally mounted in a pair of bushings 530 and 531 (Figs. 29 and 31) brazed in holes in the bracket lower portion 509 and the upper portion 525. The bushings of each pair thereof are axially aligned and are spaced apart to receive between them a piston connected lever arm 532 (Figs. 31, 33 and 35). The lever arms 532 extend toward each other, and their free ends are rounded, and are inserted in correspondingly rounded notches in the sides of a block 533, secured on the outer end of the piston rod 534 of the pneumatic cylinder 523.

An outwardly extending arm 537 is brazed onto the lower end of each of the pivot posts 528 and 529 beneath the lower bracket portion 509 to overlie each of the carriage body portions 499. A roller 538, (Figs. 34 and 35) is pivotally mounted on the under side of the outer end of each of the arms 537 and rides in an elongated recess 539 formed in the flat upper side of each carriage body portion 499. The pivot posts 528 and 529 (Fig. 35) and their securely connected lever arms 532 and 537 thus act as bell crank levers to move the carriages 497 and 498, and their supported transfer cup portions 492 and 493, toward and away from each other in opposed, co-ordinated relation upon reciprocation of the notched piston block 533.

Movement of the piston rod 534 and an associated piston 535 to their inward retracted limit of movement, as shown in solid lines in Fig. 35, moves the carriages toward each other and brings the transfer cup portions 492 and 493 together to axially align a pear therein; while movement of the piston to its outer or extended limit of movement, as indicated in dot-dash lines in Fig. 35, moves the carriages to their fully separated condition, for releasing a pear after it has been impaled on a transfer tube in a manner to be set forth later herein.

A leaf spring 540 is secured to the under side of the upper bracket portion 525 at one side thereof, and has a downwardly bent portion 541 with a screw 542 screwed into a nut 543 brazed onto the lower end of the spring 540 and secured in adjusted position therein by a lock nut 544. The screw 542 is engaged by the side of the carriage body portion 499 and is biased thereby when the carriages are moved to their fully separated position by the carriage actuating cylinder 523. The spring 540 returns to normal when air pressure in the cylinder returns to atmospheric, thereby moving the carriages back toward each other to their normal fruit receiving positions (Fig. 32). The fruit receiving position of the carriages is between the separated fruit releasing positions thereof shown in dot-dash lines in Fig. 34, and the constricted fruit aligning positions of Fig. 35.

A pear presser and aligning disk 547 (Figs. 28 and 29) is adapted to cooperate with the transfer cups to position the stem-blossom axes of the pears in the transfer cups in a vertical position for proper impalement of the pears on the stemming tubes, and to press the pears down onto the stemming tubes. This disk 574 is mounted on the free end of a horizontally swinging arm 548 which is pivoted (Fig. 34) on a bushing 549 secured between the horizontal upper and lower bracket portions 525 and 509 by a screw 550. The disk is mounted for vertical adjustment on the arm 548 by a threaded stud 579 extending upwardly from the disk and screwed into a threaded hole in the free end of the arm and is secured in adjusted position by a lock nut 580. The disk is normally swung inwardly to an inoperative position clear of the transfer cups (Fig. 28) by a torsion coil spring 551 surrounding its lower end (Figs. 32 and 34). After the pear is positioned in the transfer cup, and before the pear encounters the stemming tube on which it is to be impaled in a manner to be described later herein, the disk is swung outwardly by a pneumatic cylinder 554 to a position centrally overlying its associated transfer cup to centrally overlie and engage the upper or bulb end of a pear in the transfer cup when the transfer cup portions are moved together toward their solid line positions of Fig. 35. The moving of the tapered cups toward each other tends to cam the pear upward, and the contact of the disk 547 with the upper end of the pear, together with the gentle squeezing and camming action of the cup portion tend to bring the stem-blossom axis of the pear to a vertical position for proper impalement on the stemming tube. The upper end portion 552 of the torsion spring 551 is bent upwardly as shown in Figs. 28 and 32 and is hooked over the outer side of the disk supporting arm 548. The other or lower end portion 553 of the torsion spring 551 (Figs. 28 and 33) is hooked around the vertical edge of the downwardly extending portion of the upper bracket member 525.

The disk arm actuating cylinder 554 is pivotally mounted (Fig. 31) on a hollow stud 555, the reduced threaded lower end of which is screwed into a threaded hole in the upper bracket portion 525 and is secured therein by a lock nut 557 screwed onto the projecting lower end of the stud. A hole 558 is drilled axially in the upper end of the stud 555 and the top of this hole is closed by a screw 559. The upper and lower end portions of the stud 555 are of reduced diameter to have a collar 567 of larger diameter intermediately of the ends thereof. A tubular sleeve 568 having an internal diameter slightly larger than the diameter of the stud 555 above the collar 567 thereon, is mounted on the collar to provide an air jacket between the upper portion of the stud and the sleeve 568. Ports 570 open through the stud 555 from this air jacket into the axial bore of the stud. A washer 569 is held in sealing position over the upper end of the air jacket by the top closure screw 559.

A second sleeve 571, also of larger internal diameter than the external diameters of the lower portions of the stud, is pivotally mounted on the lower portion of the stud 555 below the collar 567 thereon. This second sleeve passes through a pair of vertically aligned holes in the upper and lower wall of the cylinder 554 and is brazed therein. Ports 576 in the wall of the hollow stud 555 and in the sleeve 571 open from the axial bore of the stud 555 through the space between the stud and the sleeve and thence into the disk actuating cylinder.

A piston 572 is mounted in the cylinder 554, the piston having an elongated slot 573 therein (Fig. 28). A limit pin 574 is mounted in vertically aligned holes in the wall of the cylinder 554 to extend transversely of the cylinder and to ride in slot 573. The limit pin is retained in position by an encircling spring wire clip 575 (Figs. 28 and 32). An inverted cup type bushing 577 (Figs. 28 and 34) is inserted with a tight pressed fit in a hole transversely through the outer end of the piston 572, and this bearing pivotally receives a vertically extending stud 578 on the disk supporting arm 548.

Thus upon the introduction of compressed air to the cylinder 554, the piston 572 will be forced outwardly, swinging the disk supporting arm 548, against the force of the torsion spring 551, until the disk 547 occupies the broken line position of Fig. 28, vertically above the center of the transfer cup. Upon release of air pressure from the cylinder 554 the torsion spring 551 will return the disk and its supporting arm to its normal solid line position shown in Fig. 28.

*Stemming tube turret and stemming tubes*

The stemming tubes 139 (Figs. 4, 6, 10 and 36 to 50 inclusive) are twelve in number and, as previously set forth herein, are mounted, in equal angularly spaced relation, on individual hub members 179 secured by cap screws 181 in openings 178 centrally of twelve flat vertical faces 177 machined on the exterior of the marginal wall 175 of the lower stemming tube turret portion 172. The lower turret portion 172 and its associated top closure portion 171 are journaled on the central tubular column 133 of the machine, and the turret is rotated at a constant speed about the axis of this column by the internally toothed ring gear 188 mounted beneath it (Fig. 4).

Each stemming tube hub 179 (Figs. 6, 10, 18 and 36) has a stemming tube supporting bushing 582 journaled therein. The outer end of the stemming tube supporting bushing 582 (Fig. 36) has a gear case 583 formed therein, with a removable complementary cap portion 584 (Figs. 36 and 37) adapted to be secured thereon by screws 585.

A worm gear 587 and corresponding spiral gear 588 are mounted in each gear case thus formed. The worm gear 587 is cut in the outer end of the stemming tube drive shaft 154 which is journaled in bearing sleeves 590 and 591 (Fig. 6) in the stemming tube support bushing 582. The worms and their intermeshing spiral gears of alternate stemming tubes about the stemming tube turret are of opposite hand, so that, since the stemming tube drive shafts are all rotated in the same direction, alternate stemming tubes will be rotated in opposite directions. The reason for this will be brought out later herein in connection with an explanation of the operation of the pear peeling mechanism.

The spiral gear 588 on the stemming tube has its axis at right angles to that of the stemming tube drive shaft 154, and has an axial bore therethrough in which a stemming tube 592 is adapted to be inserted (Fig. 18). The stemming tube spiral gear 588 has a hub portion 589 (Figs. 18, 36, 37 and 38) journaled in bushings 593 and 594 which are mounted in complementary semicircular recesses in the end of each gear casing 583 and its cap 584. Annular sealing members 597 and 598 of a usual type also are gripped in the semicircular recesses in the gear case portion 583 of the stemming tube support bushing and in the cap 584 to seal against the admission of fruit juices into the gear chamber and the escape of lubricant therefrom.

The upper end of the bore through the hub of the stemming tube support gear 588 is threaded to receive an externally threaded lower end portion of a stemming tube support sleeve 599 therein. The sleeve 599 is provided with holes 617 in its upper end to accommodate a usual spanner wrench for screwing the bushing into the bore. A tapered, split, compression sleeve 600, fits into a correspondingly tapered portion 601 of the bore in the spiral gear 588 below the threaded sleeve 599 therein, and is forced downwardly by the threaded sleeve 599 as it is screwed into the hub of the gear 588 to wedge the split compression sleeve 600 into tight frictional gripping relation with the shank portion 602 of the stemming tube 592. The shank of the stemming tube is of a length to extend entirely through the hub of the gear 588, the lower end of the bore through the gear 588 being of a size to receive the shank of the stemming tube with a relatively close sliding fit therein.

Each stemming tube (Figs. 18 and 38) has a pear retaining disk 603 mounted on its shank end. Each pear retaining disk 603 has a hole centrally thereof, and is secured in axially aligned position on the shank or leading end of the stemming tube by a screw 604 which passes through the hole in the disk and is screwed into a threaded hole in the end of the stemming tube shank portion 602.

The opposite rotation of alternate stemming tubes as mentioned previously herein causes the contacting surfaces of the pear and its retaining disk on the shank end of the stemming tube next rearwardly thereof to travel in the same linear direction. This zone of contact between the disk and the pear may be either closer to or farther away from the axial center of rotation of the disk than it is from that of the pear. This difference may produce either a drag, or may tend to assist the rotative driving effect of the stemming tube upon which the pear is impaled. Therefore to prevent the torque thus produced from unscrewing the disks, each retaining disk 603 is in effect keyed to its supporting stemming tube by tongues 615 on the disk (Figs. 18 and 38) which are inserted in endwise notches 616 in the stemming tube shank.

The upper portion of each stemming tube, upon which the pears are impaled, has an oval tubular upper end portion 605 with the upper edge 607 thereof sharpened to a cutting edge for severing the stem and stem fibres from the flesh of the pear as it is impaled thereon. The stemming tube has a semi-tubular portion 608 to provide longitudinal strength and still to allow the severed stems to fall clear. The semi-tubular portion 608 has a sloping lower end 609 (Figs. 18 and 38) which acts as a cam to eject any stem portion which may tend to remain in the stemming tube after a pear preparation cycle is completed. Any such stem will be cammed out of the semi-tubular portion 608 when it is subjected to endwise pressure by the impaling of the next pear on the stemming tube.

A pair of wing blades 610 and 611 with sharpened upper edges extend laterally from the sides of the semi-tubular portion 608 of the stemming tube. These blades prevent the pears from turning on the stemming tubes. These blades, in accordance with usual practice, and to avoid cuts in the prepared product, are arranged to align with the plane along which the pears subsequently are split into halves.

Means for tilting the stemming tubes from an upright to a horizontal position and back again at predetermined points in their rotative orbit comprise a cam actuated tilting block 612 (Figs. 6, 10 and 45) secured to the inner end of each stemming tube support bushing 582, and bearing against the inner end of its stemming tube support hub 179. Each stemming tube tilting block 612 has an opening therethrough (Fig. 6) to receive the inner end of the stemming tube bushing 582, and is split along one side for clamping to the bushing. The tilting block is secured to the bushing 582 by a key 614 (Fig. 6) and a clamp screw 613 (Fig. 10).

Each stemming tube tilting block 612 has three studs 618, 619 and 620 (Fig. 45) mounted to project inwardly therefrom. The axes of these studs are parallel to each other and to the axis of the stemming tube drive shaft 154. The studs are arranged so that their axes (Fig. 43) together with the axis of the stemming tube drive shaft, define a square. Three cam follower rollers 621, 622 and 623 are mounted on the studs 618, 619 and 620, respectively. The rollers 621 and 622, being equally distant, axially, from the stemming tube drive shaft 154 along two sides of the square defined by them, are mounted laterally opposite each other. The third roller 623 however (Fig. 43) being spaced from the axis of the stemming tube drive shaft along the diagonal of the square defined by the axes of the three rollers, and the axis of the stemming tube drive shaft 154 is offset axially inwardly from the other two rollers 621 and 622 (Fig. 45) in order that it can follow different portions of the cam faces from those followed by the rollers 621 and 622 during tilting movements of the stemming tube tilting block 612 about the axis of the stemming tube drive shaft 154.

The upper and lower cam plates 137 and 138 (Figs. 4 and 6) for tilting the blocks 612 and their associated stemming tubes, are stationary, as mentioned previously herein, being affixed to the stationary hub 140 on the central tubular column 133. Cam faces 630 and 631 (Figs. 46, 47 and 48) of these two cam plates are each approximately twice as wide as the cam follower rollers 621, 622 and 623 on the tilting block 612, so that the inwardly offset diagonally located roller 623 can ride on the inner portions of these cam faces, while the other two rollers 621 and 622 can ride on the outer portions thereof.

As will be seen in the developed side elevational view of Fig. 47, the cam track 632, defined by the cam faces 630 and 631, has a high portion 633 and a low portion 634. This cam track, as will be noted in Figs. 39 to 44, is of a height to receive the rollers 621, 622 and 623 therebetween when the square defined by the axes of the rollers and the stemming tube drive shaft has two sides thereof horizontal and the other two sides upright as in Fig. 43.

The stemming tube drive shafts 154 follow a continuous circular horizontal path or orbit along the mean central plane of the cam track 632. Thus, when the rollers are in the low portion 634 of the cam track (Figs. 41, 42 and 43) they will swing the stemming tube support bushings to tilt the stemming tube axis to the horizontal position indicated by the arrows 635 in these figures; and when the rollers are in the high portion 633 of the cam track (Fig. 39) the bushings 582 will be swung to tilt the stemming tubes upright.

The tilting movement of the stemming tubes from upright to horizontal (Fig. 40) and the reverse (Fig. 44) is accomplished by sloping the inner and outer portions of the cam tracks substantially as shown, the track slopes preferably being designed to maintain all three rollers in contact therewith during a major portion of the tilting movements. The curvature of each sloping portion of the cam track 632 is determined in accordance with usual design practice to accommodate the combined orbital and pivotally swinging movements of the different rollers according to their respective arcs of travel.

During the time the pears are being impaled on their stemming tubes, and also while they are being transferred from the stemming tubes to the splitting blades in a manner to be described later herein, the stemming tubes are in an upright position (Fig. 39) and the then uppermost rollers 621 and 623 are pressed forcibly downwardly by four, similar spring pressed segments 626, 627, 628 and 629 (Figs. 6, 48, 49 and 50) mounted in gaps provided therefor in the upper cam plate 137. Each spring pressed segment has a positioning pin 647 (Figs. 49 and 50) mounted to extend downwardly from the inner end thereof, and these pins are inserted with a loose wobble fit in locating holes provided in the cam track plate 137 inwardly of the gaps in the cam track provided to receive the segments. Each segment has a pair of cap screws 637 screwed into the under side thereof. These screws pass through holes in the upper cam plate 137 and are urged downwardly by coil springs 644 which surround the cap screws 637 and are held in compression between washers 636 beneath the heads of the cap screws and the bottoms of a pair of recesses 645 provided in the plate 137 around each of the holes for the cap screws 644.

The under, roller engaging faces of these spring pressed cam track segments (Figs. 6 and 48) are less than the full width of the upper cam face 630. The reason for making the faces of these segments narrower than the remainder of the cam track is to facilitate equalizing the pressure on both rollers 621 and 623 (Fig. 6).

The stemming tube drive shaft 154 is locked against rotation throughout its entire orbit except during the peeling phase thereof, during which time it is slowly rotated through one complete revolution. This peeling phase occurs when the stemming tube is in the horizontal position which, as mentioned previously herein, is during the time the tilting rollers 621, 622 and 623 are in the low portion 634 of the cam track 632 (Fig. 47).

Rotation of the stemming tube about its axis during the peeling phase of its orbit is accomplished by a bevel spur gear 638 (Figs. 6, 10 and 39 to 45) which is secured by a key 639 (Fig. 6) on the reduced inner end of the stemming tube drive shaft 154 for rotative engagement by the segmental, arcuate, toothed rack 151 (Figs. 4, 10, 41, 42 and 46) while the stemming tube is in the horizontal position. During the remainder of its orbit the stemming tube is locked against rotation by a locking cam follower 640 which is mounted on the inner end of the stemming tube drive shaft and is secured to the bevel gear 638 by a locking pin 641 (Fig. 6). Both the bevel gear 638 and the locking cam follower 640 are secured, by a nut 642 and lock washer 643, against the shoulder formed by the offset at the outer end of the reduced inner end portion of the stemming tube drive shaft.

The locking cam follower 640 rides on the cam face of the ring cam 152 (Figs. 39, 40, 44, 46 and 47) except during the time the stemming tube drive gear 638 is in engagement with its rack 151. During the rack engaging portion of its orbit the cam ring 152 is cut away (Figs. 41, 42, 43, 46 and 47) to free the stemming tube drive shaft for rotation. The number of teeth in the stemming tube rotating spur gear 638 and its actuating rack 151 are proportioned relatively to the gear ratio of the stemming tube drive worm 587 and its associated helical gear, 588, which rotate the stemming tube 139 about its axis. The stemming tube is to be rotated through one complete revolution about its axis during each complete rotative cycle of the machine. Therefore, if the spur gear 638 makes three rotations during its passage over the rack 151, the drive from the worm gear 587 to the stemming tube supporting helical gear 588 will be in the ratio of one to three.

*Peeling mechanism*

The peeling mechanism is shown best in Figs. 4, and 51 to 55 inclusive. In conjunction with these figures, Figure 10 shows the positions of the stemming tubes at different stages of their orbit of travel around the machine.

Each of twelve peeling arm assemblies 650 is pivoted on one of the vertical pivot pins or rods 161 (Figs. 1 and 53). The upper end of each pivot rod 161 is secured to the stationary peeling arm support plate 157 by a screw 655 which passes through a hole in the plate and is screwed into a threaded hole in the upper end of the pivotal mounting rod 161, while the lower end of the pivot rod is similarly connected to the outer edge of the annular waste trough 108.

Each peeling arm assembly (Fig. 53) comprises a hub portion 651 with an inwardly and downwardly extending arm portion 652. A support collar 653 secured to the pivot rod 161 by a set screw 654 supports the hub 651 in adjusted position. A spring connected torque arm 657 is formed integrally with the hub portion 651 and extends diagonally outwardly from the hub. This diagonal spring connected torque arm 657 has an upwardly bent outer end portion 658, through a hole in which is inserted the threaded shank of a spring securing hook 659. A nut 660 is screwed onto the threaded shank of the hook to hold it in endwise adjusted position in the spring connected arm 657, and a rubber bumper 661 (Fig. 53) is interposed between the nut 660 and the arm.

A coil spring 662 has a hook formed on one end thereof hooked into the securing hook 659, the other or forward end of the spring being hooked onto a pin 663 (Fig. 52) mounted on the under side of the peeling arm support plate 157 to hold the spring in tension, and thereby to urge the peeling arm to swing in a counterclockwise direction or inwardly about its pivot rod 161 as shown in Figs. 51 and 52.

A peeling knife head assembly 667 (Fig. 53) is mounted on the inner or free end of each arm portion 652, see also Figs. 52, 54 and 55. The peeling knife heads are generally similar to those described in Patent 2,139,704 to A. R. Thompson et al. issued December 13, 1938. The parts for a peeling knife head assembly and the mounting therefor are shown in separated positions in the exploded view of Fig. 54 and assembled in Figs. 53 and 55.

The inner or free end of each arm portion 652 has a downwardly extending and laterally bent peeling head support bracket 668 formed thereon. A downwardly extending lower end portion 669 of the bracket 668 has a semi-cylindrical cam follower block 670, which may be of brass, or wear resistant plastic material, secured thereto by screws 671. A lower pivot mounting hole 672, (Fig. 54) is provided in the laterally bent portion of the support bracket 668, and a stop abutment 673 is formed adjacent the hole 672, to fit into a recess 676 in, and thereby to limit the rotative movement of, a lower blade and roller support member 674. This lower support member has a downwardly extending cylindrical boss 675 formed thereon which is adapted to be inserted for free pivotal movement in the pivot mounting hole 672.

The lower blade and roller support member 674 has an elongated opening 677 therein to receive the correspondingly formed lower end of a pivot pin 678 upon which is journaled a concave guide roller or spool 679. The guide roller or spool 679 has a bearing bushing 680 inserted therein to receive the pivot pin 678 for free rotating movement thereon. The upper end of the pivot pin 678 is formed similarly to the lower end thereof and is adapted to be inserted in a correspondingly shaped hole in the under side of an upper blade and roller support member 681. The upper blade and roller support member 681 has an upwardly extending boss 682 thereon which is adapted to be inserted for free pivotal movement in a hole 683 in an upper retaining clip 684.

The retaining clip 684 has a notch 685 in an end thereof which is adapted to receive an upwardly extending rectangular projection 687 formed on the upper side of the peeling arm 652 (Figs. 54 and 55) above the bracket portion 668. Aligned holes 688 and 689 through the retaining clip 684, and the projection 687, receive a hinge pin 690 for pivotally mounting the retaining clip 684 on the boss. A somewhat loose fit between the boss 687 on the upper blade and spool support member 681 and the hole 683 in the retaining clip 684 permits the retaining clip to be swung upwardly about its hinge pin 690 to release the blade mounting assembly 667 when it is desired to change peeling head assemblies.

The retaining clip 684 normally is urged downwardly onto the boss 682 on the upper blade and spool support member 681 by a bent leaf retaining spring 691. The retaining spring 691 has an inwardly curved upper end portion 692 which is adapted to overlie and to rest on the retaining clip 684. A countersunk head bolt 693 is inserted through a hole in the peeling head support bracket 668 and through a slotted hole 694 (Fig. 54) in the spring 691. A nut 695 screwed onto the bolt 693 retains the spring in adjusted position.

The peeling blade 697 has a curved sharpened blade portion 698 with mounting ears 699 and 700 formed on the upper and lower ends thereof, respectively. The curvature of the blade follows in general the convexity of the roller, and both are designed so that the blade will take a peeling cut of proper depth, width and curvature from the pears. The ears 699 and 700 fit against mounting surfaces 701 and 702, respectively, on the lower and upper mounting members 674 and 681 and are secured thereon by screws 703. The blade 697 secures the peeling head assembly, including the upper and lower mounting members 674 and 681, the pivot pin 678, and the spool 679 into a unit.

The abutment 673 and the sides of the recess 676 permit free swinging movement of the peeling head assembly within desired limits but prevent rotative movement of the head assembly beyond such limits in either direction. The pivotal mounting axis of the peeling head assembly 667 on the bosses 675 and 682 is eccentric to that of the convex guide spool or roller 679, so that the roller has a caster effect which swings the blade to proper peeling position when the peeling arm assembly 650 is spring pressed into engagement with a pear.

For producing an added inward torque on each peeling arm 652 at the moment its associated peeling head assembly passes the line of maximum girth of the pear and swings inwardly over the calyx end thereof, a triangular bell crank lever 710 (Figs. 52 and 53) is pivoted on the upper end of each of the peeling arm support rods 161 above the hub 651 of the peeling arm. The bell crank lever is free for independent pivotal movement relatively to the pivot pin 161 and to the peeling arm hub 651. A downwardly extending, peripherally grooved spring securing stud 711 is mounted on one arm of the bell crank lever 710, and a rearwardly extending U-shaped wire spring connector 712 (Figs. 52 and 53) has the bight of the U thereof hooked into the peripheral groove in the stud 711.

The ends of the U-shaped wire connector 712 are bent apart as at 713 to overlie and engage the rearward end of a compression spring 714 through which the bight of the U-shaped wire connector is inserted. A similar U-shaped wire connector 715 is inserted through the compression spring 714 in the opposite direction from the first connector 712, the laterally bent end portions of the second U-shaped connector overlying and engaging the forward end of the coil compression spring 714. The rearwardly extending bight of this second U-shaped wire connector is hooked into the forward end of a spring securing hook 717, the threaded shank of which is inserted through a hole in the head of an anchor pin 718. The shank of the anchor pin 718 is inserted upwardly through a hole in the spring biasing arm 657 on the hub of the peeling arm next rearwardly therefrom. The anchor pin 718 is retained in position in its hole by a cotter pin 719 (Fig. 53).

A substantially radially disposed, cam actuated, pull link 720 (Figs. 51, 52, 53 and 56) connects the other arm of each triangular bell crank lever 710 from that having the grooved stud 711 thereon, to one end of a cam actuated lever 721 which is pivoted substantially centrally thereof on a stud 722 (Figs. 4, 51, 52 and 56) on the under side of the peeling arm support plate 157. The cam actuated lever 721 has a cam follower roller 724 on the other end thereof from that which is connected to the pull link 720. The inner end of each pull link 720 is pivotally connected to its associated cam actuated lever 721, and its outer end to its associated triangular bell crank lever 710, by ball and socket connectors 723 (Figs. 53 and 56).

Since each bell crank lever 710 is spring-connected to the spring biasing lever arm 657 of the peeling arm assembly next rearwardly thereof (Fig. 51) the first peeling arm assembly 650a to be encountered by the fruit in its counterclockwise orbit has no bell crank lever mounted thereon, while an additional bell crank lever 710a with associated pull link 720a and cam follower lever 721a is mounted on an extra pivot rod 161a (as shown in Fig. 51), located in a counterclockwise direction beyond the last peeling arm pivot support rod 161.

A scalloped cam 727, for actuating the levers 721, is of generally circular shape with twelve scalloped cam projections 728 formed on its periphery. This cam is mounted on the upper side of the stemming tube turret cover 171 as shown in Figs. 4 and 6 to rotate therewith. One of the scalloped cam projections 728 is provided inwardly of each of the twelve stemming tubes 139, and these cam projections are so located relatively to the stemming tubes, that as each peeling knife passes over the bulb of the pear impaled on a stemming tube, and starts to move inwardly over the trailing calyx end of the pear, one of the cam projections 728 of the scalloped cam 727 will engage the cam follower roller 724 on the lever 721 associated with the triangular bell crank lever 710 mounted on the peeling arm pivot support post next in advance thereof, and thereby will cause the triangular lever 710 to swing clockwise about its pivot, as shown at 710b (Fig. 52). This swings the grooved spring anchoring stud 711b on the other arm of the triangular bell crank lever 710b forwardly, compresses the rearward spring 714b and increases the tension on the spring biased arm 657b, to which the spring 714b is connected.

This additional tension on the arm 657b increases the torque on the hub of the peeling assembly 650b and urges the peeling head 667 inwardly over the rearward or calyx end of the pear. Were it not for the application of this increased torque to the peeling arm as the peeling head passes beyond the bulge of the pear, the forward movement of the pear in its rotative orbit would tend to draw it away from the peeling knife as the knife passed the zone of maximum diameter of each pear. The result would be an inferior peeling action over the bulb or calyx end of the pear. The additional spring pressure applied to the peeling head by the present arrangement however produces a uniform peeling cut throughout the entire length of the pear. Proper peeling of the calyx ends of pears has presented a difficult problem in other types of pear preparation machines, so that the use of this and other portions of the present invention obviously are adaptable to many other types of fruit preparation machines.

A second scalloped cam 730 (Figs. 51 and 52) is provided for guiding the peeling arms and their supporting peeling heads. This second scalloped cam limits the inward swinging movement of the peeling arms to position the peeling heads properly for the initiation of each peeling cut, and to hold the peeling heads outwardly clear of any empty stemming tubes 139 on the stemming tube turret. It also prevents the peeling heads from swinging in so far at the terminal end of a peeling stroke as to damage the sharpened edge of the peeling blade on the pear retaining disk 603 on the forward end of the following stemming tube.

The second scalloped cam 730 (Figs. 4, 6, 51 and 52) is mounted on the lower stemming tube turret 170 to project outwardly therefrom (Fig. 6). This cam 730 (Figs. 51 and 52) is made in two similar, complementary generally semi-circular sections 731 and 732 which are secured to the lower stemming tube turret portion 172 by screws 733, to rotate therewith. The semi-cylindrical cam follower blocks 670 on the lower end portions 669 of the peeling head mounting brackets 668 are adapted to ride (Figs. 51 and 52) on the scalloped periphery of the cam 730.

During a peeling stroke on a pear 734 (Fig. 52) the engagement of the peeling blade and its guide roller with the body of the pear holds the peeling head outwardly, so that the cam follower block 670 is maintained clear of the cam 730. It is only in the event that a stemming tube should have no pear impaled thereon that the cam projections on the scalloped cam 730 will force the peeling head 667 outwardly sufficiently to move the blade 697 clear of the stemming tube 592.

Each pear retaining disk 603 is adjusted, by axial adjustment of the stemming tube into which it is screwed as set forth previously herein (Fig. 18) so as to permit the pear on the next stemming tube in advance thereof to be swung to its horizontal position without interference from the disk. Also this adjustment of the retaining disk 603 is such that each disk will engage the calyx end of the pear on the next stemming tube in advance thereof during peeling operation to prevent withdrawal of the pear from its impaled position on its supporting stemming tube. The position of the calyx end of the pear on the stemming tube is determined by the adjusted position of the presser disk 547 of the transfer cup assembly, which pushes the pear down to its final position on the stemming tube during a pear impaling operation when transferring the pear from the feed cup onto the stemming tube.

The calyx end of each pear when supported on its stemming tube 139 (Fig. 52) extends tangentially of its circular orbit a greater distance from its axis of tilting support about its radially disposed stemming tube drive shaft 154, than does the retaining disk 603. Therefore (Fig. 52) when a pear 734 is mounted on a horizontally disposed stemming tube 139, the retaining disk 603 on a similarly horizontal stemming tube next rearwardly thereof will be disposed closer to the central vertical axis of the machine than the calyx end of the pear which it engages. Thus the retaining disk will engage a side portion of the calyx end of the pear, and will not rest immediately over the calyx. The axial offset thus attained between the axis of the pear and that of its associated reaining disk, is sufficient to permit the peeling blade 697 to take a full peeling cut inwardly across the calyx or trailing end of the pear to the point where the body of the pear curves inwardly into the calyx depression without danger of having the blade strike the associated retaining disk. With the axial offsetting of the disks provided by the above described arrangement, there is no need, as has been the case in previous pear peelers, to provide any special withdrawing mechanism for the retainer disk in order to get it out of the way of the peeling blade to permit completion of the peeling cut over the calyx end of the pear.

The peeling knives are spaced apart about the periphery of the machine so that each knife will initiate a new peeling cut after the pear has been rotated approximately 1/12th of a revolution from the initiation of the preceding cut. The peeling blades are so curved and associated with their convex guide spools or rollers 679 that they will take a cut slightly greater in width than 1/12th of the diameter of the pear. Thus there will be a slight overlap between successive peeling cuts to insure that no strips of unpeeled skin will be left between adjacent cuts. When a pear passes the twelfth or last peeling head in its orbit around the machine, the peeling will have been completed.

*Pear gripping mechanism*

After passing the last peeling head, as will be noted in Fig. 10, the stemming tubes, with their pears supported thereon, again are swung to upright position. Shortly thereafter (Figs. 46, 47 and 48) the uppermost stemming tube tilting rollers 621 and 623 pass beneath the first pair of spring pressed segments 626—627 in the upper stemming tube tilting cam plate 137 (Figs. 47 to 50). The spring pressure on these cam segments holds the stemming tubes firmly in upright position as the stemming tubes are brought into vertical alignment with the fruit halving or splitting blades by the combined rotative action of the stemming tube turret, and the lateral oscillation of the splitting and transfer heads by the face cam 264 and associated mechanism.

Pear gripping means 740 are provided to grip the pears on each succeeding pair of stemming tubes as they are brought into vertical alignment with the splitting blades, and to move the two pears thus gripped upwardly onto the splitting blades. Each such pear gripping means (Figs. 11, and 57 to 66) is mounted on the vertically reciprocating and laterally oscillating transfer head 272, and comprises two similar, but opposite, gripping pad support brackets 741 and 742. Each gripping pad support bracket comprises a mounting hub portion 737, with diagonally disposed pad supporting arms 738 and 739. An upwardly extending anchoring pin 803 (Fig. 66) is provided on the inner end of an extension 734 of the inner arm portion 739 for holding the brackets 741 and 742 against pivotal movement when a clutch is actuated in a manner to be described later herein.

Each of the gripping pad mounting brackets 741 and 742 has a pair of fruit gripping pads 743 mounted thereon. Each gripping pad (Fig. 62) comprises a soft, rubber facing 744 molded onto a supporting backing block 745 of rigid material such as plastic or metal. The gripping face of a rubber facing 744 is curved to conform to the shape of a pear when gripped thereby, and is grooved transversely as at 747 to reduce slippage. Each backing block 745 has a semispherical recess therein in which is inserted the ball end of a mounting stud 748.

A cap 749 fits over the back of the backing block 745 and is secured thereto by screws 750. The cap 749 has a semispherical recess therein complementary to that in the backing block to fit over and retain the ball end of the mounting stud. A cone shaped opening 751 in the cap 749 for the shank of the stud permits limited universal pivotal movement of the gripping pad assembly on the stud. The ball end of the stud has a slotted hole 752 transversely therethrough and a pin 753 is inserted through the slotted hole 752 in the ball end of the mounting stud to prevent rotation of the pads and to limit pivotal movement of the ball in the socket. The ends of the pin 753 (Fig. 62) fit into grooved complementary recesses provided in the mounting block and in the cap to grip the ends of the pin and hold it against displacement. The shanks of the mounting studs 748 are threaded, and are screwed into similarly threaded holes in the mounting brackets 741 and 742 (Figs. 61 and 62). Locknuts 754 secure the studs in adjusted position. A down-limit stop pin 755 (Fig. 62) for limiting the downward pivotal movement of each gripping pad is screwed into a threaded hole in a downwardly extending ear 757 (Fig. 66) two of which are provided on each bracket 741 and 742 below the mounting holes for the gripping pads. A locknut 758 (Fig. 62) secures the down-limit stop pin 755 in threaded adjusted position.

The similar oppositely formed and positioned gripping pad support brackets 741 and 742 of each pair thereof are pivotally mounted on studs 759 and 760 mounted on the outer or free ends of a pair of bracket support arms 761 and 762 (Figs. 63, 64 and 65) to extend downwardly therefrom. One pair of bracket support arms 761 and 762 are shown disassembled in Figs. 64 and 65, and assembled in the sectional view of Fig. 63. In Fig. 63 the outer or free end portions of the bracket support arms are broken away.

Referring first to the bracket support arm 761 shown in Fig. 64, a bracket supporting arm portion 763 thereof extends substantially tangentially outwardly from a circularly curved wall portion 764 and has a drilled boss 766 to receive a pivot pin for pivotally mounting the hub 737 of the gripper pad support bracket 741 thereon. The curved wall portion 764 is mounted concentrically on the marginal edge of a clutch disk portion 765 having a central mounting hole 767 therein. A spring attaching post 768 is welded to extend downwardly from the under side of the margin of the clutch disk portion 765 at its juncture with the arm portion 763.

A bracket positioning coil spring 769 (Figs. 58, 61 and 66) is hooked in tension between this post 768 and a hook 770 mounted on the inner end of the pad supporting bracket 741 pivoted on the arm 761. The tension of this spring resiliently urges each pad supporting bracket toward a normal position of substantial alignment with its supporting arm. An actuating arm portion 771 extends inwardly, and substantially tangentially, from the arcuate wall portion 764 in the opposite direction from the bracket supporting arm portion 763.

The clutch disk portion 765 of the bracket support arm 761 is adapted to rest on, and to be supported by, a generally similar clutch disk portion 772 of the other bracket support arm 762 (Fig. 65) of the pair. The clutch disk portion 772 of this other bracket support arm 762 has a plurality of holes 773 therein for receiving rivets 774 (Fig. 67) which secure an annular, metal, pressure transmitting ring 775 to the under side of the clutch disk portion 772. This pressure transmitting ring 775 is adapted to have frictional clutch engagement with a bracket securing clutch disk (Fig. 67) mounted beneath it when the parts are pressed together in a manner to be described later herein. The clutch disk portion 772 of the second bracket supporting arm 762 has a radially extending actuating ear 777 thereon which is adapted to be engaged by one of a pair of pneumatically actuated butterfly levers to be described in detail later herein.

A downwardly extending spring attaching post 778 (Figs. 58, 61 and 65) similar to the spring attaching post 768 on the bracket supporting arm 761, shown in Fig. 64, is mounted peripherally of the clutch disk portion 772 at the juncture of the bracket supporting arm portion thereof with an arcuate wall portion 779 for attaching a second bracket positioning spring, 776 to a hook 780 mounted on its associated pad mounting bracket.

The pair of bracket arms 761 and 762, illustrated in detail in Figs. 63, 64 and 65, are similar to, but are constructed and mounted oppositely from, the second pair 761a and 762a thereof (Figs. 58 and 61). The pair illustrated in detail in Figs. 63, 64 and 65 would, therefore, comprise the uppermost pair 761 and 762 shown in Fig. 58, while the lower pair 761a and 762a in this Fig. 58 would be constructed and assembled exactly opposite to those of the upper pair. Such structural reversals are of course common practice in machine design and will be clear from the above disclosure to those familiar with the art.

The clutch disk portions 765 and 772 of the bracket support arms 761 and 762 are mounted for pivotal movement on the lower end portion of a central downward tubular extension 785 (Fig. 67) of the lower head 787 of a metal clutch actuating bellows 788. A spring retaining clip (Fig. 67) mounted in an annular groove near the lower end of the tubular downward extension 785, supports and limits the downward movement of the lowermost clutch disk portion 772 of the bracket support arm 762. The downward tubular head extension 785 is inserted, with a tight press fit, through the axial bore of a spool-like clutch hub 790 (Fig. 67). The clutch hub 790 has an upwardly extending central locating and mounting boss 791 thereon, which is inserted, also with a tight press fit, into a hole in the transfer head 272. The lower bellows head 787 and its integrally formed, tubular, downward extension 785, and the spool-like clutch hub member 790, thus are securely connected to the transfer head and to each other. The lower bellows head 787 additionally (Figs. 11, 57 and 66) is secured to the transfer head 272 by three screws 792, which pass through ears 793 extending marginally from the lower bellows head 787 and are screwed into threaded holes in the transfer head.

The walls of the bellows 788 (Fig. 67) comprise a usual deeply corrugated or roll formed tubular inner sleeve 794, and a similarly corrugated, outwardly spaced, outer sleeve 795, both of the corrugated sleeves being of thin, springy metal, such as bronze. Both corrugated bellows sleeves are brazed to the lower bellows head 787 and to an upper bellows head 797, to have air tight, sealing connection therewith. A usual actuating fluid supply tube 798 (Fig. 57) is connected by a usual compression fitting 799, to open into the sealed annular space between the two corrugated sleeves for actuation of the bellows.

A pair of similar disk-like pad mounting bracket clutch plates 800 and 801 (Figs. 58, 61, 66 and 67) for anchoring the pad supporting brackets 741 and 742 in pear gripping position, are pivotally mounted on the lower end of the tubular extension 785 of the lower bellows head 787 below the spring clip 789. Each of the gripping pad bracket anchoring disks 800 and 801 (Figs. 58 and 61) has a bifurcated arm 802 projecting radially therefrom. These bifurcated arms 802 are each adapted to receive, between the bifurcations thereof, the upwardly extending pin 803 (Fig. 66) formed on the inner end of each of the pad supporting brackets 741 and 742.

A small, radially projecting ear 804 (Figs. 58, 61 and 66) also is provided on each of the bracket anchoring disks 800 and 801, to lie on the other side of the spring attaching post 778 or 768 from the bifurcated arm 802, and thus to limit rotative movement of the bracket anchoring disks 800 and 801 on which the ears 804 are provided. The bracket anchoring disks are identical to each other, but are mounted oppositely to each other in pairs, as shown, for example, in Fig. 58. Thus the two bracket anchoring disks 800 and 801 of each pair thereof have their bifurcated arms 802 and ears 804 disposed oppositely to each other and with the downwardly extending spring attaching posts 768 and 778 on their associated bracket support arms 761 or 762 therebetween. These bracket anchoring disks 800 and 801 are interposed (Fig. 67) between the lower clutch disk portion 772 of the bracket supporting arm 762, and the disk-like head 805 of a bellows-actuated pressure transmitting or clutch actuating members 807.

The clutch actuating member 807 has an upwardly extending stem 808 which is slidably inserted through the axial bore of the tubular downward extension 785 of the lower bellows head 787. The upper portion of the stem 808 is threaded, and is screwed through the internally threaded bore of a flanged sleeve 809 (Fig. 67) inserted through a central hole in the upper bellows head 797. A spring clip 810, is inserted in an annular groove in the marginal wall of a recess in the upper bellows head 797, overlies the flanged sleeve 809 and retains it in position therein. A split clamp fitting 811 (Fig. 67) is screwed onto the upper end of the stem 808 of the pressure transmitting member 807 and is clamped thereto by a clamping screw 812. An anchoring screw 813 (Fig. 67) passes through a radially extending ear 814 of the clamp fitting 811 and is screwed into a threaded hole in the upper bellows head 797 to anchor the stem 808 in adjusted position.

A clutch releasing coil spring 815 (Fig. 67) is mounted in an enlarged lower bore portion of the tubular lower bellows head extension 785, and is held in compression between the head 805 of the clutch actuating member, and the offset in the bore, to urge the clutch actuating member 807 downwardly to free the bracket anchoring disks 800 and 801, and the clutch disk portions 765 and 772 of the bracket supporting arms 761 and 762 for pivotal movement on the tubular bellows head extension 785. The lower end of the flanged sleeve 809 (Fig. 67) mounted in the upper bellows head, by abutting against the upper surface of the lower bellows head 787, determines the downward limit of movement of the bellows head, and the clutch actuating member 807 connected thereto, under the thrust of the clutch releasing coil spring 815.

When the bellows 788 is subjected to internal pressure sufficient to overcome the thrust of the clutch releasing spring 815 and to move the clutch actuating member 807 forcibly upward, the bracket anchoring disks 800 and 801 and the clutch disk portions 765 and 772 of the bracket support arms 761 and 762 are gripped, clutchlike, between the head 805 of the clutch actuating member 807 and the bottom face of the clutch hub 790. It will be noted that the pressure transmitting ring 775, riveted to the under side of the lowermost clutch disk portion 772 of the bracket support arm 761 provides clearance for the spring clip 789 around the lower end of the tubular lower bellows head extension 785.

An arcuate leaf spring 820 (Figs. 63 and 67) for urging the bracket support arms 761 and 762 of each pair thereof toward each other into pear-gripping position, is adapted to be sprung to substantially circular form and fitted within the arcuate wall portions 764 and 779 of the bracket support arms 761 and 762. The curved leaf spring 820 has outwardly bent end portions 818 and 819 which exert a separating thrust against the inner ends of the curved wall portions and thereby produce a torque which urges the bracket support arms 761 and 762 in opposite rotative directions toward each other into pear gripping relation.

The spring 820 is free to act only when the bellows 788 is in clutch releasing condition. At such time the bracket support arms are free to pivot on their tubular pivot support member 785. Therefore, when the bracket support arms are swung toward each other to pear gripping position, by the action of their arcuate leaf spring 820, if the pear to be gripped is offset laterally one way or the other on the stemming tube, the arms will pivot and grip the pear in this offset position without exerting any lateral centering tendencies thereon. This is an important advantage since it is desirable in transferring a pear from the stemming tube to a splitting blade that the pear be impaled on the splitting blade with the tubular cut made in the pear by the stemming tube on the vertical mid-line of the splitting blade, and with the lateral cuts made by the turning wings on the stemming tube in the cutting plane of the splitting blade.

For pivotally moving the arms of both pairs of bracket support arms simultaneously in opposite directions, and against the force of the springs 820, toward their open, fruit releasing positions, a pair of co-axially pivoted, generally similar, but opposite, butterfly levers 821 and 822 are provided (Figs. 58, 59, 60, 61 and 66). One butterfly lever 821 comprises a tubular mounting shaft 823 (Figs. 59 and 60) with a lever block 824 welded to the lower end thereof so that one face of the lever block lies along a longitudinal mid-plane of the tubular shaft. The lower end of the lever block 824 extends below the bottom of the tubular shaft 823 and a lateral lever arm 825 with rounded free end is welded to the lower end of the lever block 824.

The other butterfly lever 822 comprises a rod mounting shaft 827 which is axially inserted for pivotal movement in the tubular shaft 823 of the first butterfly lever 821. The rod shaft 827 is of sufficiently greater length than the tubular shaft 823 to project upwardly above the tubular shaft when the parts are in fully assembled relation as shown in Fig. 59. A lever block 828, generally similar in size and shape to the first lever block 821, is welded onto the lower end of the rod shaft 827 with a face thereof disposed along a vertical mid-plane of the rod shaft, and is adapted to lie closely adjacent the mid-plane face of the first lever block 824 when the parts are assembled as shown in Fig. 59. The top of the second lever block 828 is notched out as shown at 829 (Fig. 60) to receive the lower end of the tubular shaft 823 freely therein, so that when the parts are moved axially into fully assembled relation as shown in Fig. 59, the top of the second lever block 828 will be at the same height as that of the first lever block 824 and the outer ends of the two lever blocks will be at the same radial distance from their common axis of pivotal movement. A second laterally projecting lever arm 830 and similar to the first lateral lever arm 825 is welded to the lower end of the second lever block 828.

The two butterfly levers 821 and 822, when moved axially into fully assembled position, as shown in Fig. 59, are inserted upwardly into the bore of a boss 831 (Fig. 66) on the transfer head 272 for pivotal movement therein. A thrust collar 832 is secured in adjusted position on the tubular shaft 823 by a set screw (Fig. 66) to secure the tubular shaft 823 in adjusted position in the bore of the boss. A pair of split clamp type actuating arms 833 and 834 (Figs. 11, 57 and 66) are secured on the upper ends of the tubular shaft 823 and the rod shaft 827, respectively.

The actuating arms 833 and 834 extend substantially in opposite directions from each other, and their free ends are pivotally connected, by links 837 and 838, to the cross head 839 of a piston rod 840 of a pneumatically actuated cylinder 841 which is mounted on the transfer head 272. The cylinder 841 is of the double acting type. When the cylinder is operated to retract the piston rod 840 to the position shown in Fig. 11, the cross head 839, links 837 and 838, and actuating arms 833 and 834, swing the butterfly levers 821 and 822 in opposite rotative directions about their common axis to bring the mid-plane faces of the lever blocks 824 and 828 together to the position shown in Figs. 59 and 61. When the pneumatic cylinder 841 is operated to extend the piston rod 840, however, to the position shown in Fig. 57, the actuating arms 833 and 834 swing the butterfly levers 821 and 822 in opposite rotative directions to the position shown in Fig. 58.

The lever blocks 824 and 828 are located (Figs. 58, 61 and 66) directly between the inwardly extending actuating arms 771 on the two similar, but oppositely formed and located, bracket support arms 761. These bracket support arms 761 (Figs. 58 and 61) comprise the two center arms of the two oppositely constructed and mounted pairs of bracket support arms. The laterally extending round nosed lever arms 825 and 830 of the butterfly levers are located directly laterally exteriorly of the actuating ears 777 (Fig. 65) on the two similar but opposite clutch disk portions 772 of the two outer bracket supporting arms 762.

When the butterfly levers 821 and 822 are in their relative positions of Figs. 11 and 61, the clutch actuating bellows 788 is unpressurized to release the pressure transmitting member 807 to free the clutch disk portions interposed between the head of the pressure transmitting member and the clutch hub 790, the two arcuate leaf springs 820 swing their pairs of associated bracket support arms 761 and 762 toward each other, moving the pad mounting brackets 741 and 742 and their supported fruit gripping pads 743 toward each other into pear gripping position. In this released condition of the clutch, the pad support brackets 741 and 742 also are free for limited pivotal movement against the aligning tension of their coil springs 776 and 769 to allow the pads 743 to conform to the shape of a pear gripped thereby.

When the butterfly levers 821 and 822 are swung, by actuation of the pneumatic cylinder 841 to the relative positions shown in Figs. 57, 58 and 66, the bellows actuated clutch being released, the lever blocks 824 and 828 will be swung apart, engaging the actuating arms 771 on the bracket support arms 761, and swinging them to the separated position shown in Fig. 58. This also swings the innermost, similar but opposite, bracket support arms 761 toward each other against the force of their associated arcuate leaf springs 820 (Fig. 63) to their fruit releasing positions shown in Fig. 58. Simultaneously the rounded ends of the laterally extending lever arms 825 and 830 of the butterfly levers will engage the actuating ears 777 on the clutch disks of the remote bracket support arms 762 and will swing these remote bracket support arms away from each other to fruit releasing position against the force of their curved leaf springs 820 (Fig. 58). The freedom for pivotal adjustment of the gripping pads on their brackets, of the brackets on their support arms, and of the support arms themselves permits the pear to be gripped firmly in any position in which it may be disposed on the stemming tube, the clutch action firmly locks the parts in that position, and the pear then is transferred in that same position onto the splitting blades. This arrangement is desirable since the pear should preferably be split on a plane including the axis of the hole produced therein by the stemming tube.

*Fruit splitting and positioning mechanism*

A pair of fruit halving or splitting blade assemblies 850 and 851 are mounted on the splitting head 252 with the planes of their composite splitting blades disposed vertically and radially of the machine as shown in Figs. 12 and 58. Each composite splitting blade is mounted to lie along a central mid-plane of its associated pear gripping and elevating mechanism which is mounted on the transfer head. Since, as pointed out previously herein, the splitting head 252 and transfer head 272 are connected for synchronous swinging or oscillating movement by the vertical track 294 and roller 297 connection (Figs. 11 and 12) these two heads maintain the pear gripping and transferring mechanisms and their respective splitting blades in centrally aligned relation throughout the entire operational cycle of the machine. The two splitting blade assemblies 850 and 851 (Figs. 12 and 67) are mounted on the vertical outer faces of a pair of mounting flanges 852 provided on the splitting head 252. Both splitting blade assemblies, together with their associated rotating blade mechanisms for severing the seed cells, and trimming the calyx ends of the pears, are similar to each other, so one only thereof will be described in detail.

Each splitting blade assembly 850 (Figs. 12, 66 and 67) has a mounting member 853 with a horizontal flange 854 thereof extending inwardly beneath the lower end of the mounting flange 852. The blade mounting member 853 has an axially vertical tubular portion 855 formed integrally therewith. The tubular portion 855 extends downwardly below the inwardly extending lower flange 854. An outwardly extending, vertical, blade mounting flange 857 (Figs. 58 and 69) is formed integrally with the tubular body portion 855. A blade supporting face of this flange 857 is offset laterally from the vertical radial mid-plane of the tubular portion 855 by a distance equal to half the thickness of an outer blade member 858, which is secured to the blade supporting face of the flange 857 by bolts 859. By this arrangement the outer splitting blade member 858, which is of substantial thickness in accordance with usual practice, has its median plane coincident with the radially disposed, vertical mid-plane through the tubular portion 855, of the blade mounting member.

The lower edge 860 of the outer blade portion 858 is disposed at an acute angle to the vertical and is sharpened to a cutting edge along the mid-plane of the blade. The upper end portion of the outer blade member 858, where it is mounted on the flange 857, is relatively narrow (Fig. 67). Below this narrower upper blade portion, the blade member 858 widens along an inwardly sloping edge 861. The slope of this edge conforms to the cutting angle of a rotary calyx trimming knife to be described later herein. The inner edge of the wider lower portion of the outer blade member 858 is vertical, except where it is curved inwardly at 862 to clear a rotary seed cell severing knife also to be described later herein.

An inner splitting blade member 863 is mounted on a vertical, inwardly extending flange 864 of the tubular portion 855 of the blade mounting member (Figs. 58 and 67) below the horizontal mounting flange 854. This inner blade member 863 has edge conformations generally similar, but opposite, to those of the outer splitting blade member 858. An inwardly extending ear 865 (Fig. 67) on the inner side of the inner blade member, is connected, by a screw 867 and band 868, to the downwardly projecting lower end of a tubular spring housing to be described later herein.

The calyx indentations of the pears are reamed out, and the seed cells are severed from the pears after the pears have been split and while the two halves thereof are still gripped in position on the splitting blades. Since the rotary orbits of the calyx trimming and seed celling knives are fixed, it is necessary that the pear halves be accurately positioned on the splitting blades to insure that the calyx and seed cell of each pair half will be located properly on the splitting blade when these knives are rotated. To insure proper positioning of the pear halves on the splitting blade, a pair of butt stops or gauging plungers 870 and 871 (Figs. 57, 58, 66 and 69) are mounted, one on each side of each composite splitting blade, to prevent the pears from being positioned too high on the splitting blade for the successful performance of the calyx trimming and seed cell severing operations. These butt stops 870 and 871 are similar, but opposite, to each other, so one only thereof will be described in detail.

The butt stops 870 and 871 (Figs. 66 and 69) comprise a vertical shaft portion 872 which is mounted for vertical sliding movement in a tubular portion 873 of a mounting bracket 874, which, in turn, is secured by screws to the upper face of the transfer head 272. A guide pin 875 (Fig. 66) is mounted transversely through the vertical shaft portion 872 of the stop, the ends of the pin riding in vertical notches 877 in the upper end of the tubular bracket portion 873 (Fig. 66) to prevent rotative movement of the shaft portion 872 during vertical reciprocation of the stop.

A coil spring 878 surrounds the upper end of the vertical shaft portion 872 and is held in compression between a cotter pin 879 mounted in a hole through the shaft portion 872 and the upper end of the tubular bracket portion. This spring 878 normally tends to raise the butt stop upwardly in its bracket. Upward slidable movement of the shaft portion 872 is limited by the laterally bent lower end portion 880 (Fig. 69) of the plunger shaft 872. A downwardly facing, concavely curved arcuate, gauging plate 881 is secured to the lower end of each inwardly bent lower shaft portion 880. This curved plate is adapted to engage and to fit over the butt or calyx end of each pear half, as indicated in dotted lines in Fig. 69, when a split pear, gripped by the gripping means 740, is drawn upwardly onto the splitting blade.

The butt stops 870 and 871 are arrested in their upward movement as the transfer head approaching its upper limit of travel by engagement with a pair of stop screws 882 mounted on the splitting head 252. Each stop screw is threaded through the horizontal flange of an angle bracket 883 (Fig. 66) which is secured by screws 884 to the outer face of the blade mounting member 853 and is secured in adjusted position by a lock nut 885. The arresting of the upward movement of the butt stops by their associated stop screws before the splitting blade reaches its upward limit of movement causes a relatively downward movement of each butt stop 870 with respect to its associated gripping means and against the pressure of its coil spring 878. The amount of this relatively downward movement of the butt stop is determined by the adjusted position of its associated stop screw 882, but is always small to prevent bruising the pears.

*Calyx trimming and seed cell severing mechanism*

The rotary calyx trimming and seed cell severing knives and their operating mechanisms are best shown in Figs. 4, 12, 66, 67, 69 and 71. The calyx trimming knife 890 (Fig. 67) has a shank portion 891 thereof inserted upwardly in a hole extending lengthwise through a wall of a tubular shaft 892 having an eccentric bore 893. The axis of the hole for receiving the shank portion 891 is offset from the true axis of the tubular shaft 892 diametrically opposite to the axis of the eccentric bore 893 through the shaft.

The shank 891 of the calyx trimming knife is secured in adjusted position by a set screw 894. The lower end of the shank 891 is bent laterally away from the axis of the tubular shaft 892 and the calyx trimming knife portion 895 is disposed at an acute angle to the outer end of this laterally bent portion, to describe a truncated cone when swung around by the rotation of its mounting shaft 892, the sides of the cone thus described lying parallel and close to the sloping upper edges of the splitting blade members 858 and 863. The blade portion 895 of the calyx trimming knife is not wider than the thickness of the splitting blade members, so that in its normal position (Figs. 67 and 69) the blade portion will lie wholly between the planes defined by the two sides of the splitting blade members.

The tubular mounting shaft 892 of the calyx trimming knife is journaled in a bearing bushing 896 which is inserted in the vertical tubular portion 855 of the splitting blade mounting member 853 and is secured therein by a set screw 897 (Fig. 69). A spur pinion 898 is formed on the upper end of the tubular calyx knife mounting shaft 892, the hub portion of the pinion having bearing support on the upper end of the bushing 896. A snap ring 899, inserted in a groove around the lower end of the tubular calyx knife mounting shaft 892 retains the tubular shaft against upward displacement in the bushing.

A second tubular shaft 900, with a concentric bore for receiving the shank 901 of a seed cell severing knife 902 therein, is journaled in the eccentric bore of the tubular calyx knife mounting shaft 892. The shank 901 of the seed cell severing knife is retained in adjusted position in its mounting shaft 900 by a set screw 903. A flange 904 around the lower end of the tubular shaft 900 prevents upward displacement thereof. The set screw 903 also passes through the hub of a spur pinion 905 mounted on the upper end of the tubular shaft 900. The pinion 905 has an eccentric bore which is eccentric to the pitch circle of its teeth by an amount equal to the eccentricity of the bore through the calyx knife mounting shaft 892.

The shank 901 of the seed cell severing knife has a laterally offset portion 907 near its lower end, and a curved seed cell severing blade portion 908 is formed on the lower end of the offset portion. This offset of the portion 907 is approximately equal to the eccentricity of the bore of the tubular calyx knife support shaft 892, which in turn is equal to the eccentricity of the bore of the spur pinion 905 which drives the seed cell knife support shaft 900. This offset, together with the eccentricity of the tubular calyx knife mounting shaft 892 upon equal and opposite rotation of the shafts 892 and 900 causes the seed cell severing knife to describe a generally elliptical path, elongated in a direction transversely to the mid-plane of its associated splitting blade while the offset shank portion 907 travels in a straight line in the plane of the splitting blade. This arrangement causes the seed cell severing knife to cut a substantially semi-spherical seed cell containing segment from each pear half on opposite sides of the splitting blade in spite of the fact that the pear halves are separated by the thickness of the splitting blade. The blade portion 908 of the seed cell severing knife is convexly curved in the direction opposite to the shank offset 907, and, like that of the calxy trimming knife, is sufficiently narrow to lie between the planes defining the sides of the splitting blade in which it is mounted.

In their normal or unoperated position of the two blades 895 and 908, the calyx trimming blade 895 is directly above the seed cell severing blade 908, and the eccentric bores of the calyx knife mounting tube 892 and of the spur pinion 905 on the seed cell knife mounting tube 900 are disposed diametrically opposite to each other (Figs. 12 and 67) relatively to the axis of rotation of the tubular calyx knife mounting shaft 892. In this condition of the parts the pitch circles of the teeth on the two spur pinions 898 and 905 are concentric with each other.

Upon each operative cycle of the calyx trimming and seed cell severing knives they are rotated in opposite directions through complete circular arcs of 360°, and then, after a dwell, during which time the pear halves trimmed by this operation have been ejected from the splitting blades, the knives are returned through a reverse rotation of 360° to their normal condition. This simultaneous but opposite rotative actuation of the knives is accomplished by a single back and forth oscillation of a pair of concentrically curved arcuate racks 910 and 911 mounted within a downwardly opening arcuate channel 912, of a segmental bracket 913 (Figs. 4, 66, 69 and 71).

The segmental bracket 913 has a hub portion 914 which is journaled on a bushing 915 (Figs. 4 and 66) on the upper end of the oscillating tube 251 to which the splitting head 252 is secured. The concentrically curved racks 910 and 911 are secured to opposite sides of the downwardly opening arcuate channel 912, the center of curvature of the racks being on the axis of pivotal mounting of the bracket. The outermost rack 910 is toothed internally and has driving engagement with the spur pinion 898 (Figs. 66 and 67) on the calyx knife mounting shaft, while the innermost rack 911 is toothed externally and has driving engagement with the pinion 905 on the tubular shaft 900 of the seed cell severing knife.

Oscillating movement of the segmental bracket 913 is accomplished by a double acting air cylinder 920 (Figs. 4, 69 and 71) to be described in detail later herein in connection with other pneumatically operated parts of the machine. The cylinder 920 has a trunnion mount 921 clamped around it by a clamp screw 922. The trunnion mount (Figs. 4, 75 and 76) has notches 923 therein to clear tie rods 924 which secure the heads on the cylinder 920. A lower trunnion post 925 is pivotally mounted in a recess provided in the splitting head 252 to receive it, and an upper trunnion post 927 is pivoted in a similar recess in an arched bracket 928 (Fig. 4) bolted onto the splitting head.

Pivotal movement of the segmental bracket in both directions relatively to the splitting head is limited by a stop abutment 930 formed integrally with the splitting head (Figs. 66 and 71) to extend upwardly therefrom. A stop lug 931 is formed to extend upwardly from the outer end of the abutment 930 and is engaged by the ends of stop bolts 932 and 933 which are screwed into threaded holes through the two side legs of the segmental bracket 913 and are secured in adjusted position by lock nuts 934. Pivotal movement of the segmental bracket 913 swings the arcuate racks 910 and 911 about their common center of curvature, thereby causing their respectively inter-engaged spur pinions 898 and 905 of the calyx trimming and seed cell severing knives, respectively, to rotate in opposite directions.

The equal and initially opposite eccentricities of the bore of the calyx knife tubular mounting shaft 892 and that of the seed cell knife actuating pinion 905 maintain the latter pinion in uniform toothed engagement with its actuating rack 911 throughout its complete cycle of operation. The pinion 905 is of slightly smaller effective diameter than the pinion 898 so as to be rotated equally with the pinion 898 in spite of the shorter effective stroke of the inner rack 911 due to its lesser radius.

*Fruit ejecting mechanism*

Upon completion of the first 360° rotation of the calyx and seed cell severing knives, caused by the operation of the pneumatic cylinder 920 to actuate the piston thereof and swing the segmental bracket 913 to its full limit of movement relatively to the splitting head 252 upon which the cylinder 920 is mounted, the preparation of the two pears gripped on the splitting blades is completed. The completed pears then are ejected from the machine through a discharge chute 937 (Fig. 2) onto a take-off conveyor 938.

The completely prepared pear halves are ejected from their positions on the splitting blade, immediately after their release by the opening of the gripping means 740, by the rapid actuation of a pair of gate-like ejector flaps 940 and 941 (Figs. 67, 68 and 69) hingedly flush-mounted in correspondingly shaped recesses 945 in the sides of each inner splitting blade member 863. As the ejector flaps swing out from their recesses they break the suction caused by the film of pear juice between each pear half and the splitting blades, and also move the two pear halves laterally away from the blade to clear the core, consisting of the seed cell, stem and stem fibers which it is desirable to retain within the gap between the two blade portions during the ejection of the completely prepared pear halves.

Each ejector flap comprises a plate portion with a notched, hinge-like outer end portion 942 which is interfitted, through an opening 943 provided therefor in the inner splitting blade member 863, with a corresponding notched formation along the vertical outer edge of the similar, but reversed, other ejector flap mounted in a recess in the opposite side of the inner splitting blade member 863. A hinge pintle 944 is inserted downwardly through aligned holes 947 and 948 in the inner splitting blade member, and also through aligned holes in the interfitted hinge portions 942 of the ejector flaps. Each ejector flap has a thickened inner or free vertical edge portion 949. A cam follower roller 950 is mounted to project from each of such thickened edge portions with its axis substantially radially disposed relatively to the axis of the pintle 944.

A cylindrically curved cam plate 951 is mounted, by bolts 954, on a vertically reciprocable piston block 955, with the axis of curvature of the cam plate coincident with that of the hinge pintle 945. The ejector cam plate 951 has a pair of oppositely sloping cam slots 952 and 953 therein (Figs. 66, 67 and 68) to receive the cam follower rollers 950 therein. The piston block 955 is controlled by the operation of a double acting pneumatic cylinder 957 (Figs. 66, 67 and 70).

The piston block 954 is connected by a piston rod 962 to the piston 963 of the pneumatic cylinder 957. The piston rod 962 has a screw and socket joint 964 midway of its length to permit separation thereof in mounting and dismounting the parts in the cylinder. The piston 963 is of a usual type with reversely positioned cup washers 972 and 973, a piston body member 974, and washer retainers 977 and 978 mounted between a flange 979 which encircles the piston rod, and a nut 980 and lock nut 981 on the upper end of the piston rod. The piston block 955 is mounted to slide on a flat guide surface 958 formed on a side of the bore of a lower tubular extension 959 of the pneumatic cylinder 957.

The upper portion 960 of the pneumatic cylinder 957 is of larger diameter than the tubular lower extension 959 thereof, and this upper portion is inserted, with a close slidable fit, in a hole in a boss 961 on the splitting head 252 radially inwardly from each splitting blade assembly mounted thereon. The metal band 868 clamped around the lower end of the lower tubular portion 959 and to the ear 865 on the inner splitting blade member 863 secures the cylinder 957 against downward displacement. A cylinder head 967 has an air tight fit on the upper end of the air cylinder portion 960, and is drawn down into close sealing relation therewith by a pair of bolts 968 (Figs. 12, 66, 67, 69 and 71) which pass through flanges 969 projecting laterally from the head. The head bolts 968 are screwed into threaded holes in the splitting head 252.

A coil spring 970 (Fig. 67) is mounted in compression within the lower tubular extension 959 of the cylinder between the lower end of the piston block 955 and a pin 971 mounted transversely across the lower end of the lower tubular cylinder portion. This compression spring urges the piston block 955 and the curved ejector cam plate 951 mounted thereon upwardly toward its upper limit of movement. Since the cam slots 952 and 953 in the curved cam plate 951 slope upwardly and away from the center of the curved cam plate such upward movement of the cam plate moves the cam follower rollers 950 toward each other to swing the ejector flaps 940 and 941 toward each other into their normal or flush-mounted, condition in the splitting blade recesses as shown in Fig. 67 and in solid lines in Fig. 68. Introduction of compressed air through a usual compressed air fitting 956 (Fig. 67) mounted in an opening in the cylinder head 967 under pressure sufficient to overcome the force of the compression spring 970 and move the piston 963 rapidly downward, forces the piston block 955 and its supported curved ejector actuating cam plate 951 downwardly, thereby swinging the ejector flaps 940 and 941 apart to their open, fruit ejecting position shown in dotted lines in Fig. 68. Reduction of air pressure in the cylinder 957 above the piston 963 to atmospheric allows the spring 970 to return the parts to their normal condition shown in Fig. 67.

At times some pear pulp or flesh may become lodged in the recesses 945 in the inner splitting blade portion in which the ejector flaps seat, and in such cases the force of the spring 970 alone, acting through the cam slots 952 and 953, might not be sufficient to return the ejector flaps to their fully seated flush condition in the splitting blade. In order therefore to insure that the ejector flaps will be fully retracted into their recesses in the splitting blade at the time a pear is impaled on the splitting blade, an additional upward thrust is applied to the piston block 955 and its supported, curved cam plate 951 by introducing compressed air into the lower end of the cylinder 960 (Fig. 70) below the piston therein. For this purpose, a plunger actuated, normally open, cam controlled valve 987 (Figs. 11, 69, and 71) is mounted on the splitting head 252.

A spring biased plunger 988 of the normally open valve 987 is adapted to ride against a vertical cam face 989 on a bracket 990 mounted on the transfer head 272 when the transfer head is in up-raised position and to clear the bracket when the transfer plate is lowered to grip a pear on a stemming tube. When the valve plunger 988 is pressed axially into the valve 987 by the cam face 989 on the bracket it closes the valve and prevents the admission of air to the cylinder 960 below the piston. However, when the cam bracket 990 clears the plunger 988 on the downward movement of the transfer head, the plunger is spring pressed outwardly, opening the valve, and admitting compressed air to the cylinder 960 below the piston 963 and thereby assisting the coil compression spring 970 to forcibly urge the ejector flaps into their recesses in the splitting blade. Tubular air tube connector fittings 965 and 966 (Fig. 70) are welded onto the lower end of one of the ejector actuating cylinders, to convey the compressed air in series to the other ejector actuating cylinder.

*Pneumatic control mechanism*

Control of the compressed air for operating the various pneumatic cylinders and bellows, mentioned in conjunction with the description of the various operative parts of the present invention, is accomplished by a group 1000 of cam-controlled valves (Fig. 72). The valves of this group are actuated selectively and in timely sequence by a plurality of individually formed cams 1001 mounted for simultaneous rotation on a single cam shaft 1002. One air control valve not included in this group is the previously described plunger type valve 987 (Fig. 69) which is actuated by the cam bracket 990 and controls the admission of compressed air to the under side of the ejector actuating cylinder 957 (Fig. 67) to draw the ejector plates 940 and 941 tightly into their recesses just before impaling each pair of freshly peeled pears on the splitting blades.

The cam controlled valve group 1000 is mounted in a housing 1003 comprising a cam-case 1004 with a valve cylinder block 1005 bolted onto a side thereof. The lower end of the cam-case 1004 has a cam shaft bushing 1007 mounted therein, with a downwardly projecting pilot flange 1008 of the bushing fitted into a hole in the stationary peeling arm pivot support plate 157 (Figs. 1, 3, 11 and 72) upon which the valve group 1000 is mounted. The cam shaft 1002 is journaled at its lower end in the pilot bushing 1007 and at its upper end in a second bushing 1009 mounted in the upper end of the cam case 1004.

A usual type of oil sealing ring 1010 is mounted in the lower bushing 1007 around the cam shaft 1002. A driven gear 1011 is secured by a Woodruff key 1012 and set screw 1013 on the lower end of the cam shaft 1002 which projects downwardly below the peeling arm pivot support plate. The cam shaft driven gear 1011 is driven by the cam driving gear 162 (Figs. 6, 72 and 73) mounted on the cove member 171 of the stemming tube turret to rotate therewith. The cam shaft driven gear 1011 and its annular driving gear 162 on the stemming tube turret are in the ratio of one to six, so that the cam shaft 1002 will be rotated six revolutions for each revolution of the stemming tube turret.

Each of the valve actuating cams 1001 is formed in two halves 1014 and 1015 (Fig. 73) to permit it to be mounted on and removed from the cam shaft without removing the cam shaft from the cam-case or disturbing adjacent cams. Each cam half is formed with a semi-cylindrical axial recess 1017 therein. These recesses are complementary to each other so that together they closely encircle the cam shaft. A cam track 1018 is formed on the periphery of each cam, the track having a high portion 1019 and a low portion 1020. The arcuate extents of the high and low cam track portions are proportionate to the desired operation of a particular valve 1021 associated therewith as will be brought out later herein.

Each cam half has an axially extending clamping block portion 1022 thereon with holes therethrough to receive a pair of clamp bolts 1023 and 1024 by means of which the cam halves are clamped together in complementary pairs around the cam shaft. The first clamp bolt 1023 is of a usual type and is inserted in aligned openings through the clamp blocks 1022 as one side of the cam shaft. This first clamp bolt passes freely through the hole in one clamp block and is screwed into the hole in the other which is threaded to receive it.

The second bolt 1024 of each pair serves as a combined cam adjusting and clamp bolt. It is inserted with a close sliding fit through a second pair of aligned unthreaded bolt receiving holes in the clamp blocks 1022 (Fig. 73) on the other side of the cam shaft from the first clamp bolt 1023. This second pair of holes extends substantially tangentially into the cam shaft recesses 1017 in the cam halves 1014 and 1015 as shown in Fig. 73. The periphery of the cam shaft at the location of each of these second cam adjusting and clamp bolts 1024 has a ring 1027 of worm teeth cut peripherally therein (Fig. 73) for threaded inter-engagement with the thread of the second clamp bolt 1024. A nut 1028 is screwed onto the second clamp bolt 1024 to clamp the cam halves firmly together around the cam shaft. By loosening the clamp nut 1028 and the first clamp bolt 1023 sufficiently to free the cam for rotative movement about the cam shaft, the cam can be accurately adjusted rotatably about the cam shaft by turning the second clamp and adjusting bolt 1024 in the nature of a worm pinion. After adjustment, the cam halves again can be clamped tightly onto the cam shaft by tightening the first clamp bolt 1023 and the nut 1028 on the second clamp bolt 1024.

The cylinder block 1005 has eleven similar valve cylinders 1030 bored therein (Figs. 72 and 73). The walls 1031 separating adjacent valve cylinders are notched at 1032 on their outer edges to provide a continuous air chamber 1034 interconnecting the outer ends of all of the cylinders. A constant pressure air outlet fitting 1035 is mounted in a hole in the upper end of the cylinder block 1005 to open into the outer end of the uppermost cylinder 1030 and thence into the chamber 1034. A cylinder head 1040 is secured to the cylinder block 1005 by bolts 1041 to overlie the outer ends of all the cylinders.

A compressed air supply fitting 1042 is screwed into an opening in the cylinder head and is connected to any suitable source of compressed air such as an ordinary air compressor, through a tube 1043 (Figs. 1, 72 and 73) a constant pressure valve 1044, an air filter 1045 and a shut off valve 1047. The chamber 1034 connecting the outer ends of all of the cylinders, and the top fitting 1035 thus are constantly supplied with air under pressure. In the illustrated embodiment of the invention eleven cam controlled valves 1021 are provided in the group 1000. Since they are all similar to each other, one only of these valves will be described in detail.

Referring now to the structure and arrangement of an individual cam controlled valve 1021 (Figs. 72 and 73) the bore of the valve cylinder 1030 is reduced slightly at 1051, and a cylindrical valve body member 1052, with axial bore therethrough, is inserted, with a press fit, into the larger diameter outer bore portion of the cylinder 1030 to have its inner end seat against the shouldered offset 1051 between the two cylinder bore portions. The valve body 1052 has an annular exhaust groove 1054 centrally around its periphery, and this exhaust groove is in open communication with the atmosphere through an exhaust port 1055 in the cylinder wall. A plurality of endwise directed exhaust ports 1057 through the valve body communicate between the annular exhaust groove 1054 and the inner end of the valve body.

The axial bore through the valve body 1052 is of a diameter to receive, for slidable movement therein, the larger diameter, intermediate or central portion 1058, of a hollow valve stem 1060. Both end portions 1061 and 1062 of the valve stem are of slightly smaller diameter than the intermediate portion 1058. The valve stem 1060 has a hole 1063 drilled axially in the outer end thereof, the hole extending inwardly well beyond the larger intermediate portion 1058 of the valve stem. The outer end of this axial hole 1063 is closed by a plug 1064 brazed in position to seal off the outer end of the hole.

A plurality of air inlet ports 1065 (Figs. 73 and 74) are provided radially through the wall of the valve stem a slight distance inwardly from the shouldered offset between the smaller diameter outer end portion 1062 of the valve stem and the larger diameter intermediate portion 1058 thereof. These air inlet ports 1065 open from the hollow interior of the valve stem into an annular space around the valve stem provided by an endwise extending flange 1067, formed on the outer end of the valve body member 1052, and spaced radially from the valve stem.

An annular outer or inlet valve sealing member 1068 is gripped between a nut 1069 screwed onto the threaded outer end of the valve stem and the shouldered offset between the larger diameter intermediate portion 1058 of the valve stem and its smaller diameter outer end portion 1062. The outer valve sealing member 1068 has a sealing gasket 1070 which may be of synthetic rubber mounted in an annular groove in its inner end therein. The gasket is adapted to seat against the flange 1067 on the outer end of the valve body to close off the inlet ports 1065 in the valve stem from the constantly pressurized outer end chamber 1034.

A generally similar annular inner or exhaust valve sealing member 1071 is mounted slidably on the reduced inner end portion 1061 of the valve stem. Its sealing gasket 1072 is directed outwardly toward the inner end of the valve body 1050 and is adapted, in its outermost position, to cover and seal the endwise opening exhaust ports 1057 through the valve body. A second plurality of ports 1073 are provided through the wall of the valve stem 1060 inwardly of the inner sealing member 1071 to communicate between the hollow interior of the valve stem and the inner end of the valve cylinder. A hose connector fitting 1074 (Fig. 73) is screwed into a port in the cylinder wall inwardly of the valve body 1052 and is connected by suitable air conducting means to the particular air cylinder or other pneumatic device to be controlled by the valve.

A relatively light coil spring 1075 (Fig. 73) surrounds the valve stem 1060 inwardly of the inner sealing member 1071 and is held in compression between the inner sealing member 1071 and a thrust washer 1077 seated on a flanged packing gland 1078 which is fitted into the inner end of the cylinder 1030. The flanged packing gland 1078 has its flange 1079 gripped between the base of the cylinder block 1005 and the cam case 1004. The packing gland 1078 also has an axially inwardly extending guide sleeve portion 1080 which slidably receives the inner end of the valve stem 1060 therein.

On the inner side of the packing gland 1078 a relatively heavier coil spring 1081 surrounds the sleeve 1080 and the inner end of the valve stem 1060 and is held in compression between the inner end of the packing gland 1078 and a cupped metal washer 1082 secured on the inner end of the valve stem 1060 by a pin 1083 through the valve stem. The relatively light coil compression spring 1075 urges the inner annular sealing member 1071 axially outwardly toward a seated condition against the inner end of the valve body 1052 to close the endwise directed exhaust ports 1057 therethrough except when the shouldered offset between the larger intermediate portion 1058, and the smaller diameter inner end portion 1061 of the valve stem moves the inner sealing member 1071 axially inwardly clear of its seat as shown in Fig. 73. The relatively strong spring 1081 is of sufficient strength normally to overcome the thrust of the lighter spring 1075 and to move the valve stem 1060 inwardly against the pressure of the lighter spring 1075.

In this inwardly biased position of the valve stem the outer annular sealing member 1068 is seated on the flange 1067 to close the air inlet ports into the valve stem, and the inner annular sealing member 1071 is spaced inwardly away from the valve body to open the exhaust ports 1057 through the valve body and thence through the annular groove 1054 and the exhaust port 1055 to the atmosphere.

A valve actuating cam follower arm 1087, is mounted axially inwardly of each valve stem 1060. One end of the valve actuating arm 1087 is pivoted on a bracket 1088 secured to the inner face of the cylinder block 1005 by a cap screw 1089. The other or free end of the arm 1087 has a cam follower roller 1090 journaled thereon. The cam follower roller rides on the peripheral cam track 1018 of its associated cam toward which it is pressed by the heavier coil compression spring 1081. When the roller 1090 is on the low portion 1020 of the cam the valve stem 1060 is moved axially inwardly by the heavier coil spring 1081 to its inward or exhaust open, inlet closed position of Fig. 73. When the cam follower roller 1090 rides up onto the high portion 1019 of the cam, however, the valve stem is pushed axially outward to unseat the outer inlet sealing member 1068, and to permit the lighter coil spring 1075 to seat the inner exhaust sealing member over the exhaust ports 1057 through the valve body.

Most of the pneumatically controlled devices or mechanisms of the illustrated embodiment of the invention are usual pneumatic cylinders or bellows. However, the cylinder 920 (Figs. 69 and 71) for operating the calyx trimming and seed cell severing knives, and the cylinder 841 (Fig. 57) for operating the butterfly levers 821 and 822 (Figs. 58, 59 and 60) for opening the gripping bracket support arms against the torque produced by their associated arcuate leaf springs 820 (Fig. 63) require a substantial amount of power and must operate promptly in order to maintain a timely sequence of operation in the cycle of the machine. For these reasons the cylinders 841 and 920 are of a special type (Figs. 11, 12, 67 and 69) with directly connected pressurized air lines, and integrally mounted diaphragm control valves for rapid, powerful actuation, of the cylinders. Since the two special cylinders 841 and 920 and their associated valve mechanisms are generally similar to each other, only the cylinder 920 will be described in detail.

Referring now to cylinder 920 (Figs. 75 to 78) a cylinder barrel 1094 which may be of metal tubing, has cylinder heads 1095 and 1096 clamped thereon by the tie rods 924. The tie rods each have one end thereof screwed into threaded holes in the cylinder head 1096 and pass through aligned holes in the other head 1095. Nuts 1098 (Fig. 75) are screwed onto the other ends of the rods to draw the cylinder heads tightly into position over the ends of the barrel. An air actuated piston 1100 is mounted in the barrel 1094 and comprises a usual pair of reversely positioned cupped washers 1101 and 1102, which may be of leather, secured in position on the threaded end of a piston rod 1103 between nuts 1104 and 1105 screwed thereon. The piston rod 1103 passes through a usual packing gland 1107 and packing nut 1108 on the cylinder head 1095.

Rapid and powerful actuation of the piston 1100 upon opening of its associated cam controlled valve 1021 is accomplished by providing a constant supply of compressed air immediately adjacent the cylinder, and by merely using the compressed air from the cam controlled valves 1021 to operate a rapid-acting diaphragm valve 1110 mounted on the end of the cylinder 920. The constant supply of compressed air for actuating the piston is provided adjacent the cylinder 920 through the constant pressure supply line 1174 from the fitting 1035 (Figs. 72 and 75) one branch of which is connected to a tube connector fitting 1111 in the end of an air inlet manifold 1112.

The inlet manifold 1112 is secured, by screws 1113, along one side of an aligned coaxial pair of generally cylindrical valve body members 1114 and 1115, each of which has an axial bore therethrough. To facilitate description, the valve body member 1114 closest to the cylinder barrel 1094 will be referred to as the first valve body and the other as the second. The cylindrical valve body members 1114 and 1115, each have a plurality of aligned mounting holes 1117 (Fig. 77) marginally therethrough to receive mounting screws 1118 (Fig. 75) which secure the valve body members 1114 and 1115 and a domed valve head member 1119 in co-axial alignment onto the outer end of the cylinder head 1096.

Three similar diaphragms 1120, 1121 and 1122 (Figs.

75, 76 and 78) which may be of tough elastic diaphragm material such as synthetic rubber, are of the same diameter as the valve body members 1114 and 1115. The diaphragms, like the valve body members, will be referred to herein as the first, second and third depending upon their proximity to the cylinder head 1096.

The diaphragms also have mounting holes 1123 marginally therethrough corresponding to those in the body members to receive the mounting screws 1118. The first diaphragm 1120 is interposed between the exteriorly recessed piston head 1096, and the first valve body member 1114. The second diaphragm 1121 is interposed between the two valve body members, and the third diaphragm 1122 is interposed between the second valve body member 1115 and the domed valve head 1119. The mounting screws 1118 draw the valve body members, diaphragms, and heads, tightly together into marginal, air sealing relation with each other.

Both ends of both the first and second valve bodies 1114 and 1115 have similar, annular, concentric grooves therein, the flange 1124 forming the radially inward wall of each groove being of lesser height than the marginal or radially outward flange 1125 thereof. The end grooves 1127 and 1128 which are adjacent, and on opposite sides of, the central or second diaphragm 1121 (Fig. 78) are connected to the air inlet manifold 1112 by passages 1130 and 1131 drilled in the first and second valve bodies 1114 and 1115, respectively. The other end grooves 1132 and 1133 adjacent the first and third diaphragms 1120 and 1122, respectively, are connected, through exhaust passages 1134 and 1135 drilled through the first and second valve bodies, respectively, to the atmosphere (Figs. 76 and 77 and 75).

A diaphragm-connecting center post 1140 comprises a pair of post members 1141 and 1142. The center post 1140 is of a diameter to fit freely and with substantial surrounding clearance within the axial bores of the valve housing members 1114 and 1115. The post members 1141 and 1142 have threaded co-axial interconnection with each other at 1143 (Fig. 76) to grip the second or central diaphragm 1121 therebetween. Screws 1144 and 1145 secure the first and third diaphragms 1120 and 1122, respectively, to the ends of the assembled center post. Each of the post members 1141 and 1142 is of the same length as the marginally flanged portion of the valve body members 1114 and 1115 in which it rides, so that upon endwise movement of the center post in either direction, all three interconnected diaphragms will be moved simultaneously, toward seated relation with the central flanges 1124 on one end of the valve body members, and away from such seated relation with the central flanges on the other ends of the valve body members.

Air passages for controlling movements of the diaphragm and center post assembly from the cam controlled valves 1021 associated therewith are provided by a pair of axially drilled posts 1147 and 1148 (Fig. 76) which are provided with place of two of the valve mounting screws 1118. The drilled post 1147 has a passage drilled throughout its entire length, the passage opening into a lateral passage 1149, in the recessed cylinder head 1096, which in turn opens into the space between the recessed cylinder head 1096 and the first diaphragm 1120. Admission of compressed air into the passage in the drilled post 1147 is controlled by one of the cam actuated valves 1021 of the group 1000 as will be described later herein.

The second drilled post 1148 has a shorter drilled passage therein which opens into a lateral passage 1146 in the domed valve head 1119, and thence into the space between the domed valve head 1119 and the third diaphragm 1122. Admission of compressed air into the passage in the second drilled post 1148 is controlled by another of the cam actuated valves 1021 of the group 1000.

A piston actuating air passage 1150 (Fig. 78) opens radially from the axial bore of the first valve body member 1114, and thence extends endwise through the marginal rim of the first valve body member 1114, through the first diaphragm 1120 and the recessed cylinder head 1096, and opens into one end of the cylinder 920 to drive the piston 1100 therein in an operative stroke to the other end of the cylinder as shown in Fig. 78. A piston return air passage 1151 (Figs. 77 and 78) opens radially from the axial bore of the second valve body member 1115, through a tube connector fitting 1152 screwed into the radial passage 1151, through a tube 1153 secured in the fitting, through a second fitting on the other end of the tube 1153, through a passage 1154 in the other cylinder head 1095 and thence into the other end of the cylinder from the passage 1150 to return the piston to the position shown in Fig. 76.

When the cam controlled valve 1021 for initiating the operative stroke of the piston is operated, compressed air flows from such cam controlled valve through the passage in the drilled post 1147, and into the space between the recessed cylinder head 1096 and the first diaphragm 1120, thereby moving the first diaphragm endwise away from the cylinder barrel 1094 (Fig. 78). Due to the interconnection of the three diaphragms by the center post 1140, this movement of the first diaphragm simultaneously moves the second and third diaphragms 1121 and 1122 endwise in the same direction. The first and second diaphragms 1120 and 1121 thereupon seat against the central flanges 1124 on the ends of both valve body members nearest the cylinder barrel.

The first diaphragm thus seals off the annular exhaust groove 1132 on the inner end of the first valve body from the axial bore of the first valve body member 1114 (Fig. 77). This same movement of the center post moves the second or middle diaphragm 1121 clear of the central flange 1124 on the end of the first valve body member 1114 adjacent the second diaphragm and thereby opens the inlet groove 1127 on the end of the first valve body member 1114 to its axial bore. The second diaphragm in this position is seated on central flange of the inlet groove 1128 in the second valve body member 1115 to close it off from the axial bore of the second body member.

This same movement of the center post 1140 moves the third diaphragm 1122 away from the central flange on the end of the second valve body member 1115 and opens the exhaust groove 1133 in the end of the second valve body member 1115 to its bore.

In this position of the diaphragms, compressed air is admitted from the valve inlet manifold 1112 through the air inlet passage 1130 in the first valve body member 1114 (Fig. 78) into the air inlet groove 1127 in the end of the first valve body member, and past the central flange 1124 thereof into the axial bore of the first valve body member 1114. Thence the air flows through the passage 1150 endwise through the first valve body member 1114 and through the recessed cylinder head 1096 into the end of the cylinder, forcing the piston 1100 endwise to the opposite end of the cylinder from that shown in Fig. 76.

During this stroke of the piston, air is permitted to exhaust from the other end of the cylinder 920 through the passage 1154 in the cylinder head 1095, the tube 1153, the radial passage 1151 in the second valve body 1115, the axial bore of the second valve body member 1115, between the central flange 1124 thereof, and the third diaphragm 1122 which are spaced apart in this position of the valve into the exhaust groove 1133, and thence through the exhaust passage 1135 to the atmosphere. To return the piston to its normal position shown in Fig. 76, the air pressure between the first diaphragm and the Fig. 76, the air pressure between the diaphragm and the closing of the cam actuated valve controlling the admission of compressed air to the drilled post 1147; compressed air is admitted, by the cam actuated valve 1021 associated therewith through the second drilled post 1148 into the space between the domed valve head 1119 and the third diaphragm 1122. This moves all three diaphragms by means of their interconnected center post toward the cylinder barrel 1094 to the position shown in Fig. 76.

In this position of the valve, compressed air is admitted from the constantly pressurized manifold 1112 and the inlet passage 1131 in the second valve body 1115, to the inlet groove 1128 in the end of the second valve body member 1115 adjacent the central diaphragm 1121, and thence through the space between the central flange 1124 of the inlet groove 1128 and the central diaphragm 1121, into the axial bore of the second valve body member 1115, and thence through the tube 1153 and the passage 1154 in the cylinder head 1095 to return the piston 1100 to the position shown in Fig. 76.

During this return stroke of the piston, air is exhausted from the valve supporting end of the cylinder through the passage 1150 (Fig. 78) the axial bore of the first valve body member 1114 (Fig. 76) between the central flange 1124 on the end of the first valve body member 1114 and the first diaphragm 1120, and thence through the exhaust groove 1132 and the exhaust passage 1134 in the first valve body member 1114 to the atmosphere.

Tubing arrangement

The valve housing 1003 (Fig. 1) is mounted on the stationary peeler arm pivot support plate 157. The feed cups 300 and their actuating air cylinder 320 also are stationary, as is likewise the sear releasing cylinder 471. Therefore, the two air lines 1160 and 1161 from their respective valves 1121 to these two cylinders are of copper tubing.

The remaining pneumatic devices to be operated or controlled by the cam controlled valves 1121 in the valve housing 1003, however, are mounted either on the transfer head, which both oscillates laterally and reciprocates vertically, or on the splitting head which oscillates laterally only. These remaining pneumatic devices, therefore, require the use of flexible air hoses for connecting them to the valve housing 1003.

To provide a uniform arrangement of the flexible air hoses from the valve housing 1003 to the various pneumatically controlled devices mounted on the transfer head 272, a tube connector standard 1162 (Figs. 2, 3 and 94) is mounted by screws 1163 (Fig. 3) in upright position on the transfer head. The tube connector standard 1162 may comprise a length of solid brass rod (Fig. 94) brazed onto a base 1164, the rod having seven holes 1165 drilled transversely therethrough. Each of such holes has a usual tube connector fitting such as 1167 screwed into each end thereof.

The six lowermost tube connector fittings on one side of the standard 1162 are connected, by flexible hoses on one side of the standard 1162, to the six cam controlled valves in the valve housing 1003 which control the admission of compressed air to various pneumatically actuated devices on the transfer head while the topmost hole in the standard is connected, by a hose 1168, through one side of a Y fitting 1169, and a hose 1170, to the constant pressure fitting 1035 in the top of the valve cylinder block 1005. The other sides of the six lowermost holes in the standard are connected by copper tubes to the various devices on the transfer head which they control, while the other side of the topmost hole in the standard is connected, by a copper tube 1171, to the intake manifold of the actuating cylinder 841 of the butterfly levers 821 and 822.

Figs. 79 to 85 inclusive show diagrammatically the tubing connections for each of the pneumatically actuated devices and will be described briefly. The tubes and passages connecting the various parts in these figures may also be identified in Figs. 1 and 2 wherein these tubing connections, and their associated parts, where visible, are designated by the same reference numerals. Tubes which are connected through the standard 1162 are so indicated in the diagrams.

Fig. 79 illustrates diagrammatically the tubing connections which supply compressed air to control the operation of the calyx trimming and seed cell severing knives. In this Fig. 79 the constant pressure fitting 1035 in the top of the valve housing 1003 is connected by the hose 1170, the Y fitting 1169, a hose 1172, the other branch of the Y fitting 1170, a second Y fitting 1173, and a hose 1174 to the air inlet manifold 1112 on the actuating cylinder 920 for operating the rack supporting segmental bracket 913, which operates the calyx trimming and seed celling knives. To control the admission of air to the cylinder 920 through the constant pressure line thus provided, the uppermost cam controlled valve 1021 in the valve housing 1003 is connected by a hose 1175 to the drilled post 1147 on one side of the diaphragm valve 1110 mounted on the end of the calyx trimming and seed celling cylinder 920 to actuate the diaphragm valve 1110 and thereby cause an operative stroke of the piston 1100 in the cylinder 920 (Fig. 76). The piston is returned to its normal position by the opening of the second uppermost cam controlled valve 1021 which admits compressed air through a hose 1177 to the drilled post 1148 on other side of the diaphragm valve 1110, and thereby allows air to flow from the constantly pressurized intake manifold through the tube 1153 into the other end of the cylinder 920 as in Fig. 78. Only one of the cam actuated valves to the diaphragm control mechanism should be open at any one time, since otherwise the pressures on opposite ends of the diaphragm assembly would balance each other and prevent operation of the valve.

Fig. 80 shows the control arrangement for admitting compressed air to the lower ends of the ejector flap actuating cylinders 957. In this Fig. 80 the third uppermost cam controlled valve in the housing 1003, is connected by a flexible hose 1178 to the upper ends of the vertical ejector flap actuating cylinders 957, see also Fig. 67. Also in Fig. 80 a hose 1179 is connected from the second Y fitting 1173, which, as mentioned in connection with the description of Fig. 79 is connected to the constant pressure fitting 1035, to the plunger type valve 987, and thence, by a hose 1180, to the lower ends of the ejector flap actuating cylinders 957 to force the ejector flaps snugly into their recesses before impaling each new pair of freshly peeled pears on the splitting blades.

Fig. 81 shows the control arrangement for the diaphragm valve controlled cylinder 841 for operating the gripper opening butterfly levers 821 and 822 (Figs. 57, 58, 59 and 60). Air under constant pressure is supplied to the intake manifold of the cylinder 841 from the constant pressure fitting 1035 in the top of the valve housing 1003 through the hose 1170, the first Y fitting 1169, the hose 1168 and the copper tube 1171. Tubes 1182 and 1183 are connected from the fourth and fifth uppermost cam controlled valves in the housing 1003 into the standard 1162, and thence, through copper tubes 1184 and 1185 to the diaphragm valve on the cylinder 841 to control the operation of the gripper actuating butterfly levers 821 and 822.

As shown in Fig. 82, the sixth cam actuated valve from the top in the housing 1003 is connected, by a hose 1187 through the standard 1162, and thence, by a copper tube 1188 to the gripper anchoring clutch actuating bellows 788.

In Fig. 83 as mentioned previously herein, the seventh cam controlled valve from the top in the housing 1003 is connected directly by the copper tube 1160 to the cylinder 320 which, upon operation, simultaneously separates the feed cups 300 (Fig. 23), cocks the stem end trim knives 387 and 388, and separates the gauging fingers 330 and 331 to permit a pair of pears to drop from the feed cups into the transfer cups.

Fig. 84 shows the tubing arrangement for operating the various pneumatically actuated devices controlling the transfer cups and their associated mechanism. A hole 1190 is connected from the eighth cam controlled valve from the top in the housing 1003 to one side of the standard 1162, and thence, through a copper tube 1191 to the end of each of the transfer cup carriage actuating cylinders 523 which causes the cylinder 523 to separate the carriages. From the tube 1191, a branch tube 1192 is connected to the cylinders 517 which swing the transfer cups 490 and 491 apart about their mounting axes (Fig. 34). Thus, when the two half portions of each transfer cup are separated bodily by the movement of their supporting carriages (Fig. 34) they also simultaneously are swung apart about their axes of pivotal support to free a pear which is impaled on a stemming tube when this separating action of the transfer cups occurs. Also in Fig. 84 the ninth cam controlled valve from the top in the housing 1003, is connected by a hose 1193 to one side of the standard 1162 and thence, by a copper tube 1194 to the other ends of the transfer cup control cylinders 523 from that to which the tube 1191 is connected, for moving the transfer cups closely together and axially aligning the pears in upright position in the transfer cups prior to impaling them on the stemming tubes. Also in Fig. 84 the tenth cam controlled valve from the top in the housing 1003 is connected by a hose 1195 to one side of the standard 1162, and thence, through a copper tube 1197 to the cylinders 554 which swing the presser disks 547 (Figs. 28 and 32) over the bulb ends of the pears for impaling them on the stemming tubes.

In Fig. 85 the copper tube 1161, as mentioned previously herein, is connected directly from the lowermost cam controlled valve in the housing 1003 to the cylinder 471 (Fig. 22) which trips the sear plate 459 (Fig. 24) for releasing the stem end trimming knives from their cocked position to trim the pears in the feed cups.

Operation

Before starting the machine, to insure that it is clear of obstructions, it may be turned manually through one or more cycles of operation by a hand wheel 1200 (Fig. 1) mounted on the end of the main horizontal drive shaft 220. The machine is placed in operative condition by energizing the drive motor 223 (Fig. 1) and opening the air shutoff valve 1047 to a suitable supply of compressed air.

In the event of jamming or excessive overload on the machine at any time during its operation, the internally splined spiral drive gear 233 (Fig. 9) will be forced axially outwardly on its splined shaft to operate the safety switch 250 and de-energize the motor.

With the drive motor 223 running, the face cam 264 (Fig. 7) which controls the lateral oscillation of the splitting and transfer heads; and the barrel cam 122 (Fig. 8) which controls the vertical reciprocation of the transfer head, are rotated at six times the speed of the stemming tube turret 170 (Fig. 10).

The operator stands or sits in front of the lug box supporting table 109 (Figs. 1 and 2) and lug boxes 110 of pears are kept constantly available on a roller conveyor 1205. The operator takes the pears two at a time from the lug box on the table 109 and drops them, stem end down, into the feed cups 300 at any time when the feed cup cover flaps 477 (Fig. 16) are in their upright, open position.

The diagrammatic illustrations (Figs. 86 to 91) will assist in visualizing the relative movements of the oscillating splitting head 252, the oscillating and vertically reciprocating transfer head 272, and the oscillation relatively to the splitting head of the segmental bracket 913 which actuates the calyx trimming and seed celling knives. Also these diagrams (Figs. 86 to 91) bring out the relative movements of these parts to the continuously rotating stemming tube turret 170 during successive cycles of their operation. The feeding, transferring, splitting, calyx trimming, seed celling and ejecting cycle recurs six times for each complete rotation of the stemming tube turret.

The peeling of the fruit occurs between the time when the pears pass beyond the right hand limits of the diagrammatic views shown in Figs. 86 to 91, and when, having completed their rotative orbit around the stemming tube turret, they return, peeled, to enter at the left hand limits of these views. A further diagrammatic representation of the travel of a pear entirely through the machine from beginning to end of its preparation cycle is shown in Fig. 92 and will be described later herein.

In the diagrammatic Figures 86 to 91 and also in Fig. 92 the cyclical path of travel of a single point 1201 on the transfer head midway between the transfer cups is represented by a graph 1202. This graphic outline is the resultant of the combined oscillating and reciprocal movements produced on the point 1201 on the transfer head by the rotation of the barrel cam 122 and the face cam 264.

A single reference pair of stemming tubes 139a is indicated in heavier outline throughout all of the diagrammatic Figures 86 to 91 so that the progress of this one pair of stemming tubes may be followed through the single cycle of operation of the transfer and splitting heads and their associated mechanisms which are represented in these views.

Since there are twelve stemming tubes on the stemming tube turret, and since the spacing between adjacent splitting blades 850 and transfer cups 490 is equal to the distance between adjacent stemming tubes 139, therefore, during each complete cycle of operation of the transfer and splitting heads as represented by the graph 1202 (Figs. 86 to 91) a pair of stemming tubes will advance from a position of vertical alignment with the splitting blades 850, to a position of vertical alignment with the transfer cups 490 and 491.

During the portion of the cycle wherein the graph line 1202 is indicated by a double dotted line, the transfer and splitting heads will move rotatively in a counterclockwise direction in synchronism with the stemming tube turret, and with the splitting blades and transfer cups in vertical alignment with two adjacent pairs of stemming tubes, as shown in Figs. 86, 87 and 91.

A brief description of successive stages in the feeding, transferring, coring, splitting and ejecting cycle will now be given, beginning with the parts in the position shown in Fig. 86. In Fig. 86 the transfer head 272 is being swung in a counterclockwise direction by the action of the face cam 264 and is at the lowermost point in its path of travel due to the action of the barrel cam 122 (Figs. 7, 8, 14 and 15).

A pair of pears 734a, impaled on the heavily outlined reference stemming tubes 139a, have completed their orbit about the stemming tube turret. These pears have been peeled, as explained later herein, and have just been gripped by the grippers 740 (Fig. 61). The grippers are moved to their fruit gripping position by the arcuate leaf springs 820 which are permitted to act on the bracket support arms 761 and 762 by the movement of the butterfly levers 821 and 822 to their closed position shown in Fig. 61. Since the bellows 788 is actuated only to lock or grip the bracket support arms in their fruit gripping position, the springs 820 are free to swing the parts to their fruit gripping position upon the movement of the butterfly levers to this closed position.

A pair of pears 734b shown in the feed cups 300 in Fig. 86 are those which are to be impaled on the heavily outlined stemming tubes 139a upon completion of the presently described cycle of operation. Also, in Fig. 86 the transfer cups 490 and 491 are in their fully separated or open condition under the action of the transfer cup carriage actuating cylinder 523 (Figs. 35 and 84) and the transfer cup tilting cylinders 517 (Fig. 34). The pear presser disks 547 associated with the transfer cups are in their extended or actuated position over the bulb ends of a pair of pears 734c impaled on the two stemming tubes immediately to the right of the heavily outlined reference pair of stemming tubes 139a. The presser disks are swung to this position over the pears by the operation of their associated pneumatic cylinders 554 (Fig. 34). These pears 734c were fed into the transfer cups 490 and 491 from the preceding feeding operation, and their impalement on the stemming tubes 139b is just being completed by the presser disks 547 at the moment in the cycle indicated in Fig. 86. The opening of the transfer cups occurs just prior to the time when the pears are completely impaled on the stemming tubes, or in other words just prior to the moment indicated in Fig. 86.

In the next diagrammatic Figure 87 of the cycle, the transfer head 272 has been raised from its previous lowermost position shown in Fig. 86, as is indicated by the position of the dot 1201 on the graph 1202, a distance approximating two-thirds of its upward travel. It has almost reached its limit of counterclockwise rotative movement under the action of the face cam 264, but is still moving upward under the action of the barrel cam 122 (Figs. 7, 8, 14 and 15).

The pears 734a from the heavily outlined reference stemming tubes 139a have been moved upwardly by the grippers 740 clear of the stemming tubes and are partially impaled on the splitting blades 850. The reduction to atmospheric of the pressures in the carriage actuating cylinders 523 allows the transfer cup carriages and their supported transfer cups to be moved inwardly toward each other by the leaf spring 540 (Figs. 32 and 34). Also, the reduction to atmospheric of the pressure in the transfer cup tilting cylinders 517, allows the torsion springs 520 and 526 (Figs. 30 and 31) to swing the transfer cup half portions back to their normal fruit receiving positions. The presser disks 547 also at the stage in the cycle indicated in Fig. 87, have been released by the reduction of pressure in their actuating cylinders 554 (Figs. 28 and 31) for return to their normal retracted positions under the action of their torsion springs 551 (Figs. 28 and 32).

Also in Fig. 87 the stem end gauging fingers 330 and 331 beneath the feed cups 300 have been elevated by an outward axial movement of the thrust link 363 (Figs. 12 and 22 to 27) upon completion of the counterclockwise rotative movement of the splitting head 252 which carries the bracket 368 upon which the thrust link 363 is mounted. This upward movement of the gauging fingers raises the cam follower arm 352 in the angle cam 354 (Fig. 26) and thereby causes the gauging fingers of each pair thereof to be swung toward each other through action of the angle cam 354, the arm 352 and the synchronizing plate 345 (Fig. 21).

It will be noted that the leading or right hand stemming tube 139 in Figure 87 has begun to tilt rearwardly toward a horizontal position as it moves toward the peeling mechanism beyond, the operation of which will be reviewed briefly later herein.

At the stage of the cycle indicated in Figure 88 the splitting head 252 and transfer head 272 have reached their limit of counterclockwise movement, and the transfer head has almost reached its uppermost limit of travel as indicated by the position of the dot 1201 on the graph 1202. The stemming tubes in their continuously rotative movement have now moved to the right or in a continued counterclockwise direction out of vertical alignment with the splitting blades and transfer cups. The pears 734b in the feed cups in Fig. 88 have been raised therein by the gauging fingers 330 and 331, which reached their upward limit of movement under the action of the thrust link 363 when the splitting head 252 reached its limit of counterclockwise rotative movement.

The pears in the feed cups in Fig. 88 have had their stem ends trimmed off by the actuation of the trimming knives 387 and 388 which were released from their cocked position by operation of the pneumatic cylinder 471 (Figs. 24 and 85) to release the blade holding sear 459 (Fig. 24).

The pears 734a, which in Fig. 86 were on the heavily outlined reference stemming tubes 139a, now, in Fig. 88, have been impaled on the splitting blades, where the two halves of each of the split pears are retained in position against the sides of the splitting blades by the grippers 740. The stemming tube 139 at the right hand end of the Figure 88 has now been tilted almost to its horizontal peeling position.

In the next Figure 89, the transfer head 272 has reached its limit of upward and counterclockwise travel where it dwells for a period of time determined by the lengths of the vertically coinciding, straight, horizontally represented cam track portions in the diagrammatic representations of Figs. 14 and 15, of the barrel cam 122 and face cam 264 (Figs. 7 and 8). In this position of dwell, the transfer cups 490 and 491 are in their normal, pear-receiving condition, and are positioned directly beneath the feed cups 300.

During this stage of the cycle indicated in Fig. 89, the feed cups 300 are opened by the actuation of the pneumatic cylinder 320 to drop the pears into the transfer cups as shown. Actuation of the cylinder 320 (Fig. 27) through the action of the feed cup actuating slide 309, the angle cam 354 and the angle cam actuated lever arm 352, also swings the gauging fingers 330 and 331 apart to their fully separated conditions.

The stem end trimming knives also are separated to their cocked position upon the actuation of the cylinder 320 by the resultant endwise movement of the blade cocking slide 454. The stem end trimming knives are retained in their cocked position by engagement of the sear 459 over the end members 401 and 401 of the blade mounting carriages (Fig. 19). The feed cup cover flaps 477 are closed upon the opening of the feed cups by their gear and linkage connection with the feed cup mounting shaft 304 (Figs. 20, 24 and 89).

The air cylinder 320 remains operated only momentarily by the action of its associated cam controlled valve (Fig. 82) so that the feed cups 300 remain open only long enough to drop the pears therein into the transfer cups. Thereupon they again are returned by their coil tension spring 317 to their normal, fruit receiving condition. The feed cup cover flaps 477 also return to their normal open condition upon the return of the feed cups to fruit receiving condition. The gauging fingers 330 and 331 remain held in their elevated condition by the elevation of the thrust pin 370 by the thrust plate 371 on the transfer head (Figs. 11, 12, 25, 26 and 27) as long as the transfer head 272 remains in its raised condition. The gauging fingers are, however, permitted to be swung back toward each other by the return to its normal position of the angle cam 354 on the feed cup actuating slide member.

Thus the opening of the feed cups, cocking of the stem end trimming knives, separating of the gauging fingers, and closing of the feed cup cover flaps, all is accomplished simultaneously by the operation of the air cylinder 320 at the stage of the cycle indicated in Fig. 89.

In this same diagrammatic view (Fig. 89) the butt stops 870 and 871 (Fig. 69) on opposite sides of each of the splitting blades 850 have been moved downwardly slightly relatively to the gripping means against the bulb ends of the pears on the splitting blades to insure that the pears are properly positioned on the splitting blades for calyx trimming and seed celling, in case pears should have been positioned too high on the splitting blades due to a squeezing or camming action of the gripper pads on the peeled pears gripped thereby.

Also, (Fig. 89) when the transfer head 272 is at its upper limit of movement, the calyx trimming and seed cell severing operations are performed on the then properly positioned pears on the splitting blades. The calyx trimming and seed celling operations are performed by a swinging actuation, in a counterclockwise direction, of the segmental bracket 913 (Figs. 71 and 89) over the splitting head 252, by the action of its associated pneumatic cylinder 920 (Fig. 79). This seed cell severing and calyx trimming operation may take place at any time when the pears are gripped in their uppermost position on the splitting blades. This counterclockwise swinging of the segmental bracket 913 rotates the calyx trimming and seed celling knives 890 and 902 in opposite directions through their 360° rotative sweeps (Figs. 3, 66 and 71). The segmental bracket is held in its counterclockwise or actuated position relatively to the splitting head until after the then completely prepared pears are ejected from the splitting blades. Upon completion of the dwell of the splitting head 252 and the transfer head 272 in the position indicated in Fig. 89, which is terminated by the entry of the face cam follower roller 262 (Fig. 7) into the outwardly sloping portion of the cam track 263 of the face cam, the face cam follower arm 259, the oscillating tube 251, the splitting head 252, the segmental bracket 913, and transfer head 272 all are swung in a clockwise direction, while the transfer head remains held in its uppermost position by the barrel cam 122.

By the time the splitting and transfer heads and segmental bracket 913 have been swung to their clockwise rotated positions shown in Fig. 90, the grippers 740 will be separated to release the pears on the splitting blades by operation of the butterfly lever actuating cylinder 841 (Fig. 81). At this time the clutch bellows 788 is under atmospheric pressure to allow the coil spring 815 (Fig. 67) to free the clutch actuating member 807. Actuation of the pneumatic cylinder 841 pivotally moves the butterfly levers 821 and 822 (Figs. 59 and 60) to their gripper separating positions shown in Fig. 58, to separate the gripper bracket support arms 761 and 762. Also shown in Fig. 90, and immediately following the separation of the grippers 740, the fruit ejector flaps 940 and 941 are operated (Fig. 80) by admission of compressed air to the upper ends of their vertical cam actuating cylinders 957 (Fig. 67). This frees the pears from the splitting blades and ejects them outwardly where they fall by gravity downwardly through a discharge chute 937 (Fig. 2) and may be received on a take-off conveyor 938 or otherwise, in a usual manner.

The calyx trimming and seed celling segmental bracket 913 (Fig. 90) remains in its counterclockwise actuated position until the pears have been ejected and the ejector flaps 940 and 941 have been permitted to return to their normal, spring pressed, recessed condition in the splitting blades. The stem and seed cell tend to remain in the center vertical gap between the inner and outer portions of the splitting blades after the completely prepared pear halves have been ejected from the splitting blades. This waste matter is thrown out by the counter-rotative movement of the calyx trimming and seed celling knives in their 360° return to normal, and falls downwardly into the waste trough 108, where it is swept into the waste hole 169 in the waste trough 108 by the rubber wiping blade 176 on the stemming tube turret.

The position of the point 1201 on the graph 1202 indicates, in Fig. 90, that the transfer head 272 is about to move downwardly and has almost reached its limit of clockwise rotative movement. Also, since it has not yet reached the double line portion of the graph, that the stemming tubes 139 are not yet in vertical alignment with the next successive pairs of splitting blades and transfer cups from those illustrated in Fig. 86. Such vertical alignment of the stemming tubes with the splitting blades and transfer cups is designed to occur approximately as the transfer head begins to rotate in a counterclockwise direction. While no pears are shown in the feed cups in Fig. 90, it is to be understood that they may be inserted therein at any time after the feed cup closure flaps 477 have reopened after each feeding operation as shown in Fig. 88, but preferably before the stem end trimming knives 387 and 388 are released by the sear 459 (Fig. 87).

In Fig. 91 the transfer head is moving downward and is just beginning its counterclockwise phase of oscillation. The transfer cups 490 and 491 are now in axial alignment with the heavily outlined reference stemming tubes 139a upon which the pears in the transfer cups are to be impaled. The half portions of the transfer cups have been moved toward each other by the actuation of the carriage actuating pneumatic cylinders 523 to squeeze the pears gently in the transfer cups, and, in conjunction with the presser disks 547 (Fig. 28) which also have been swung out, by the actuation of their pneumatic cylinders 554 (Fig. 84) over the bulb ends of the pears in the transfer cups, to position the pears in vertical axial alignment with the reference stemming tubes 139a below them upon which these pears are to be impaled. While not shown in the diagrammatic view of Fig. 91, at this stage of the cycle the second pair of spring pressed cam track segments 628 and 629 (Figs. 39, 46 and 47) are about to engage the upper stemming tube tilting rollers 621 and 623 to hold the reference pair of stemming tubes 139a firmly in upright position as the pears are impaled thereon.

In Fig. 91 the splitting blades also are in direct axial alignment with the pair of pears on the pair of stemming tubes next rearwardly of the reference pair 139a thereof. This following pair of pears will be impaled on the splitting blades during the next succeeding cycle of the transfer and splitting heads from that illustrated. The transfer and splitting heads will continue to move in a counterclockwise direction in axially aligned relation with their respectively aligned pairs of stemming tubes from the position shown in Fig. 91 until, in their next cycle, the parts again reach the position shown in Fig. 87 at the end of the double line portion of the graph 1202. However when the point 1201 on the graph again reaches the position indicated in Fig. 86, it will mark the completion of one full cycle of operation of the stem end gauging and trimming means, the feeding means, and the means for transferring the pears onto the stemming tubes, at the beginning of the pears' orbit of travel around the stemming tube turret; and also marks the completion of one full cycle of operation of the pear gripping means, the means for transferring the pears onto the splitting blades, the means for accurately positioning the pears on the splitting blades, the means for trimming the calyx ends of the pears, the means for severing the seed cells from the bodies of the pears, the means for ejecting the completely prepared pears from the machine, and the means for dislodging the severed stems and seed cells from the splitting blade by the return to normal of the seed cell severing and calyx trimming knives at the terminal end of the orbit of the pears' travel around the stemming tube turret.

Fig. 92 illustrates diagrammatically the complete orbit of a pear around the machine. The same symbols used in conjunction with the diagrammatic views of Figs. 86 to 91 inclusive, are employed in Fig. 92, which, in effect, comprises a diagrammatic cylindrical projection of the machine. The broken line forming the left hand boundary of this view therefore is one boundary of the unrolled cylinder represented by the diagram and would be coincident with the right hand broken line thereof in the cylindrical form thereof. The progress of a pear entirely through the machine will now be described with reference to the illustration of Fig. 92, omitting, however, repetition of the matter describing the cycle shown in Figs. 86 to 91.

Fig. 92 shows the splitting and transfer heads at the same stage in their cycle as indicated in Fig. 88. The latter cycle may be visualized as repeating itself each time the stemming tubes illustrated in Fig. 92 advance a distance equal to twice the lateral separation between adjacent axes of tilt about their stemming tube drive shafts or, in other words, six times for each complete rotation of the stemming tube turret. The reference pair of stemming tubes 139a shown in heavy lines in Figs. 88 to 91 inclusive also have been shown in heavy lines in Fig. 92 and in the same stage of their cycle as indicated in Fig. 88. Also, the pears 734c shown at the left of Fig. 92 represent the same pair of pears similarly designated, but which appear at the right in Fig. 88. These two pears 734c were impaled on their stemming tubes during the preceding cycle of operation of the transfer head.

When the transfer cups have been opened to release the pears, and have been raised by the upward movement of the transfer head sufficiently to clear the two pears which they have just impaled on stemming tubes, the stemming tube tilting rollers 621, 622, and 623 (Fig. 40) of the leading stemming tube of the pair enter the downward offset in the cam track 632 (Figs. 10 and 40). This tilts the stemming tube about the axis of its drive shaft 154 and swings the pear impaled on the stemming tube rearwardly to bring its stem-blossom axis horizontal. In this horizontal position, the pear retaining disk 603 of each stemming tube lies closely adjacent the calyx or trailing end of the pear on the stemming tube next forwardly thereof. Also, in its horizontal position, the common axis of the stemming tube, the pear impaled thereon, and the retaining disk 603 is disposed tangentially of the orbit of the stemming tubes (Fig. 52), and, since the calyx end of the pear is further away from the axis of the radially disposed stemming tube bushing 582 than the face of the retaining disk, the axis of the disk will be offset inwardly from the stem-blossom axis of the pear at the calyx end thereof. This inward offset of the retaining disk permits the peeling knives to take a full peeling cut clear in over the calyx end of the pear to the point where the surface of the pear curves into the calyx depression. This insures positive retention of the pear on its stemming tube throughout the peeling phase of its cycle without the necessity for providing special retainer withdrawing means as has been necessary with previous pear peelers.

As each stemming tube reaches its fully horizontal position, its stem end will be located closely adjacent the first of the twelve peeling heads 667 arranged marginally beyond one side of the stemming tube turret. At this stage in its orbit the stemming tube locking cam follower 640 rides off the locking cam surface 152 (Figs. 46 and 47) into the downwardly offset portion provided therein to free the stemming tube drive shaft for rotation. Simultaneously the stemming tube drive pinion 638 enters into toothed engagement with the segmental rack 151 (Figs. 41, 46 and 47) and is rotated thereby. Since the stemming tube drive pinion 638 is keyed to the stemming tube drive shaft 154, this rotation of the pinion rotates the stemming tube drive shaft and, through the worm 587 and spiral gear 588, slowly rotates the stemming tube and its supported pear and pear retaining disk 603 about their common axis. The stemming tube drive shafts all are rotated in the same direction by their drive pinions 638, but the associated worm 587 and spiral gears 588 of alternate stemming tubes being of opposite pitch, alternate stemming tubes and their associated retaining disk are rotated in opposite directions.

Approximately at the stage in its orbit (Fig. 41) when each pear thus begins to rotate about its axis, it encounters the first peeling head 667. The peeling head is held against the tension of its inwardly biasing spring 662 (Fig. 53) by the scalloped cam 730, properly to position the peeling head 697 (Figs. 52 and 92) at a proper distance from the axial center of the machine for the initiation of each peeling cut on the pear.

The twelve peeling heads 667 are spaced apart along one side of the periphery of the machine so that each succeeding peeling head similarly engages the leading or stem end of each pear after it has been rotated one-twelfth of a revolution after its initial engagement by the preceding peeling head. The peeling cuts are each of a width substantially one-twelfth of the circumference of the pear, so that upon passing the twelfth peeling head the pear will be completely peeled. Actually the width of each peeling cut is slightly greater than this one-twelfth of the pear's circumference in order to provide a slight overlap between adjacent peeling cuts and thereby to insure complete peeling even when the pears are somewhat irregular in shape.

As each peeling head 667 passes the zone of maximum transverse girth of each pear and starts its inward peeling cut over the calyx end of the pear, the auxiliary peeling arm biasing spring 714 is placed under increased compression by the engagement of its associated cam follower roller 724 (Figs. 51 and 52) with a scallop on the cam 727. This swings the triangular bell crank lever 710 by means of the poll link 720 and applies an increased spring bias on the spring connected arm 657 (Fig. 52) and increases the inward spring bias applied to the peeling head. This applies adequate pressure to the peeling head to insure a full peeling cut inwardly across the calyx end of the pear.

As the pear passes the twelfth and last peeling head and has completed one full 360° rotation about its axis, the stemming tube drive pinion 638 arrives at the end of its actuating rack 151 (Fig. 43). At the same time the stemming tube locking cam follower 640 again rides onto the locking cam track 152 (Fig. 44) and locks the stemming tube against further rotation about its axis. Immediately thereafter (Fig. 44) the then leading lower stemming tube tilting roller 622 encounters the rise in the cam track 632 to again tilt the stemming tube to an upright position.

Shortly after the stemming tube is thus swung to an upright position (Figs. 44, 47 and 48) the then uppermost stemming tube tilting rollers 621 and 623 will pass beneath the first two spring pressed track segments 626 and 627. This occurs at the stage in their orbit when each freshly peeled pair of pears on the stemming tubes are about to be gripped by the grippers 740 and transferred from the stemming tubes onto the splitting blades. The heavy spring pressure of the segments 626 and 627 insures that the stemming tubes will be retained firmly in their upright position during the transfer. Thereafter the operations of splitting, seed celling, calyx trimming and ejecting of the completely prepared pears occur as described previously herein in connection with the illustrations (Figs. 86 to 91 inclusive).

While we have described a preferred embodiment of the present invention it will be understood, however, that various changes and modifications may be made in the details thereof without departing from the spirit and scope of the appended claims.

Having thus described our invention, what we claim as new and desire to protect by Letters Patent is as follows:

1. In a fruit preparation machine, a rotary turret, means for continuously rotating said turret, fruit impaling means on said turret, reciprocable fruit transfer means positioned adjacent said impaling means and operating in an oscillative path normal to the plane of rotation of the turret and in timed relation to the continuous rotation of said turret, said fruit transfer means including track means, carriage means mounted on said track means, a pneumatic cylinder mounted adjacent said track means and operatively connected to said carriage means to move the latter, pocket half portions tiltably mounted on said carriage means, a second pneumatic cylinder mounted adjacent said carriage means, and linkage connecting an element of said second cylinder to said pocket portions to tilt them toward and away from each other on actuation of said second cylinder.

2. In a fruit preparation machine, a rotary turret, a plurality of fruit impaling stemming tubes mounted on said turret and spaced radially from the axis of turret rotation, drive means for rotating said turret to move said stemming tubes in a rotary orbit, means associated with said tubes for maintaining the stemming tubes with their axes parallel to the axis of turret rotation, a transfer head mounted adjacent the tubes to reciprocate parallel to, and to oscillate about, the axis of turret rotation, fruit receiving means on said transfer head, means operatively associated with said transfer head for holding a pear in said receiving means with its stem-blossom axis parallel to the axis of transfer head oscillation, and at the same radial distance from the axis of turret rotation as a stemming tube axes, and means associated with said transfer head for simultaneously oscillating and reciprocating said fruit receiving means on said transfer head in timed relation to a predetermined rotative movement of said turret to transfer fruit from the fruit receiving means on the transfer head to impaled condition on a stemming tube.

3. In a fruit preparation machine, a rotary turret, a plurality of fruit impaling stemming tubes on said turret symmetrically disposed about the axis of turret rotation, means operatively connected with each tube for holding each stemming tube parallel to the axis of turret rotation, a transfer head mounted adjacent the tubes to reciprocate parallel to, and to oscillate about, the axis of turret rotation, fruit receiving means on said transfer head adapted to receive a pear therein with its stem-blossom axis parallel to the axis of turret rotation, and at the same radial distance from the axis of turret rotation as the stemming tubes, means associated with said transfer head for oscillating said fruit receiving means on said transfer head in timed relation to a predetermined rotative movement of said turret to move a pear in said fruit receiving means in a congruent path with a stemming tube, and means operatively associated with the transfer head for reciprocating the transfer head toward and away from the stemming tube while in such congruent relationship to transfer the pear from the fruit receiving means on the transfer head to the stemming tube.

4. In a fruit preparation machine, a rotary turret, elongated fruit impaling means mounted on said turret with the longitudinal axis of said impaling means parallel to the axis of turret rotation to describe a circular path upon rotation of said turret, fruit transfer means mounted adjacent the impaling means to oscillate about an axis coincident with that of turret rotation and in a projection of said circular path, means associated with said transfer means for reciprocating said fruit transfer means toward and away from said fruit impaling means along said circular path, and synchronized drive means connected simultaneously to rotate said turret and to oscillate said transfer means to maintain said transfer means in transferring registry with said fruit impaling means during a predetermined reciprocating movement of the transfer means toward and away from the impaling means.

5. In a fruit preparation machine, a rotary turret, elongated fruit impaling means mounted on said turret with the longitudinal axis of said impaling means parallel to the axis of turret rotation to describe a circular path upon rotation of said turret, fruit transfer means mounted adjacent the impaling means to oscillate about an axis coincident with that of turret rotation, fruit receiving means on said fruit transfer means adapted to receive a pear and to hold it with its stem-blossom axis in a projection of said circular path, means associated with said transfer means for reciprocating said fruit receiving means toward and away from said fruit impaling means to move said pear axially along said circular path, synchronized drive means connected simultaneously to rotate said turret and to oscillate said transfer means and the fruit receiving means thereon in transferring registry with the fruit impaling means simultaneously with a predetermined reciprocating movement of the transfer means toward and away from the impaling means, and synchronously timed means operative to release the pear from the receiving means at a predetermined point in the reciprocating movement of the transfer means.

6. In a fruit preparation machine, a plurality of equally spaced fruit holder supports mounted to move continuously in recurring cycles along a closed path, an impaling fruit holder pivotally mounted on each support, means associated with the holders for tilting each impaling holder to an upright position during a predetermined stage of each cycle of movement of its support and to a horizontal position during another stage thereof, fruit feeding means mounted adjacent said path, fruit transfer means mounted adjacent said holders for vertical reciprocation and simultaneous oscillation back and forth along the path of said fruit holders to describe a recurring cyclical path between said feeding means and the stage of said path wherein the holders are upright, means operatively connected with the feeding means for operating the feeding means at a predetermined point in the movement of said transfer means, and synchronous drive means operatively interconnecting the fruit holders and the transfer means to maintain the transfer means in vertical alignment with an impaling holder during a predetermined portion of the vertical reciprocation of said transfer means to impale a fruit in the transfer means onto the aligned impaling holder.

7. In a fruit preparation machine, a feed cup adapted to receive a pear stem end down therein, the bottom of the feed cup being open to allow the stem end of a pear to extend therethrough, stem engaging means adjacent said feed cup for centering the stem end of a pear in said opening, means operatively connected with said stem engaging means for elevating said centering means to elevate a pear to a predetermined height with respect to the cup, a pair of tracks mounted transversely beneath said feed cups and spaced apart to clear a pear discharged from said feed cup, a pair of blade support carriages mounted on said tracks for movement endwise thereon, means for co-ordinating the movements of said carriages in opposite directions from each other, severing blades mounted one on each of said carriages and at a predetermined height above said stem engaging means, and means for driving said carriages toward each other to bring said blades together in shearing relation at the central vertical axis of a pear in said feed cup to sever a predetermined amount from the stem end of a pear therein.

8. In a fruit preparation machine, a feed cup adapted to receive a pear stem end down therein, the bottom of the feed cup being open to allow the stem end of a pear to extend therethrough, stem engaging means adjacent said cup for centering the stem end of a pear in said opening, means operatively connected with said stem engaging means for elevating said centering means to elevate a pear to a predetermined height with respect to the cup, a pair of severing blades mounted one on each side of the pear centered therein and at a predetermined height above said centering means, and means for driving said blades toward each other to meet in shearing relation at the central vertical axis of a pear in said feed cup to sever a predetermined amount from the stem end of a pear therein.

9. In a fruit preparation machine having a plurality of impaling fruit holders mounted to travel in a horizontal closed orbit and having vertically reciprocating transfer means mounted for lateral oscillation over a portion of said orbit, a fruit feed cup mounted to overlie directly said transfer means at a predetermined point in its lateral oscillation, said feed cup comprising a pair of oppositely tiltable tapered cup portions adapted to receive a pear stem end down between them, means for tilting said cup portions to discharge a pear from said feed cup, means adjacent said feed cup for elevating a pear to bring the stem end of the pear to a predetermined position in the feed cup, a pair of stem end severing blades biased toward a closed shearing position along a plane disposed between the stem end elevating means in the elevated position thereof and the feed cup, sear means for retaining said blades in separated cocked position, means for releasing said blades for movement along said plane toward closed, stem and severing position, and means co-ordinated with said feed cup tilting means to separate said blades to cocked position.

10. In a fruit preparation machine, a base, a rotary turret mounted thereon to rotate around a vertical axis, a plurality of fruit impaling stemming tubes mounted marginally on said turret in symmetrically disposed relation to travel in a circular path about the vertical axis, means associated with said tubes to position the stemming tubes upright throughout a portion of their circular path around the vertical axis on rotation of said turret, a transfer head mounted adjacent the tubes for pivotal movement about said vertical axis, means for reciprocating said transfer head vertically, a pair of downwardly tapered fruit receiving cup portions mounted for opposite tilting and bodily separating movement on said transfer head, said transfer cup portions being in central vertical alignment with the circular path of the stemming tubes, a presser mounted adjacent said transfer cup portions and normally laterally clear thereof, oscillating means associated with said transfer head for swinging the transfer head about said pivotal axis successively to move the fruit receiving cup portions in central vertical alignment with predetermined succeeding upright stemming tubes, means associated with the presser for moving the presser to centered position over said cup portions during such aligned swinging movement, coordinated drive means for moving the cup portions and for moving the centered presser downwarly toward an aligned stemming tube to press a pear in the cup portions into axially impaled condition on the stemming tube, and means for releasing the axially impaled pear from the cup portions.

11. In a fruit preparation machine, a base, a rotary turret mounted thereon to rotate about an upright axis, a plurality of fruit holders mounted marginally of said turret at equal radial distances from the upright axis to rotate with the turret, means associated with said holders for holding the fruit holders in upright fruit receiving position through a portion of their rotary orbit around the axis, a transfer head pivoted to swing about said vertical axis above said turret, fruit transfer means mounted on said transfer head to receive a pear therein, said transfer means comprising a pair of parallel tracks, a pair of fruit receiving cup portions mounted for slidable movement on said tracks, synchronous drive means for reciprocating said transfer head at a rate proportioned to the rate of turret rotation, means associated with said transfer head for swinging the transfer head through a predetermined arc about said vertical axis to move the fruit transfer means in congruent relation to predetermined succeeding fruit holders on said turret, means associated with said transfer means for moving the fruit transfer means toward a congruently moving fruit holder, and means for moving said cup portions along said tracks at a low point in each reciprocation thereof to separate the cup portions and free a pear therein for passage between the cup portion to the fruit holder.

12. In a fruit preparation machine, a feed cup mounted on said machine for receiving a pear stem end-down therein, said feed cup comprising a pair of downwardly tapered half cup portions, pivot means connecting each of said portions to said machine whereby said portions may be pivoted with respect to one another and to said machine to open and close the cup, said cup in closed position having a stem opening to permit the stem of the pear to extend downwardly therethrough, stem engaging means beneath said cup, means operatively associated with said stem engaging means for elevating the latter and in turn the pear to a predetermined height within the cup, severing blade means in a plane between the cup and the stem engaging means, and means connected to said severing means to move the same in said plane to cut off the stem end of the pear a predetermined distance from the extreme end of the pear.

13. Apparatus as defined in claim 12, wherein said severing blade means comprises a pair of blades adapted to be separated and closed in shearing relation, and means including a sear plate for maintaining the blades cocked in their separated open position when the cup is open.

14. Apparatus as defined in claim 12, wherein said stem engaging means comprises a pair of fingers, means to simultaneously actuate the cup portions and the fingers to an open position, a flap pivotally mounted above said cup and means to pivot the flap to cover the cup opening when the cup is in an open position.

15. Apparatus as defined in claim 12, wherein said severing blade means may be cocked to a non-severing position and said stem engaging means may be moved to a non-engaging position, and means for simultaneously actuating the blade means to non-severing position, the cup to open position and the stem engaging means to non-engaging position.

16. Apparatus as defined in claim 12, wherein said stem engaging means includes means to center the stem end of the pear in the cup opening.

17. Apparatus as defined in claim 12, wherein said severing blade means includes a pair of blades, sear means for retaining said blades in separated cocked position, means associated with the blades for releasing said blades for movement to severing position, and means coordinated with said feed cup pivot means to separate said blades to cocked position.

18. In a fruit preparation machine, a rotary turret, a stemming tube on said turret, means associated with the turret and tube to rotate the same, fruit transfer means including a cup for the fruit mounted vertically above said stemming tube, said transfer means having an axis of rotation substantially coincident with the rotational axis of the turret, first cam means operatively connected to said transfer means for effecting vertical reciprocating movement thereof, and second cam means operatively connected to said transfer means for effecting horizontal oscillating movement thereof, both of said cam means operating concurrently to effect an orbital movement of said transfer means and registry of said cup and tube during transfer of fruit therebetween.

19. Apparatus as defined in claim 18, wherein said transfer means comprises track means, carriage means slidably mounted on the track means, said cup having pocket half portions pivotally mounted on said carriage means, and actuating means for pivoting said portions and for moving said carriage means to vary the distance between said portions.

20. Apparatus as defined in claim 18 including a presser member pivotally mounted above said cup, means associated with the presser member to pivot the same to a position overlying the top of the cup, said cup having pocket half portions, and means to center the fruit positioned within the cup comprising means for moving said portions toward the fruit to exert a gentle squeezing and upward camming action on the fruit and to move the fruit against the presser member.

21. Apparatus as defined in claim 18 including means associated with said tube for maintaining the stemming tube with its axis parallel to the axis of turret rotation.

22. Apparatus as defined in claim 18 including synchronously timed means operative to release the fruit from the cup at a predetermined point in the reciprocating movement of the transfer means.

References Cited in the file of this patent

UNITED STATES PATENTS

| Number | Name | Date |
|---|---|---|
| 1,445,997 | Coons | Feb. 20, 1923 |
| 1,451,571 | Gay | Apr. 10, 1923 |
| 1,583,100 | Reynolds | May 14, 1926 |
| 1,905,578 | Tucker | Apr. 25, 1933 |
| 1,951,804 | MacDougall | Mar. 20, 1934 |
| 1,963,036 | Trolley | June 12, 1934 |
| 2,009,696 | King | July 30, 1935 |
| 2,060,567 | Glenk | Nov. 10, 1936 |
| 2,083,713 | Johnson et al. | June 15, 1937 |
| 2,085,225 | Lucks | June 29, 1937 |
| 2,097,170 | Wilson | Oct. 26, 1937 |
| 2,103,765 | Thompson | Dec. 21, 1937 |
| 2,139,704 | Thompson | Dec. 13, 1938 |
| 2,161,806 | Ewald | June 13, 1939 |
| 2,164,285 | Schutz | June 27, 1939 |
| 2,179,529 | Thompson | Nov. 14, 1939 |
| 2,187,075 | Coons | Jan. 16, 1940 |
| 2,207,179 | Schreiber | July 9, 1940 |
| 2,210,909 | Ewald | Aug. 13, 1940 |
| 2,261,150 | Ewald | Nov. 4, 1941 |
| 2,321,590 | Ewald | June 15, 1943 |
| 2,429,749 | Dunn | Oct. 28, 1947 |
| 2,447,640 | Dunn | Aug. 24, 1948 |
| 2,468,255 | Dunn | Apr. 26, 1949 |
| 2,502,797 | Luhdorff | Apr. 4, 1950 |
| 2,526,712 | Thompson | Oct. 24, 1950 |
| 2,574,761 | Rutherford | Nov. 13, 1951 |